United States Patent
Naoom et al.

(10) Patent No.: US 12,233,883 B1
(45) Date of Patent: *Feb. 25, 2025

(54) SYSTEMS AND METHODS FOR INTELLIGENTLY TRANSFORMING DATA TO GENERATE IMPROVED OUTPUT DATA USING A PROBABILISTIC MULTI-APPLICATION NETWORK

(71) Applicant: CRAWFORD GROUP, INC., St, Louis, MO (US)

(72) Inventors: Michael Naoom, Columbus, OH (US); Michael Rortvedt, Madison, WI (US); Trent Tinsley, Eureka, MO (US)

(73) Assignee: CRAWFORD GROUP, INC., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/745,961

(22) Filed: Jun. 17, 2024

Related U.S. Application Data

(63) Continuation of application No. 18/382,418, filed on Oct. 20, 2023, now Pat. No. 12,012,110.

(51) Int. Cl.
*B60W 40/12* (2012.01)
*G06N 5/02* (2023.01)
(Continued)

(52) U.S. Cl.
CPC ............... *B60W 40/12* (2013.01); *G06N 5/02* (2013.01); *G06N 7/01* (2023.01); *H04W 4/44* (2018.02); *B60W 2556/10* (2020.02)

(58) Field of Classification Search
CPC .... B60W 40/12; B60W 2556/10; G06N 5/02; G06N 7/01; H04W 4/44
See application file for complete search history.

(56) References Cited

U.S. PATENT DOCUMENTS 3,665,397 A 5/1972 Di Napoli et al.
4,714,989 A 12/1987 Billings
(Continued)

FOREIGN PATENT DOCUMENTS

EP 1724719 A1 11/2006
JP 2001344490 A 12/2001
(Continued)

OTHER PUBLICATIONS

Reddy, Dasari Anantha, et al. "Automatic Vehicle Damage Detection Classification framework using Fast and Mask Deep learning." 2022 Second International Conference on Computer Science, Engineering and Applications (ICCSEA). IEEE, 2022. (Year: 2022).*

(Continued)

*Primary Examiner* — Russell Frejd
*Assistant Examiner* — Ana D Thomas
(74) *Attorney, Agent, or Firm* — Baker & McKenzie LLP

(57) ABSTRACT

Disclosed are systems and methods for intelligently transforming data to generate improved output data, including, for example, for use in a multi-application network with disparate parties. The systems and methods include transforming data using a probabilistic network and a knowledge base generated using historic data to generate improved output data and include the steps of receiving first data associated with a first user and associated with a first incident object. In some embodiments, the systems and methods include generating a first computing object, transmitting the first computing object, receiving a first selection, transmitting a data collection computing input tool, receiving a second selection, receiving second data comprising a first image of a first incident object, transmitting the second data, transforming the second data using a probabilistic network, a machine learning model, a knowledge base, and (Continued)

a data group associated with patterns of processed historic data, and generating improved output data.

20 Claims, 35 Drawing Sheets

(51) Int. Cl.
*G06N 7/01* (2023.01)
*H04W 4/44* (2018.01)

(56) References Cited

U.S. PATENT DOCUMENTS

| | | |
|---|---|---|
| 4,736,294 A | 4/1988 | Gill et al. |
| 4,757,267 A | 7/1988 | Riskin |
| 4,774,663 A | 9/1988 | Musmanno et al. |
| 4,788,643 A | 11/1988 | Trippe et al. |
| 4,797,818 A | 1/1989 | Cotter |
| 4,799,156 A | 1/1989 | Shavit et al. |
| 4,831,526 A | 5/1989 | Luchs et al. |
| 4,858,121 A | 8/1989 | Barber et al. |
| 4,891,785 A | 1/1990 | Donohoo |
| 4,897,867 A | 1/1990 | Foster et al. |
| 4,899,292 A | 2/1990 | Montagna et al. |
| 4,916,611 A | 4/1990 | Doyle, Jr. et al. |
| 4,931,932 A | 6/1990 | Dalnekoff et al. |
| 4,934,419 A | 6/1990 | Lamont et al. |
| 4,951,196 A | 8/1990 | Jackson |
| 4,984,155 A | 1/1991 | Geier et al. |
| 5,058,044 A | 10/1991 | Stewart et al. |
| 5,063,506 A | 11/1991 | Brockwell et al. |
| 5,182,705 A | 1/1993 | Barr et al. |
| 5,210,687 A | 5/1993 | Wolfberg et al. |
| 5,216,592 A | 6/1993 | Mann et al. |
| 5,218,697 A | 6/1993 | Chung |
| 5,224,034 A | 6/1993 | Katz et al. |
| 5,237,499 A | 8/1993 | Garback |
| 5,253,165 A | 10/1993 | Leiseca et al. |
| 5,262,941 A | 11/1993 | Saladin et al. |
| 5,270,922 A | 12/1993 | Higgins |
| 5,289,369 A | 2/1994 | Hirshberg |
| 5,309,355 A | 5/1994 | Lockwood |
| 5,311,425 A | 5/1994 | Inada |
| 5,319,542 A | 6/1994 | King, Jr. et al. |
| 5,355,474 A | 10/1994 | Thuraisngham et al. |
| 5,361,199 A | 11/1994 | Shoquist et al. |
| 5,369,570 A | 11/1994 | Parad |
| 5,375,207 A | 12/1994 | Blakely et al. |
| 5,390,314 A | 2/1995 | Swanson |
| 5,396,600 A | 3/1995 | Thompson et al. |
| 5,406,475 A | 4/1995 | Kouchi et al. |
| 5,422,809 A | 6/1995 | Griffin et al. |
| 5,432,904 A | 7/1995 | Wong |
| 5,465,206 A | 11/1995 | Hilt et al. |
| 5,471,615 A | 11/1995 | Amatsu et al. |
| 5,475,585 A | 12/1995 | Bush |
| 5,504,674 A | 4/1996 | Chen et al. |
| 5,506,897 A | 4/1996 | Moore et al. |
| 5,515,268 A | 5/1996 | Yoda |
| 5,528,490 A | 6/1996 | Hill |
| 5,530,844 A | 6/1996 | Phillips et al. |
| 5,544,040 A | 8/1996 | Gerbaulet |
| 5,544,320 A | 8/1996 | Konrad |
| 5,550,734 A | 8/1996 | Tarter et al. |
| 5,557,515 A | 9/1996 | Abbruzzese et al. |
| 5,557,518 A | 9/1996 | Rosen |
| 5,570,283 A | 10/1996 | Shoolery et al. |
| 5,581,461 A | 12/1996 | Coll et al. |
| 5,586,312 A | 12/1996 | Johnson et al. |
| 5,586,313 A | 12/1996 | Schnittker et al. |
| 5,588,048 A | 12/1996 | Neville |
| 5,592,375 A | 1/1997 | Salmon et al. |
| 5,592,378 A | 1/1997 | Cameron et al. |
| 5,640,505 A | 6/1997 | Hearn et al. |
| 5,644,721 A | 7/1997 | Chung et al. |
| 5,644,778 A | 7/1997 | Burks et al. |
| 5,664,207 A | 9/1997 | Crumpler et al. |
| 5,666,493 A | 9/1997 | Wojcik et al. |
| 5,694,551 A | 12/1997 | Doyle et al. |
| 5,696,901 A | 12/1997 | Konrad |
| 5,696,965 A | 12/1997 | Dedrick |
| 5,704,045 A | 12/1997 | King et al. |
| 5,710,887 A | 1/1998 | Chelliah et al. |
| 5,710,889 A | 1/1998 | Clark et al. |
| 5,712,989 A | 1/1998 | Johnson et al. |
| 5,721,832 A | 1/1998 | Westrope et al. |
| 5,721,913 A | 2/1998 | Ackroff et al. |
| 5,724,520 A | 3/1998 | Goheen |
| 5,726,885 A | 3/1998 | Klein et al. |
| 5,732,398 A | 3/1998 | Tagawa |
| 5,734,823 A | 3/1998 | Saigh et al. |
| 5,737,215 A | 4/1998 | Schricker et al. |
| 5,754,772 A | 5/1998 | Leaf |
| 5,754,830 A | 5/1998 | Butts et al. |
| 5,757,925 A | 5/1998 | Faybishenko |
| 5,758,329 A | 5/1998 | Wojcik et al. |
| 5,758,341 A | 5/1998 | Voss |
| 5,764,981 A | 6/1998 | Brice et al. |
| 5,768,510 A | 6/1998 | Gish |
| 5,768,511 A | 6/1998 | Galvin et al. |
| 5,774,873 A | 6/1998 | Berent et al. |
| 5,774,883 A | 6/1998 | Andersen et al. |
| 5,778,178 A | 7/1998 | Arunachalam |
| 5,781,892 A | 7/1998 | Hunt et al. |
| 5,784,565 A | 7/1998 | Lewine |
| 5,793,966 A | 8/1998 | Amstein et al. |
| 5,794,207 A | 8/1998 | Walker et al. |
| 5,796,634 A | 8/1998 | Craport et al. |
| 5,796,967 A | 8/1998 | Filepp et al. |
| 5,797,126 A | 8/1998 | Helbling et al. |
| 5,799,157 A | 8/1998 | Escallon |
| 5,799,289 A | 8/1998 | Fukushima et al. |
| 5,802,293 A | 9/1998 | van der Sijpt |
| 5,802,530 A | 9/1998 | Van Hoff |
| 5,805,689 A | 9/1998 | Neville |
| 5,805,829 A | 9/1998 | Cohen et al. |
| 5,808,894 A | 9/1998 | Wiens et al. |
| 5,809,478 A | 9/1998 | Greco et al. |
| 5,812,067 A | 9/1998 | Bergholz et al. |
| 5,818,715 A | 10/1998 | Marshall et al. |
| 5,819,274 A | 10/1998 | Jackson, Jr. |
| 5,832,451 A | 11/1998 | Flake et al. |
| 5,832,452 A | 11/1998 | Schneider et al. |
| 5,832,454 A | 11/1998 | Jafri et al. |
| 5,835,724 A | 11/1998 | Smith |
| 5,838,910 A | 11/1998 | Domenikos et al. |
| 5,838,916 A | 11/1998 | Domenikos et al. |
| 5,839,112 A | 11/1998 | Schreitmueller et al. |
| 5,839,114 A | 11/1998 | Lynch et al. |
| 5,842,176 A | 11/1998 | Hunt et al. |
| 5,845,077 A | 12/1998 | Fawcett |
| 5,847,957 A | 12/1998 | Cohen et al. |
| 5,848,131 A | 12/1998 | Shaffer et al. |
| 5,848,241 A | 12/1998 | Misinai et al. |
| 5,850,446 A | 12/1998 | Berger et al. |
| 5,857,191 A | 1/1999 | Blackwell, Jr. et al. |
| 5,862,346 A | 1/1999 | Kley et al. |
| 5,864,818 A | 1/1999 | Feldman |
| 5,864,827 A | 1/1999 | Wilson |
| RE36,111 E | 2/1999 | Neville |
| 5,870,719 A | 2/1999 | Maritzen et al. |
| 5,870,733 A | 2/1999 | Bass et al. |
| 5,875,110 A | 2/1999 | Jacobs |
| 5,877,765 A | 3/1999 | Dickman et al. |
| 5,881,230 A | 3/1999 | Christensen et al. |
| 5,889,863 A | 3/1999 | Weber |
| 5,889,942 A | 3/1999 | Orenshteyn |
| 5,890,129 A | 3/1999 | Spurgeon |
| 5,890,140 A | 3/1999 | Clark et al. |
| 5,892,905 A | 4/1999 | Brandt et al. |
| 5,893,904 A | 4/1999 | Harris et al. |
| 5,897,620 A | 4/1999 | Walker et al. |
| 5,898,835 A | 4/1999 | Truong |
| 5,901,214 A | 5/1999 | Shaffer et al. |

(56) References Cited

U.S. PATENT DOCUMENTS

| | | |
|---|---|---|
| 5,903,873 A | 5/1999 | Peterson et al. |
| 5,904,727 A | 5/1999 | Prabhakaran |
| 5,909,542 A | 6/1999 | Paquette et al. |
| 5,909,570 A | 6/1999 | Webber |
| 5,909,581 A | 6/1999 | Park |
| 5,910,982 A | 6/1999 | Shaffer et al. |
| 5,915,241 A | 6/1999 | Giannini |
| 5,918,215 A | 6/1999 | Yoshioka et al. |
| 5,920,696 A | 7/1999 | Brandt et al. |
| 5,922,040 A | 7/1999 | Prabhakaran |
| 5,923,552 A | 7/1999 | Brown et al. |
| 5,926,793 A | 7/1999 | de Rafael et al. |
| 5,926,798 A | 7/1999 | Carter |
| 5,926,817 A | 7/1999 | Christeson et al. |
| 5,930,474 A | 7/1999 | Dunworth et al. |
| 5,931,878 A | 8/1999 | Chapin, Jr. |
| 5,931,917 A | 8/1999 | Nguyen et al. |
| 5,933,810 A | 8/1999 | Okawa |
| 5,944,784 A | 8/1999 | Simonoff et al. |
| 5,946,660 A | 8/1999 | McCarty et al. |
| 5,946,687 A | 8/1999 | Gehani et al. |
| 5,948,040 A | 9/1999 | Delorme et al. |
| 5,950,169 A | 9/1999 | Borghesi et al. |
| 5,953,706 A | 9/1999 | Patel |
| 5,956,397 A | 9/1999 | Shaffer et al. |
| 5,956,487 A | 9/1999 | Venkatraman et al. |
| 5,956,509 A | 9/1999 | Kavner |
| 5,956,706 A | 9/1999 | Carey et al. |
| 5,961,569 A | 10/1999 | Craport et al. |
| 5,961,572 A | 10/1999 | Craport et al. |
| 5,963,915 A | 10/1999 | Kirsch |
| 5,966,451 A | 10/1999 | Utsumi |
| 5,970,475 A | 10/1999 | Barnes et al. |
| 5,973,619 A | 10/1999 | Paredes |
| 5,974,444 A | 10/1999 | Konrad |
| 5,977,966 A | 11/1999 | Bogdan |
| 5,978,577 A | 11/1999 | Rierden et al. |
| 5,978,747 A | 11/1999 | Craport et al. |
| 5,978,817 A | 11/1999 | Giannandrea et al. |
| 5,978,834 A | 11/1999 | Simonoff et al. |
| 5,978,840 A | 11/1999 | Nguyen et al. |
| 5,982,867 A | 11/1999 | Urban et al. |
| 5,982,868 A | 11/1999 | Shaffer et al. |
| 5,983,200 A | 11/1999 | Slotznick |
| 5,983,208 A | 11/1999 | Haller et al. |
| 5,987,423 A | 11/1999 | Arnold et al. |
| 5,991,739 A | 11/1999 | Cupps et al. |
| 5,995,939 A | 11/1999 | Berman et al. |
| 5,996,017 A | 11/1999 | Cipiere |
| 6,002,767 A | 12/1999 | Kramer |
| 6,005,568 A | 12/1999 | Simonoff et al. |
| 6,006,148 A | 12/1999 | Strong |
| 6,006,201 A | 12/1999 | Berent et al. |
| 6,009,464 A | 12/1999 | Hamilton et al. |
| 1,830,000 A | 1/2000 | Petrimouix et al. |
| 6,012,083 A | 1/2000 | Savitzky et al. |
| 6,014,673 A | 1/2000 | Davis et al. |
| 6,014,702 A | 1/2000 | King et al. |
| 6,016,496 A | 1/2000 | Roberson |
| 6,016,515 A | 1/2000 | Shaw et al. |
| 6,018,627 A | 1/2000 | Iyengar et al. |
| 6,021,406 A | 2/2000 | Kuznetsov |
| 6,023,679 A | 2/2000 | Acebo et al. |
| 6,026,379 A | 2/2000 | Haller et al. |
| 6,029,175 A | 2/2000 | Chow et al. |
| 6,031,533 A | 2/2000 | Peddada et al. |
| 6,043,815 A | 3/2000 | Simonoff et al. |
| 6,044,382 A | 3/2000 | Martino |
| 6,049,671 A | 4/2000 | Slivka et al. |
| 6,049,774 A | 4/2000 | Roy |
| 6,049,832 A | 4/2000 | Brim et al. |
| 6,054,983 A | 4/2000 | Simonoff et al. |
| 6,058,179 A | 5/2000 | Shaffer et al. |
| 6,058,378 A | 5/2000 | Clark et al. |
| 6,061,665 A | 5/2000 | Bahreman |
| 6,061,691 A | 5/2000 | Fox |
| 6,064,973 A | 5/2000 | Smith et al. |
| 6,067,531 A | 5/2000 | Hoyt et al. |
| 6,070,142 A | 5/2000 | McDonough et al. |
| 6,072,870 A | 6/2000 | Nguyen et al. |
| 6,073,163 A | 6/2000 | Clark et al. |
| 6,073,214 A | 6/2000 | Fawcett |
| 6,076,066 A | 6/2000 | DiRienzo et al. |
| 6,076,067 A | 6/2000 | Jacobs et al. |
| 6,078,321 A | 6/2000 | Simonoff et al. |
| 6,078,322 A | 6/2000 | Simonoff et al. |
| 6,084,585 A | 7/2000 | Kraft et al. |
| 6,085,169 A | 7/2000 | Walker et al. |
| 6,085,170 A | 7/2000 | Tsukuda |
| 6,088,677 A | 7/2000 | Spurgeon |
| 6,091,409 A | 7/2000 | Dickman et al. |
| 6,091,412 A | 7/2000 | Simonoff et al. |
| 6,091,810 A | 7/2000 | Shaffer et al. |
| 6,094,640 A | 7/2000 | Goheen |
| 6,094,679 A | 7/2000 | Teng et al. |
| 6,097,802 A | 8/2000 | Fleischer, III et al. |
| 6,101,496 A | 8/2000 | Esposito |
| 6,108,650 A | 8/2000 | Musk et al. |
| 6,112,185 A | 8/2000 | Walker et al. |
| 6,119,105 A | 9/2000 | Williams |
| 6,119,149 A | 9/2000 | Notani |
| 6,122,642 A | 9/2000 | Mehovic |
| 6,125,384 A | 9/2000 | Brandt et al. |
| 6,125,391 A | 9/2000 | Meltzer et al. |
| 6,144,944 A | 11/2000 | Kurtzman, II et al. |
| 6,144,990 A | 11/2000 | Brandt et al. |
| 6,148,289 A | 11/2000 | Virdy |
| 6,148,290 A | 11/2000 | Dan et al. |
| 6,154,172 A | 11/2000 | Piccionelli et al. |
| 6,163,772 A | 12/2000 | Kramer et al. |
| 6,167,567 A | 12/2000 | Chiles et al. |
| 6,175,832 B1 | 1/2001 | Luzzi et al. |
| 6,178,409 B1 | 1/2001 | Weber et al. |
| 6,185,290 B1 | 2/2001 | Shaffer et al. |
| 6,185,540 B1 | 2/2001 | Schreitmueller et al. |
| 6,189,003 B1 | 2/2001 | Leal |
| 6,192,347 B1 | 2/2001 | Graff |
| 6,192,415 B1 | 2/2001 | Haverstock et al. |
| 6,205,482 B1 | 3/2001 | Navarre et al. |
| 6,223,094 B1 | 4/2001 | Muehleck et al. |
| 6,226,654 B1 | 5/2001 | Van Hoff |
| 6,226,675 B1 | 5/2001 | Meltzer et al. |
| 6,229,534 B1 | 5/2001 | Gerra et al. |
| 6,230,117 B1 | 5/2001 | Lymer et al. |
| 6,233,329 B1 | 5/2001 | Urban et al. |
| 6,233,609 B1 | 5/2001 | Mittal |
| 6,240,365 B1 | 5/2001 | Bunn |
| 6,243,643 B1 | 6/2001 | Uematsu |
| 6,253,188 B1 | 6/2001 | Witek et al. |
| 6,263,322 B1 | 7/2001 | Kirkevold et al. |
| 6,272,528 B1 | 8/2001 | Cullen et al. |
| 6,272,675 B1 | 8/2001 | Schrab et al. |
| 6,275,843 B1 | 8/2001 | Chorn |
| 6,282,489 B1 | 8/2001 | Bellesfield et al. |
| 6,282,517 B1 | 8/2001 | Wolfe et al. |
| 6,282,568 B1 | 8/2001 | Sondur et al. |
| 6,286,028 B1 | 9/2001 | Cohen et al. |
| 6,292,185 B1 | 9/2001 | Ko et al. |
| 6,298,333 B1 | 10/2001 | Manzi et al. |
| 6,304,892 B1 | 10/2001 | Bhoj et al. |
| 6,308,120 B1 | 10/2001 | Good |
| 6,308,160 B1 | 10/2001 | Rex |
| 6,311,207 B1 | 10/2001 | Mighdoll et al. |
| 6,311,213 B2 | 10/2001 | Dawson et al. |
| 6,324,568 B1 | 11/2001 | Diec |
| 6,327,574 B1 | 12/2001 | Kramer et al. |
| 6,327,617 B1 | 12/2001 | Fawcett |
| 6,332,163 B1 | 12/2001 | Bowman-Amuah |
| 6,334,146 B1 | 12/2001 | Parasnis et al. |
| 6,336,100 B1 | 1/2002 | Yamada |
| 6,339,773 B1 | 1/2002 | Rishe |
| 6,343,290 B1 | 1/2002 | Cossins et al. |
| 6,347,302 B1 | 2/2002 | Joao |
| 6,347,398 B1 | 2/2002 | Parthasarathy et al. |

(56) References Cited

U.S. PATENT DOCUMENTS

| | | |
|---|---|---|
| 6,351,738 B1 | 2/2002 | Clark |
| 6,360,205 B1 | 3/2002 | Iyengar et al. |
| 6,363,388 B1 | 3/2002 | Sprenger et al. |
| 6,370,523 B1 | 4/2002 | Anderson |
| 6,381,324 B1 | 4/2002 | Shaffer et al. |
| 6,381,603 B1 | 4/2002 | Chan et al. |
| 6,381,617 B1 | 4/2002 | Frolund et al. |
| 6,385,312 B1 | 5/2002 | Shaffer et al. |
| 6,389,431 B1 | 5/2002 | Frolund et al. |
| 6,393,415 B1 | 5/2002 | Getchius et al. |
| 6,393,471 B1 | 5/2002 | Kobata |
| 6,397,191 B1 | 5/2002 | Notani et al. |
| 6,397,208 B1 | 5/2002 | Lee |
| 6,397,219 B2 | 5/2002 | Mills |
| 6,401,094 B1 | 6/2002 | Stemp et al. |
| 6,418,400 B1 | 7/2002 | Webber |
| 6,418,554 B1 | 7/2002 | Delo et al. |
| 6,445,309 B1 | 9/2002 | Walker et al. |
| 6,477,452 B2 | 11/2002 | Good |
| 6,502,080 B1 | 12/2002 | Eichorst et al. |
| 6,505,106 B1 | 1/2003 | Lawrence et al. |
| 6,526,392 B1 | 2/2003 | Dietrich et al. |
| 6,542,912 B2 | 4/2003 | Meltzer et al. |
| 6,567,783 B1 | 5/2003 | Notani et al. |
| 6,587,836 B1 | 7/2003 | Ahlberg et al. |
| 6,587,841 B1 | 7/2003 | DeFrancesco et al. |
| 6,594,633 B1 | 7/2003 | Broerman |
| 6,609,050 B2 | 8/2003 | Li |
| 6,609,108 B1 | 8/2003 | Pulliam et al. |
| 6,609,118 B1 | 8/2003 | Khedkar et al. |
| 6,622,129 B1 | 9/2003 | Whitworth |
| 6,654,726 B1 | 11/2003 | Hanzek |
| 6,654,770 B2 | 11/2003 | Kaufman |
| 6,694,234 B2 | 2/2004 | Lockwood et al. |
| 6,701,232 B2 | 3/2004 | Yamaki |
| 6,725,201 B2 | 4/2004 | Joao |
| 6,728,685 B1 | 4/2004 | Ahluwalia |
| 6,732,358 B1 | 5/2004 | Siefert |
| 6,748,426 B1 | 6/2004 | Shaffer et al. |
| 6,757,698 B2 | 6/2004 | McBride et al. |
| 6,785,658 B1 | 8/2004 | Merker et al. |
| 6,802,061 B1 | 10/2004 | Parthasarathy et al. |
| 6,810,401 B1 | 10/2004 | Thompson et al. |
| 6,823,319 B1 | 11/2004 | Lynch et al. |
| 6,910,040 B2 | 6/2005 | Emmick et al. |
| 6,950,826 B1 | 9/2005 | Freeman |
| 6,952,680 B1 | 10/2005 | Melby et al. |
| 6,965,886 B2 | 11/2005 | Govrin et al. |
| 6,968,388 B1 | 11/2005 | Fuldseth et al. |
| 6,976,251 B2 | 12/2005 | Meyerson |
| 7,020,620 B1 | 3/2006 | Bargnes et al. |
| 7,050,986 B1 | 5/2006 | Vance et al. |
| 7,062,765 B1 | 6/2006 | Pitzel et al. |
| 7,089,588 B2 | 8/2006 | Schaefer et al. |
| 7,124,088 B2 | 10/2006 | Bauer et al. |
| 7,136,821 B1 | 11/2006 | Kohavi et al. |
| 7,145,998 B1 | 12/2006 | Holder et al. |
| 7,184,978 B1 | 2/2007 | Tams et al. |
| 7,243,075 B1 | 7/2007 | Shaffer et al. |
| 7,275,038 B1 | 9/2007 | Weinstock et al. |
| 7,283,972 B2 | 10/2007 | Himes |
| 7,324,951 B2 | 1/2008 | Renwick et al. |
| 7,328,166 B1 | 2/2008 | Geoghehan et al. |
| 7,636,676 B1 | 12/2009 | Wolery et al. |
| 7,685,063 B2 | 3/2010 | Schuchardt et al. |
| 7,899,690 B1 | 3/2011 | Weinstock et al. |
| 8,160,906 B2 | 4/2012 | Smith et al. |
| 8,160,907 B2 | 4/2012 | Smith et al. |
| 8,340,989 B2 | 12/2012 | Weinstock et al. |
| 8,374,894 B2 | 2/2013 | Weinstock et al. |
| 8,401,881 B2 | 3/2013 | Weinstock et al. |
| 8,412,546 B2 | 4/2013 | Smith et al. |
| 8,600,783 B2 | 12/2013 | Smith et al. |
| 8,712,893 B1 | 4/2014 | Brandmaier et al. |
| 8,775,222 B2 | 7/2014 | Smith et al. |
| 9,449,495 B1 | 9/2016 | Call et al. |
| 9,721,304 B1 | 8/2017 | Parchment et al. |
| 9,773,281 B1 | 9/2017 | Hanson |
| 9,990,661 B2 | 6/2018 | Taylor |
| 10,013,718 B1 | 7/2018 | Leise |
| 10,354,230 B1 | 7/2019 | Hanson et al. |
| 10,366,352 B2 | 7/2019 | Smith et al. |
| 10,929,920 B2 | 2/2021 | Smith et al. |
| 11,037,107 B1 | 6/2021 | Hanson et al. |
| 2001/0005831 A1 | 6/2001 | Lewin et al. |
| 2001/0008998 A1 | 7/2001 | Tamaki et al. |
| 2001/0010058 A1 | 7/2001 | Mittal |
| 2001/0011222 A1 | 8/2001 | McLauchlin et al. |
| 2001/0011246 A1 | 8/2001 | Tammaro |
| 2001/0014907 A1 | 8/2001 | Brebner |
| 2001/0016825 A1 | 8/2001 | Pugliese, III et al. |
| 2001/0016868 A1 | 8/2001 | Nakamura et al. |
| 2001/0018661 A1 | 8/2001 | Sato et al. |
| 2001/0021912 A1 | 9/2001 | DeMarcken et al. |
| 2001/0027420 A1 | 10/2001 | Boublik et al. |
| 2001/0027439 A1 | 10/2001 | Holtzman et al. |
| 2001/0027483 A1 | 10/2001 | Gupta et al. |
| 2001/0029459 A1 | 10/2001 | Fujiwara |
| 2001/0032113 A1 | 10/2001 | Rudnick |
| 2001/0032273 A1 | 10/2001 | Cheng |
| 2001/0034686 A1 | 10/2001 | Eder |
| 2001/0034690 A1 | 10/2001 | Joseph |
| 2001/0034700 A1 | 10/2001 | Foss et al. |
| 2001/0037224 A1 | 11/2001 | Eldridge et al. |
| 2001/0037255 A1 | 11/2001 | Tambay et al. |
| 2001/0037298 A1 | 11/2001 | Ehrman et al. |
| 2001/0037331 A1 | 11/2001 | Lloyd |
| 2001/0039525 A1 | 11/2001 | Messmer et al. |
| 2001/0044811 A1 | 11/2001 | Ballantyne et al. |
| 2001/0049653 A1 | 12/2001 | Sheets |
| 2001/0056361 A1 | 12/2001 | Sendouda |
| 2002/0002478 A1 | 1/2002 | Swart et al. |
| 2002/0004796 A1 | 1/2002 | Vange et al. |
| 2002/0007289 A1 | 1/2002 | Malin et al. |
| 2002/0010604 A1 | 1/2002 | Block |
| 2002/0010781 A1 | 1/2002 | Tuatini |
| 2002/0013767 A1 | 1/2002 | Katz |
| 2002/0016655 A1 | 2/2002 | Joao |
| 2002/0019821 A1 | 2/2002 | Rosenbluth |
| 2002/0022979 A1 | 2/2002 | Whipp et al. |
| 2002/0026336 A1 | 2/2002 | Eizenburg et al. |
| 2002/0026337 A1 | 2/2002 | Sasaki |
| 2002/0032626 A1 | 3/2002 | DeWolf et al. |
| 2002/0032706 A1 | 3/2002 | Perla et al. |
| 2002/0032790 A1 | 3/2002 | Linderman |
| 2002/0035488 A1 | 3/2002 | Aquila et al. |
| 2002/0035592 A1 | 3/2002 | Wu et al. |
| 2002/0038272 A1 | 3/2002 | Menchero |
| 2002/0040352 A1 | 4/2002 | McCormick |
| 2002/0042843 A1 | 4/2002 | Diec |
| 2002/0042849 A1 | 4/2002 | Ho et al. |
| 2002/0046143 A1 | 4/2002 | Eder |
| 2002/0046144 A1 | 4/2002 | Graff |
| 2002/0046213 A1 | 4/2002 | Vinati et al. |
| 2002/0046294 A1 | 4/2002 | Brodsky et al. |
| 2002/0046301 A1 | 4/2002 | Shannon et al. |
| 2002/0049603 A1 | 4/2002 | Mehra et al. |
| 2002/0049659 A1 | 4/2002 | Johnson et al. |
| 2002/0059345 A1 | 5/2002 | Wang et al. |
| 2002/0062262 A1 | 5/2002 | Vasconi et al. |
| 2002/0065690 A1 | 5/2002 | Kusumoto |
| 2002/0065698 A1 | 5/2002 | Schick et al. |
| 2002/0065707 A1 | 5/2002 | Lancaster et al. |
| 2002/0069123 A1 | 6/2002 | Soderlind et al. |
| 2002/0069143 A1 | 6/2002 | Cepeda |
| 2002/0072937 A1 | 6/2002 | Domenick et al. |
| 2002/0072938 A1 | 6/2002 | Black et al. |
| 2002/0072958 A1 | 6/2002 | Yuyama et al. |
| 2002/0073012 A1 | 6/2002 | Lowell et al. |
| 2002/0073236 A1 | 6/2002 | Helgeson et al. |
| 2002/0076029 A1 | 6/2002 | Shaffer et al. |
| 2002/0077871 A1 | 6/2002 | Udelhoven et al. |
| 2002/0077944 A1 | 6/2002 | Bly et al. |
| 2002/0082860 A1 | 6/2002 | Johnson |

(56) References Cited

U.S. PATENT DOCUMENTS

| | | |
|---|---|---|
| 2002/0082899 A1 | 6/2002 | Aley |
| 2002/0082912 A1 | 6/2002 | Batachia et al. |
| 2002/0082966 A1 | 6/2002 | O'Brien et al. |
| 2002/0083095 A1 | 6/2002 | Wu et al. |
| 2002/0083099 A1 | 6/2002 | Knauss et al. |
| 2002/0087374 A1 | 7/2002 | Boubez et al. |
| 2002/0087378 A1 | 7/2002 | Como |
| 2002/0091533 A1 | 7/2002 | Ims et al. |
| 2002/0095319 A1 | 7/2002 | Swart et al. |
| 2002/0099562 A1 | 7/2002 | Bruce, Sr. et al. |
| 2002/0099575 A1 | 7/2002 | Hubbard et al. |
| 2002/0099613 A1 | 7/2002 | Swart et al. |
| 2002/0099618 A1 | 7/2002 | Stiberman |
| 2002/0099735 A1 | 7/2002 | Schroeder et al. |
| 2002/0099738 A1 | 7/2002 | Grant |
| 2002/0106069 A1 | 8/2002 | Shaffer et al. |
| 2002/0107873 A1 | 8/2002 | Winkler et al. |
| 2002/0107918 A1 | 8/2002 | Shaffer et al. |
| 2002/0111846 A1 | 8/2002 | Singer |
| 2002/0111876 A1 | 8/2002 | Rudraraju et al. |
| 2002/0116205 A1 | 8/2002 | Ankireddipally et al. |
| 2002/0116236 A1 | 8/2002 | Johnson et al. |
| 2002/0116309 A1 | 8/2002 | Keyes et al. |
| 2002/0116454 A1 | 8/2002 | Dyla et al. |
| 2002/0120459 A1 | 8/2002 | Dick et al. |
| 2002/0120776 A1 | 8/2002 | Eggebraaten et al. |
| 2002/0128864 A1 | 9/2002 | Maus et al. |
| 2002/0128985 A1 | 9/2002 | Greenwald |
| 2002/0129021 A1 | 9/2002 | Brown |
| 2002/0133359 A1 | 9/2002 | Brown |
| 2002/0133517 A1 | 9/2002 | Carlson et al. |
| 2002/0136381 A1 | 9/2002 | Shaffer et al. |
| 2002/0138379 A1 | 9/2002 | Yuasa et al. |
| 2002/0143644 A1 | 10/2002 | Tosun et al. |
| 2002/0143673 A1 | 10/2002 | Hitchings et al. |
| 2002/0143819 A1 | 10/2002 | Han et al. |
| 2002/0147601 A1 | 10/2002 | Fagan |
| 2002/0152092 A1 | 10/2002 | Bibas et al. |
| 2002/0152100 A1 | 10/2002 | Chen et al. |
| 2002/0156693 A1 | 10/2002 | Stewart et al. |
| 2002/0156865 A1 | 10/2002 | Rajarajan et al. |
| 2002/0169658 A1 | 11/2002 | Adler |
| 2002/0169842 A1 | 11/2002 | Christensen et al. |
| 2002/0171650 A1 | 11/2002 | Prabhakaran |
| 2002/0177926 A1 | 11/2002 | Lockwood et al. |
| 2002/0178080 A1 | 11/2002 | Ly et al. |
| 2002/0178087 A1 | 11/2002 | Henderson et al. |
| 2002/0178129 A1 | 11/2002 | Horimoto et al. |
| 2002/0178147 A1 | 11/2002 | Arroyo et al. |
| 2002/0184054 A1 | 12/2002 | Cox et al. |
| 2002/0184219 A1 | 12/2002 | Preisig et al. |
| 2002/0184266 A1 | 12/2002 | Blessin |
| 2002/0186144 A1 | 12/2002 | Meunier |
| 2002/0188761 A1 | 12/2002 | Chikirivao et al. |
| 2002/0194218 A1 | 12/2002 | Bradley et al. |
| 2002/0194219 A1 | 12/2002 | Bradley et al. |
| 2002/0198743 A1 | 12/2002 | Ariathurai et al. |
| 2002/0198797 A1 | 12/2002 | Cooper et al. |
| 2002/0198820 A1 | 12/2002 | Mills |
| 2003/0004746 A1 | 1/2003 | Kheirolomoom et al. |
| 2003/0004822 A1 | 1/2003 | Shorter et al. |
| 2003/0004937 A1 | 1/2003 | Salmenkaita et al. |
| 2003/0005181 A1 | 1/2003 | Bau et al. |
| 2003/0009545 A1 | 1/2003 | Sahai et al. |
| 2003/0014270 A1 | 1/2003 | Qureshi et al. |
| 2003/0014295 A1 | 1/2003 | Brookes et al. |
| 2003/0014352 A1 | 1/2003 | Marzan |
| 2003/0014442 A1 | 1/2003 | Shiigi et al. |
| 2003/0014733 A1 | 1/2003 | Ringseth et al. |
| 2003/0018551 A1 | 1/2003 | Hanson et al. |
| 2003/0018666 A1 | 1/2003 | Chen et al. |
| 2003/0023450 A1 | 1/2003 | Casati et al. |
| 2003/0023463 A1 | 1/2003 | Dombroski et al. |
| 2003/0023545 A1 | 1/2003 | Hawkins et al. |
| 2003/0023957 A1 | 1/2003 | Bau et al. |
| 2003/0028404 A1 | 2/2003 | Herron et al. |
| 2003/0028533 A1 | 2/2003 | Bata et al. |
| 2003/0033242 A1 | 2/2003 | Lynch et al. |
| 2003/0033369 A1 | 2/2003 | Bernard |
| 2003/0036891 A1 | 2/2003 | Aragones et al. |
| 2003/0036917 A1 | 2/2003 | Hite et al. |
| 2003/0036930 A1 | 2/2003 | Matos et al. |
| 2003/0036964 A1 | 2/2003 | Boyden et al. |
| 2003/0036966 A1 | 2/2003 | Amra et al. |
| 2003/0041012 A1 | 2/2003 | Grey et al. |
| 2003/0041180 A1 | 2/2003 | Schlussman |
| 2003/0046179 A1 | 3/2003 | Anabtawi et al. |
| 2003/0046199 A1 | 3/2003 | Murase et al. |
| 2003/0050942 A1 | 3/2003 | Ruellan et al. |
| 2003/0055666 A1 | 3/2003 | Roddy et al. |
| 2003/0055868 A1 | 3/2003 | Fletcher et al. |
| 2003/0061137 A1 | 3/2003 | Leung et al. |
| 2003/0061158 A1 | 3/2003 | Guy et al. |
| 2003/0069837 A1 | 4/2003 | Mills et al. |
| 2003/0074296 A1 | 4/2003 | Blanchard et al. |
| 2003/0074423 A1 | 4/2003 | Mayberry et al. |
| 2003/0093402 A1 | 5/2003 | Upton |
| 2003/0093403 A1 | 5/2003 | Upton |
| 2003/0093470 A1 | 5/2003 | Upton |
| 2003/0093575 A1 | 5/2003 | Upton |
| 2003/0097286 A1 | 5/2003 | Skeen |
| 2003/0101087 A1 | 5/2003 | Walker et al. |
| 2003/0101190 A1 | 5/2003 | Horvitz et al. |
| 2003/0110112 A1 | 6/2003 | Johnson et al. |
| 2003/0110315 A1 | 6/2003 | Upton |
| 2003/0114967 A1 | 6/2003 | Good |
| 2003/0115548 A1 | 6/2003 | Melgar |
| 2003/0115572 A1 | 6/2003 | Zondervan et al. |
| 2003/0120464 A1 | 6/2003 | Taft et al. |
| 2003/0120502 A1 | 6/2003 | Robb et al. |
| 2003/0120509 A1 | 6/2003 | Bruch et al. |
| 2003/0120526 A1 | 6/2003 | Altman et al. |
| 2003/0120586 A1 | 6/2003 | Litty et al. |
| 2003/0120665 A1 | 6/2003 | Fox et al. |
| 2003/0125992 A1 | 7/2003 | Rogers et al. |
| 2003/0126047 A1 | 7/2003 | Hollar et al. |
| 2003/0126048 A1 | 7/2003 | Hollar et al. |
| 2003/0126063 A1 | 7/2003 | Reuter et al. |
| 2003/0126098 A1 | 7/2003 | Hine et al. |
| 2003/0130966 A1 | 7/2003 | Thompson et al. |
| 2003/0131073 A1 | 7/2003 | Lucovsky et al. |
| 2003/0135447 A1 | 7/2003 | Blanz et al. |
| 2003/0135584 A1 | 7/2003 | Roberts et al. |
| 2003/0139985 A1 | 7/2003 | Hollar et al. |
| 2003/0139993 A1 | 7/2003 | Feuerverger |
| 2003/0140057 A1 | 7/2003 | Thomas et al. |
| 2003/0145047 A1 | 7/2003 | Upton |
| 2003/0145067 A1 | 7/2003 | Cover et al. |
| 2003/0149600 A1 | 8/2003 | Williams |
| 2003/0154111 A1 | 8/2003 | Dutra et al. |
| 2003/0154142 A1 | 8/2003 | Ginsburg et al. |
| 2003/0177133 A1 | 9/2003 | Hikida |
| 2003/0187765 A1 | 10/2003 | Sgaraglio |
| 2003/0200151 A1 | 10/2003 | Ellenson et al. |
| 2003/0216976 A1 | 11/2003 | Ehrman et al. |
| 2003/0216995 A1 | 11/2003 | DePauw et al. |
| 2003/0225643 A1 | 12/2003 | Kakoschke |
| 2003/0225707 A1 | 12/2003 | Ehrman et al. |
| 2004/0001575 A1 | 1/2004 | Tang |
| 2004/0015394 A1 | 1/2004 | Mok et al. |
| 2004/0019516 A1 | 1/2004 | Puskorius et al. |
| 2004/0036716 A1 | 2/2004 | Jordahl |
| 2004/0039504 A1 | 2/2004 | Coffee et al. |
| 2004/0039612 A1 | 2/2004 | Fitzgerald et al. |
| 2004/0039678 A1 | 2/2004 | Fralic |
| 2004/0054600 A1 | 3/2004 | Shike et al. |
| 2004/0064393 A1 | 4/2004 | Luenberger |
| 2004/0073468 A1 | 4/2004 | Vyas et al. |
| 2004/0075581 A1 | 4/2004 | Staniszewski |
| 2004/0078318 A1 | 4/2004 | Miller |
| 2004/0088104 A1 | 5/2004 | Izbicki et al. |
| 2004/0093134 A1 | 5/2004 | Barber et al. |
| 2004/0107144 A1 | 6/2004 | Short |
| 2004/0111330 A1 | 6/2004 | Stanton |

(56) References Cited

U.S. PATENT DOCUMENTS

| | | |
|---|---|---|
| 2004/0122621 A1 | 6/2004 | Vezzu et al. |
| 2004/0133456 A1 | 7/2004 | Nagelvoort |
| 2004/0148241 A1 | 7/2004 | Qi et al. |
| 2004/0153356 A1 | 8/2004 | Lockwood et al. |
| 2004/0172227 A1 | 9/2004 | Aragones |
| 2004/0172260 A1 | 9/2004 | Junger et al. |
| 2004/0172304 A1 | 9/2004 | Joao |
| 2004/0186620 A1 | 9/2004 | Chirnomas |
| 2004/0215630 A1 | 10/2004 | Parekh et al. |
| 2004/0243423 A1 | 12/2004 | Rix et al. |
| 2004/0243619 A1 | 12/2004 | Kelly et al. |
| 2005/0021378 A1 | 1/2005 | Weinstock et al. |
| 2005/0055351 A1 | 3/2005 | Barton et al. |
| 2005/0091087 A1 | 4/2005 | Smith et al. |
| 2005/0119921 A1 | 6/2005 | Fitzgerald et al. |
| 2005/0125261 A1 | 6/2005 | Adegan |
| 2005/0144048 A1 | 6/2005 | Belanger et al. |
| 2005/0171900 A1 | 8/2005 | Onneken |
| 2005/0187833 A1 | 8/2005 | Royer et al. |
| 2005/0197866 A1 | 9/2005 | Salcedo et al. |
| 2005/0216385 A1 | 9/2005 | Schneider |
| 2005/0228756 A1 | 10/2005 | Bealke et al. |
| 2005/0234792 A1 | 10/2005 | Gagnon et al. |
| 2005/0246206 A1 | 11/2005 | Obora et al. |
| 2006/0031041 A1 | 2/2006 | Afshar et al. |
| 2006/0035692 A1 | 2/2006 | Kirby et al. |
| 2006/0140348 A1 | 6/2006 | Wallace et al. |
| 2006/0190273 A1 | 8/2006 | Wilbrink et al. |
| 2006/0265235 A1 | 11/2006 | Schuchardt et al. |
| 2007/0174081 A1 | 7/2007 | Smith et al. |
| 2007/0198311 A1 | 8/2007 | Menendez et al. |
| 2007/0203777 A1 | 8/2007 | Berkey et al. |
| 2007/0239494 A1 | 10/2007 | Stephens et al. |
| 2007/0260496 A1 | 11/2007 | Weinstock et al. |
| 2007/0271124 A1 | 11/2007 | Weinstock et al. |
| 2007/0271125 A1 | 11/2007 | Weinstock et al. |
| 2007/0271128 A1 | 11/2007 | Terrence Bolling |
| 2007/0294116 A1 | 12/2007 | Stephens et al. |
| 2008/0010105 A1 | 1/2008 | Rose et al. |
| 2008/0046261 A1 | 2/2008 | Cunningham |
| 2008/0097798 A1 | 4/2008 | DeVallance et al. |
| 2008/0133281 A1 | 6/2008 | Bolt et al. |
| 2008/0140460 A1 | 6/2008 | Smith et al. |
| 2008/0162199 A1 | 7/2008 | Smith et al. |
| 2008/0243562 A1 | 10/2008 | Weinstock et al. |
| 2008/0243563 A1 | 10/2008 | Weinstock et al. |
| 2008/0249814 A1 | 10/2008 | Weinstock et al. |
| 2009/0018859 A1 | 1/2009 | Purifoy et al. |
| 2009/0030747 A1 | 1/2009 | Smith et al. |
| 2009/0099732 A1 | 4/2009 | Pisz |
| 2009/0215466 A1 | 8/2009 | Ahl et al. |
| 2009/0216552 A1 | 8/2009 | Watrous |
| 2010/0023352 A1 | 1/2010 | Smith et al. |
| 2011/0153372 A1 | 6/2011 | Weinstock et al. |
| 2011/0153375 A1 | 6/2011 | Weinstock et al. |
| 2011/0313951 A1 | 12/2011 | Cook |
| 2012/0197672 A1 | 8/2012 | Smith et al. |
| 2012/0203580 A1 | 8/2012 | Smith et al. |
| 2012/0203581 A1 | 8/2012 | Smith et al. |
| 2012/0203582 A1 | 8/2012 | Smith et al. |
| 2013/0006469 A1 | 1/2013 | Green et al. |
| 2013/0041950 A1 | 2/2013 | Chan |
| 2013/0159033 A1 | 6/2013 | Weinstock et al. |
| 2013/0218614 A1 | 8/2013 | Weinstock et al. |
| 2013/0238373 A1 | 9/2013 | Smith et al. |
| 2013/0246104 A1 | 9/2013 | Weinstock et al. |
| 2014/0052478 A1 | 2/2014 | Weinstock et al. |
| 2014/0067429 A1 | 3/2014 | Lowell |
| 2014/0095228 A1 | 4/2014 | Smith et al. |
| 2014/0106712 A1 | 4/2014 | Scholz et al. |
| 2014/0200760 A1 | 7/2014 | Kaufmann et al. |
| 2014/0278572 A1 | 9/2014 | Mullen et al. |
| 2015/0158447 A1 | 6/2015 | Nonaka |
| 2015/0163832 A1 | 6/2015 | Hosey et al. |
| 2015/0172894 A1 | 6/2015 | Gabel |
| 2015/0178852 A1* | 6/2015 | Mullen ............... G07C 5/008 705/4 |
| 2020/0265655 A1* | 8/2020 | Ha ........................ H04W 4/40 |
| 2020/0267503 A1* | 8/2020 | Watkins ............... H04W 4/027 |
| 2021/0225094 A1 | 7/2021 | Salodkar et al. |

FOREIGN PATENT DOCUMENTS

| | | |
|---|---|---|
| JP | 2002074126 A | 3/2002 |
| WO | 99/66738 A1 | 12/1999 |
| WO | 0052601 A1 | 9/2000 |
| WO | 01/97072 A2 | 12/2001 |
| WO | 0221314 A2 | 3/2002 |
| WO | 02/29675 A2 | 4/2002 |
| WO | 02057873 A2 | 7/2002 |
| WO | 02067079 A2 | 8/2002 |
| WO | 02067175 A2 | 8/2002 |
| WO | 02080646 A2 | 10/2002 |
| WO | 02097700 A2 | 12/2002 |
| WO | 03067851 A1 | 8/2003 |
| WO | 2007062047 A2 | 5/2007 |
| WO | 2008073427 A2 | 6/2008 |
| WO | 2014207558 A2 | 12/2014 |

OTHER PUBLICATIONS

Ye, Hao, et al. "Machine learning for vehicular networks: Recent advances and application examples." IEEE vehicular technology magazine 13.2 (2018): 94-101. (Year: 2018).*

Fogue, Manuel, et al. "A system for automatic notification and severity estimation of automotive accidents." IEEE Transactions on mobile computing 13.5 (2013): 948-963. (Year: 2013).*

Examiner's Answer for U.S. Appl. No. 09/698,491 dated Jun. 5, 2007.

Examiner's Answer for U.S. Appl. No. 09/698,502 dated Apr. 25, 2005.

Examiner's Answer for U.S. Appl. No. 09/698,502 dated Mar. 7, 2007.

Examiner's Answer for U.S. Appl. No. 09/698,552 dated Dec. 9, 2008.

Examiner's Answer for U.S. Appl. No. 09/698,552 dated Jun. 28, 2007.

Examiner's Answer for U.S. Appl. No. 09/698,552 dated Mar. 8, 2007.

Specification and Drawings for U.S. Appl. No. 09/698,491.
Specification and Drawings for U.S. Appl. No. 09/698,502.
Specification and Drawings for U.S. Appl. No. 09/698, 552.
Office Action for U.S. Appl. No. 13/025,617 dated Apr. 27, 2012.
Response to Office Action for U.S. Appl. No. 11/823,782 dated Feb. 17, 2011.
Response to Office Action for U.S. Appl. No. 11/881.216 dated Sep. 28, 2011.
Response to Office Action for U.S. Appl. No. 11/881,383 dated Sep. 6, 2011.
Response to Office Action for U.S. Appl. No. 11/929,277 dated Aug. 18, 2011.
Response to Office Action for U.S. Appl. No. 11/929,350 dated Aug. 30, 2011.
U.S. Appl. No. 60/194,128, Aquila.
Notice of Allowance for U.S. Appl. No. 11/747,645 dated Dec. 28, 2011.
Office Action for U.S. Appl. No. 11/747,645 dated Aug. 27, 2010.
Office Action for U.S. Appl. No. 11/868,266 dated Sep. 30, 2010.
Office Action for U.S. Appl. No. 12/179,071 dated Sep. 14, 2010.
Office Action for U.S. Appl. No. 11/609,844 dated Mar. 23, 2011.
Response to Office Action for U.S. Appl. No. 11/747,645 dated Aug. 27, 2010.
Response to Office Action for U.S. Appl. No. 11/868,266 dated Sep. 30, 2010.
Response to Office Action for U.S. Appl. No. 11/929,277 dated Oct. 12, 2010.
Response to Office Action for U.S. Appl. No. 12/179,071 dated Sep. 14, 2010.

(56) References Cited

OTHER PUBLICATIONS

Prosecution History for U.S. Appl. No. 11/609,844, filed Dec. 12, 2006 (as of Apr. 20, 2011).
U.S. Appl. No. 09/596,024, filed Jun. 15, 2000, Shaffer et al.
U.S. Appl. No. 09/678,752, filed Oct. 3, 2000, Shaffer et al.
"AALA01: Lease Settlement Adjustment Direct Entry", Apr. 8, 1997.
AALD01: Lease Unit Settlement, Jun. 1996.
Orion Systems, Ltd., System Overview and Handheld Terminals, downloaded from www.orsys.com on Dec. 1, 1997, pp. 1-5.
Orion Systems, Ltd., System Overview with Screens and Reports, May 1996.
Our Packages Come In All Sizes!, Nov. 1999, pp. 1-2.
PGMR, ECARS—Enterprise Computer Assisted Rental System, pp. 1-4.
Preview Travel, Inc., Car Reservations, 1999.
Rental 101, pp. 1-30.
Rental Redesign Requirements—Contract Process, pp. 1-5, Feb. 16, 2000.
Rental Redesign Requirements Contract, pp. 1-56, Feb. 15, 2000.
Rental Redesign, Rental Management, RMS (Rental Management Services), Sep. 30, 1998, pp. 1-2.
Rosen, Cheryl, "OTA Debuts Data Protocol", Business Travel News, Jan. 10, 2000.
Rosen, Cheryl, "OTA Publishes XML Data Standard", Business Travel News, pp. 1-2, Mar. 20, 2000.
The ARMS Connection, Safeco/Enterprise Rent-A-Car, pp. 1-4.
The Connection, State Farm Insurance/Enterprise Rent-A-Car, Rental Process Automation and Procedures, pp. 1-3.
The Hertz Corporation, 1998.
TSD Brochure, "Are You Comparing Apples to Apples When Choosing Rental Software", pp. 1-3.
TSD Brochure, RENT 2000 from TSD, Rental Management Software, Revolutionize the Way You Do Business, pp. 1-29.
TSD Brochure, Rent 2000 from TSD, Rental Management Software, Revolutionize the Way You Do Business with the Proven Solution, pp. 1-2.
Warner, Fara, "Car Race in Cyberspace".
Welcome to ARMS/400, New York State Rollout and Implementation Session, Oct. 28, 1999, pp. 1-51.
Welcome to the Data Warehouse, Jun. 2000, pp. 1-2.
Interactions, vol. 1, No. 3, Jul. 1992.
Interactions, Special Edition, vol. 1, No. 4, Aug. 1992.
Interactions, vol. 1, No. 5, Sep. 1992.
Interactions, Special Edition, Nov. 1992.
Interactions, vol. 1, No. 8, Dec. 1992.
Interactions, vol. 2, No. 1, Jan. 1993.
Interactions, vol. 2, No. 5, May 1993.
Interactions, vol. 2, No. 7, Jul. 1993.
Interactions, vol. 2, No. 8, Aug. 1993.
Interactions, vol. 2, No. 11, Oct. 1, 1993.
Interactions, vol. 2, No. 13, Nov. 1, 1993.
Interactions, vol. 2, No. 14, Nov. 15, 1993.
Interactions, Published especially for our Farmers adjusters, 1994.
Interactions, vol. 3, No. 1, Jan. I, 1994.
Interactions, vol. 3, No. 1, Jan. 15, 1994.
Interactions, ARMS, vol. 3, No. 6, Mar. 15, 1994.
Interactions, vol. 3, No. 8, Apr. 15, 1994.
Interactions, vol. 3, No. 10, May 15, 1994.
Interactions, vol. 3, No. 11, Jun. 1, 1994.
Interactions, vol. 3, No. 12, Jun. 15, 1994.
Interactions, vol. 3, No. 14, Jul. 15, 1994.
Interactions, vol. 3, No. 15, Aug. 1, 1994.
Interactions, vol. 3, No. 21, Nov. 1, 1994.
Interactions, vol. 3, No. 23, Dec. 1, 1994.
Interactions, vol. 4, No. 3, Feb. 1, 1995.
Interactions, "Electronic Connections", p. 3, Mar. 15, 1995.
Interactions, vol. 4, No. 6, Mar. 15, 1995.
Interactions, vol. 4, No. 9, May 1, 1995.
Interactions, vol. 4, Issue 14, Jul. 15, 1995.
Interactions, vol. 4, Issue 16, Aug. 15, 1995.
Prosecution History for U.S. Appl. No. 11/929,277, filed Oct. 30, 2007 Parts 1 & 2 (as of Nov. 16, 2011).
Prosecution History for U.S. Appl. No. 11/929,350, filed Oct. 30, 2007 Parts 1 & 2 (as of Nov. 16, 2011).
Office Action for U.S. Appl. No. 1 1/881.216 dated Sep. 28, 2011.
Jul. 11, 2018—U.S. Non-Final Office Action—U.S. Appl. No. 15/009,418.
Travel Web site Expedia's shares takes off during initial offering, Reeves, Nov. 1999, Denver Post, p. C-02, entire document.
Copyright Chronicle Publishing Company, May 2, 1997, "Booking a room, vehicle for vacation via the 'Net", Pantagraph, C. 1.
Yenckel, James T., Feb. 11, 1996, "For This Cyberspace Visitor, Once Is More Than Enough", The Washington Post (Pre-1997 Fulltext), ISSN 01908286, p. E.01.
U.S. Appl. No. 60/194,128, Aquila. "Information on Hertz Corporation"; Sep. 24, 2002; pp. 1-61. "Welcome to the Hertz Interactive Reservation Process"; Mar. 3, 2000; pp. 62-27.
"All Open Orders for Customer No. 218556"; Motorola Corporation; Nov. 23, 1999.
ARMS/400 Update, Mar. 15, 2000, pp. I-4.
Office Action for U.S. Appl. No. 10/343,576 dated Aug. 3, 2009.
Office Action for U.S. Appl. No. 10/343,576 dated Nov. 19, 2008.
U.S. Appl. No. 09/564,911, filed May 4, 2000 (Williams).
U.S. Appl. No. 09/694,050, filed Oct. 20, 2000 (Weinstock et al.).
U.S. Appl. No. 09/698,491, filed Oct. 27, 2000 (Menendez et al.).
U.S. Appl. No. 09/698,502, filed Oct. 27, 2000 (Menendez et al.).
U.S. Appl. No. 09/698,552, filed Oct. 27, 2000 (Menendez et al.).
U.S. Appl. No. 60/828,540, filed Oct. 6, 2006 (Smith et al.).

* cited by examiner

≡ System Logo — 502

← Triage Inbox

Send New Selectable Object — 514

Triage Inbox

In Progress (735)

512 — Completed (20)

Expired (1115)

Create New Selectable Object — 504

Assigned Handler
510 — User ID ▼

Digital Request Information — 508

* Digital Request Number

* Digital Request Type
  ⦿ Insured
  ○ Digital Requester
  ○ Theft
  ○ Uninsured

* Date of Occurrence
  [ 📅 ]

Digital Requester Information — 506

* First Name     * Last Name

* Home Address 1     * Home Address 2

* City     * Country     * State     * ZIP
           Country ▼    State ▼

* Phone

* Email

Object

SYSTEMS AND METHODS FOR INTELLIGENTLY TRANSFORMING DATA TO GENERATE IMPROVED OUTPUT DATA USING A PROBABILISTIC MULTI-APPLICATION NETWORK

CROSS-REFERENCE

The present application is a continuation of U.S. patent application Ser. No. 18/382,418, filed on Oct. 20, 2023, all the contents and disclosures of which are hereby incorporated by reference in their entirety for all purposes.

TECHNICAL FIELD

The present disclosure relates to systems and methods for intelligently transforming data to generate improved output data using a probabilistic multi-application network.

BACKGROUND

Generating output data based on data from discrete sources is a critical aspect of many industries and commercial products. Integrating and leveraging data from multiple devices, applications, networks, and/or domains, including those associated with one or more multi-device or multi-application networks, is needed to facilitate process optimizations, data inputs and outputs, efficient data cataloging, data tracking, incident handling, data contextualization, location determination or monitoring, and data storage. In particular, during or following an incident, a participant of the incident may have to contact multiple interested parties in response to the incident in order to submit disparate data inputs and receive disparate data outputs related to such incident or participant, including redundant or repetitive data inputs and data outputs. The interested parties may include large entities, small entities, or single individuals with disparate devices, applications, networks, and/or domains associated with one or more multi-device or multi-application networks with disparate interfaces or other means for receiving data inputs and generating and sending data outputs. Contact and coordination of data by an incident participant with a multitude of interested parties, each with unique interfaces or other means for receiving data inputs and generating and sending data outputs, is often an arduous process for an incident participant and the interested parties alike. By implementing a multi-application network for an incident participant to communicate and coordinate in a predictable and efficient manner with some or all interested parties, information sharing, gathering, generating, transformation, collection, storage, and output will be streamlined and improved over existing methods and systems for generating output data during or following an incident.

SUMMARY

The present disclosure is directed to systems and methods for intelligently transforming data to generate improved output data, including devices, applications, networks, and/or domains that implement one or more multi-device or multi-application networks. The systems and methods, for example, may include a method of transforming data using a probabilistic network and a knowledge base generated using historic data to generate improved output data, or a system capable of performing such method, the method comprising receiving, at one or more first servers from a first computing device, first data, wherein the first data is associated with a first user and associated with a first incident object associated with the first user. The systems and methods may further include generating, at the one or more first servers, in response to receiving, at the one or more servers from a first computing device, first data, a first computing object. The systems and methods may also include transmitting, from the one or more first servers to the first computing device, the first computing object. The systems and methods may include receiving, at one or more first servers from the first computing device, a first selection, wherein the first selection comprises a selection, by the first user, associated with the first computing object. The systems and methods may include transmitting, from the one or more first servers to the first computing device, a data collection computing input tool. The systems and methods may include receiving, at one or more first servers from the first computing device, a second selection, wherein the second selection comprises a selection, by the first user, associated with the data collection computing input tool. The systems and methods may include receiving, at one or more first servers from the first computing device, second data, wherein the second data is associated with a first incident object of the first user, and wherein the second data comprises a first image of the first incident object from a first angle. The systems and methods may include transmitting, from the one or more first servers to one or more second servers, the second data, wherein the second data indicates at least one characteristic resulting from an incident associated with the first incident object, wherein the at least one characteristic resulting from an incident associated with the first incident object is identifiable (or not identifiable) in the first image of the first incident object from the first angle. The systems and methods may include transforming, at the one or more second servers, the second data, wherein transforming the second data comprises comparing, at the one or more second servers, the second data and the first data to historic data, wherein the historic data is associated with one or more data of the first data and one or more data of the second data, and wherein comparing the second data and the first data to the historic data comprises the steps of generating or accessing, at the one or more second servers, a probabilistic network of the historic data, wherein the probabilistic network comprises a relationship between two or more data of the historic data, wherein the relationship between the two or more data of the historic data comprises one or more probabilities; processing, using at least one processor at the one or more second servers, the historic data, using the probabilistic network, into processed historic data; generating, using the at least one processor at the one or more second servers, one or more machine learning models for producing a knowledge base; producing, using the at least one processor at the one or more second servers and the one or more machine learning models, the knowledge base, wherein the knowledge base is trained to recognize one or more patterns of the processed historic data; and generating, using the at least one processor at the one or more second servers and the knowledge base, one or more data groups, wherein the one or more data groups are associated with at least one of the one or more patterns of the processed historic data, and wherein the one or more data groups are used to transform the second data and the first data, based on the associated at least one of the one or more patterns of the historic data, into modified data. The systems and methods may further include transforming, using the at least one processor at the one or more second servers and the one or more data groups, the second data and the first data into modified data, wherein the modified data is based on the historic data, the first data, and the second data. The systems and methods may include transmitting, from the one or more second servers to the one or more first servers, the modified data. The systems and methods may include generating, from the one or more first servers, first output data, wherein the first output data is based in part on the modified data, and wherein the first output data comprises one or more first locations, and wherein the one or more first locations is based on one or more of a second location associated with the first user or the first computing device and a third location associated with a first user input, wherein the first user input is received, at the one or more first servers, from the first computing device. The systems and methods may also include transmitting, from the one or more servers to the first computing device, the first output data.

These and other implementations may each optionally include one or more of the following features. A data engine may be further used to generate, for example, at least context data (e.g., new or updated context data) associated with a digital request data object, first computing object, or first computing operation result. In one embodiment, the context data indicates one or more of an exception event or a processing stage associated with the digital request data object, first computing object, or first computing operation result. Moreover, the data engine may be used to initiate the display of the context data or one or more vehicle data and/or the first computing result associated with the digital request data object on a graphical user interface or data collection computing input tool. The graphical user interface or data collection computing input tool may comprise, for example, a consolidation of a plurality of graphical user interfaces associated with a first application or a plurality of applications associated with the first set of operation recommendations, context data, or one or more vehicle data, or a condensation of a plurality of display elements associated with the first application or the plurality of applications.

The data engine may be used, according to some embodiments, to automatically format one or more of: the first computing operation (e.g., a machine learning or artificial intelligence (AI) operation) result or transformed or modified data for display on the first graphical user interface or data collection computing input tool based on the context data or vehicle data or transformed or modified data (e.g., the new or updated context data or vehicle data); or a second set of operation (e.g., a machine learning or AI operation) recommendations that are generated based on the first operation recommendation or the context data or vehicle data or transformed or modified data (e.g., the new or updated context data). Furthermore, the data engine may be used to detect, using the context data or vehicle data or transformed or modified data, an exception event associated with the digital request data object. Based on detecting the exception event, the data engine may be used to generate a second set of operation recommendations indicating a stage-wise progression of operations that resolve the exception event. In one embodiment, the data engine may transmit the second set of operation (e.g., a machine learning or AI operation) recommendations for display on a first computing device. In some embodiments, the multi-application network is configured for multi-application data processing associated with a plurality of domains comprised in a digital processing space. In addition, the first application may comprise one of: an application native to the multi-application network; or an application that is not native to the multi-application network. In some embodiments, the parametric data referenced above in association with digital request data object comprises one or more identifier data associated with the digital request data object and/or quantitative data associated with the digital request data object and/or exception event data associated with the digital request data object. Furthermore, the data model (e.g., a machine learning or AI model) may be configured to track or assimilate a trajectory of a plurality of input commands including the first input command leading to a selection of specific operation recommendations including the first operation recommendation. Based on the tracking, the data model (e.g., a machine learning or AI model) may be optimized and used by the data engine to recommend a second set of operation recommendations for display on a graphical user interface or data collection computing input tool associated with the first computing device or a second computing device.

BRIEF DESCRIPTION OF THE DRAWINGS

The disclosure is illustrated by way of example and not by way of limitation in the figures of the accompanying drawings. Like reference numerals in the figures may be used to refer to similar elements. It is emphasized that various features may not be drawn to scale and the dimensions of various features may be arbitrarily increased or reduced for clarity of discussion. Further, some components may be omitted in certain figures for clarity of discussion. It is expressly understood that the description and drawings are only for the purpose of illustration and as an aid to understanding and are not intended as a definition of the limits of the invention.

FIG. 5 shows a potential embodiment of an interface or data collection computing input tool for collection and compilation of digital request data or vehicle data or modified, transformed, or output data for alteration and configuration by the multi-application network.

FIGS. 25a-1 and 25a-2 show a potential flowchart associated with an embodiment of methods and systems for transforming data using a probabilistic network and a knowledge base to generate improved output data.

FIGS. 25e-1 and 25e-2 shows a potential flowchart associated with an alternative embodiment of methods and systems for transforming data using a probabilistic network and a knowledge base to generate improved output data.

FIGS. 25f-1 and 25f-2 shows a potential flowchart associated with an alternative embodiment of methods and systems for transforming data using a probabilistic network and a knowledge base to generate improved output data.

DETAILED DESCRIPTION

Multi-Application Network

It is increasingly necessary to leverage computational tools (e.g., machine learning elements such as training data or historic data, probabilistic network(s), machine learning model(s), one or more knowledge bases for pattern recognition, one or more data groups or artificial intelligence (AI) features, categories, columns, or rows) that automatically recognize relationships among a plurality of disparate data (e.g., vehicle data or modified, transformed, or output data) associated with a multi-application network, and suggest, estimate, predict, assess, or otherwise recommend operations for transforming or modifying data that can be executed to make such disparate data more meaningful, insightful, and readily ingestible or accessible by other computing systems or applications for further processing or analysis or use by a user of the multi-application network or a third party. There is therefore a need to develop a multi-application network that can recommend operations for transforming or modifying data based on data relationships (e.g., between historic data and new input data) in order to eliminate or otherwise minimize time constraints associated with computing operations within the multi-application network. Furthermore, the cost in terms of time, accuracy, and user experience (e.g., navigating multiple similar or dissimilar tools/interfaces, such as multiple data collection computing input tools) associated with data collection, analysis, transformation, modification, or output can affect productivity and/or workflow efficiency, computational or otherwise, within the multi-application network.

Figure 1:
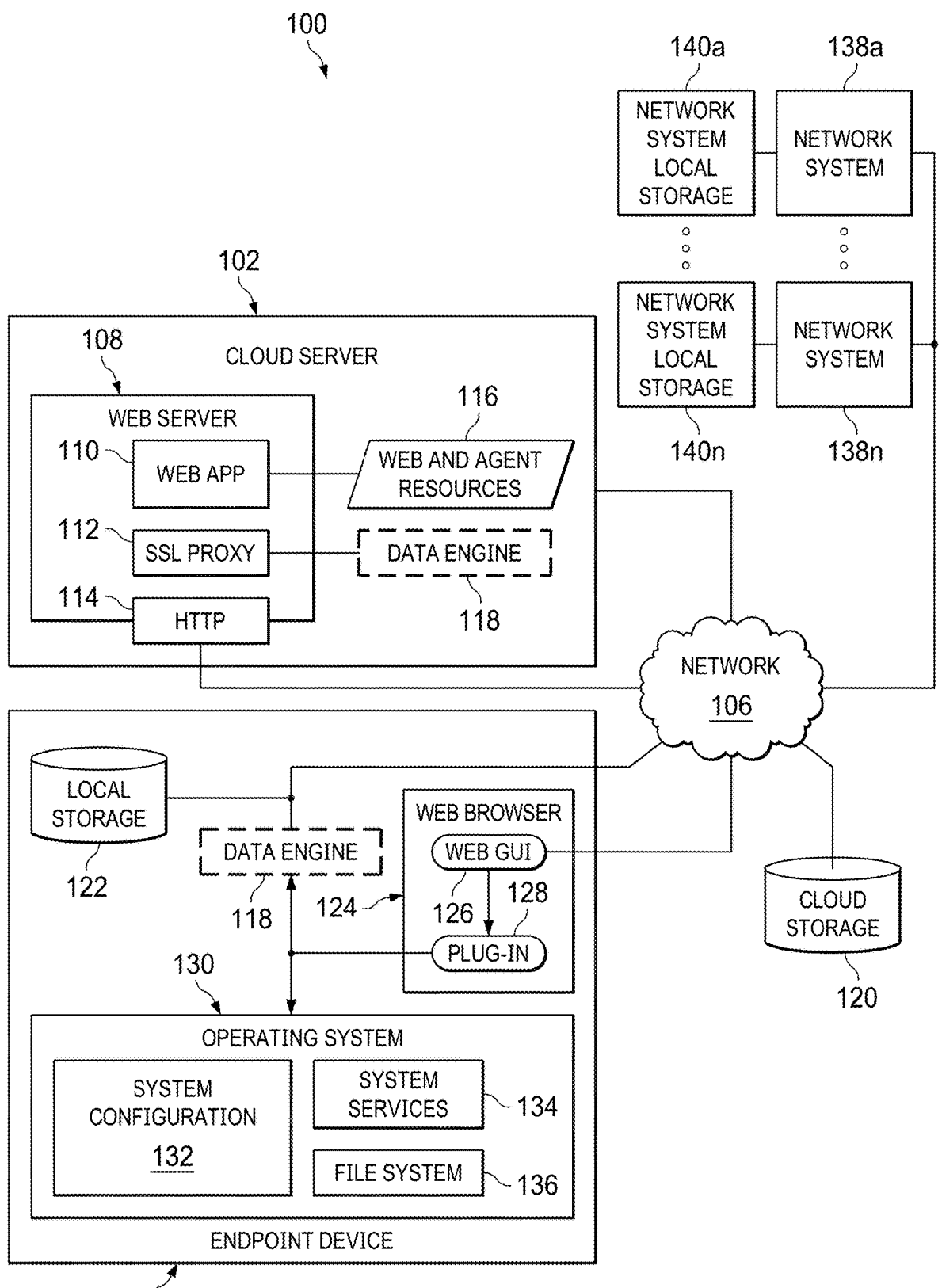
FIG. 1 is a high-level network and system diagram of a potential implementation of a multi-application network, in accordance with some embodiments of this disclosure.

Illustrated in FIG. 1 is a high-level diagram of a potential system 100 providing one implementation of a multi-application network. In the illustrated implementation, the system 100 may include a cloud server 102 communicatively coupled to a plurality of network systems 138a . . . 138n via a network 106. The system 100 may also include an endpoint device 104, which may be one or more computing devices such as mobile phones, laptop or desktop computers, smart or Internet of Things (IoT) devices, network-enabled devices such as smart or connected vehicles or related devices such as those providing internet, voice, or emergency assistance, and cloud storage 120, which may include one or more databases, communicatively coupled via the network 106. While a single cloud server 102 and a single endpoint device 104 are illustrated, the disclosed principles and techniques could be expanded to include multiple cloud servers, multiple endpoints or computing devices, and multiple cloud storage devices such as multiple databases.

In some embodiments, the cloud server 102 may include a computing device such as a mainframe server, a content server, a communication server, a laptop computer, a desktop computer, a handheld computing device, a smart phone, a wearable computing device, a tablet computing device, a virtual machine, a mobile computing device, a cloud-based computing solution and/or a cloud-based service, smart or Internet of Things (IoT) devices, network-enabled devices such as smart or connected vehicles or related devices such as those providing internet, voice, or emergency assistance, and/or the like. The cloud server 102 may include a plurality of computing devices configured to communicate with one another and/or implement the techniques described herein.

In some embodiments, the endpoint device 104 may include or constitute a computing device such as a mainframe server, a content server, a communication server, a laptop computer, a desktop computer, a handheld computing device, a smart phone, a wearable computing device, a tablet computing device, a virtual machine, a mobile computing device, a cloud-based computing solution and/or a cloud-based service, smart or Internet of Things (IoT) devices, network-enabled devices such as smart or connected vehicles or related devices such as those providing internet, voice, or emergency assistance, and/or the like.

Figure 2:
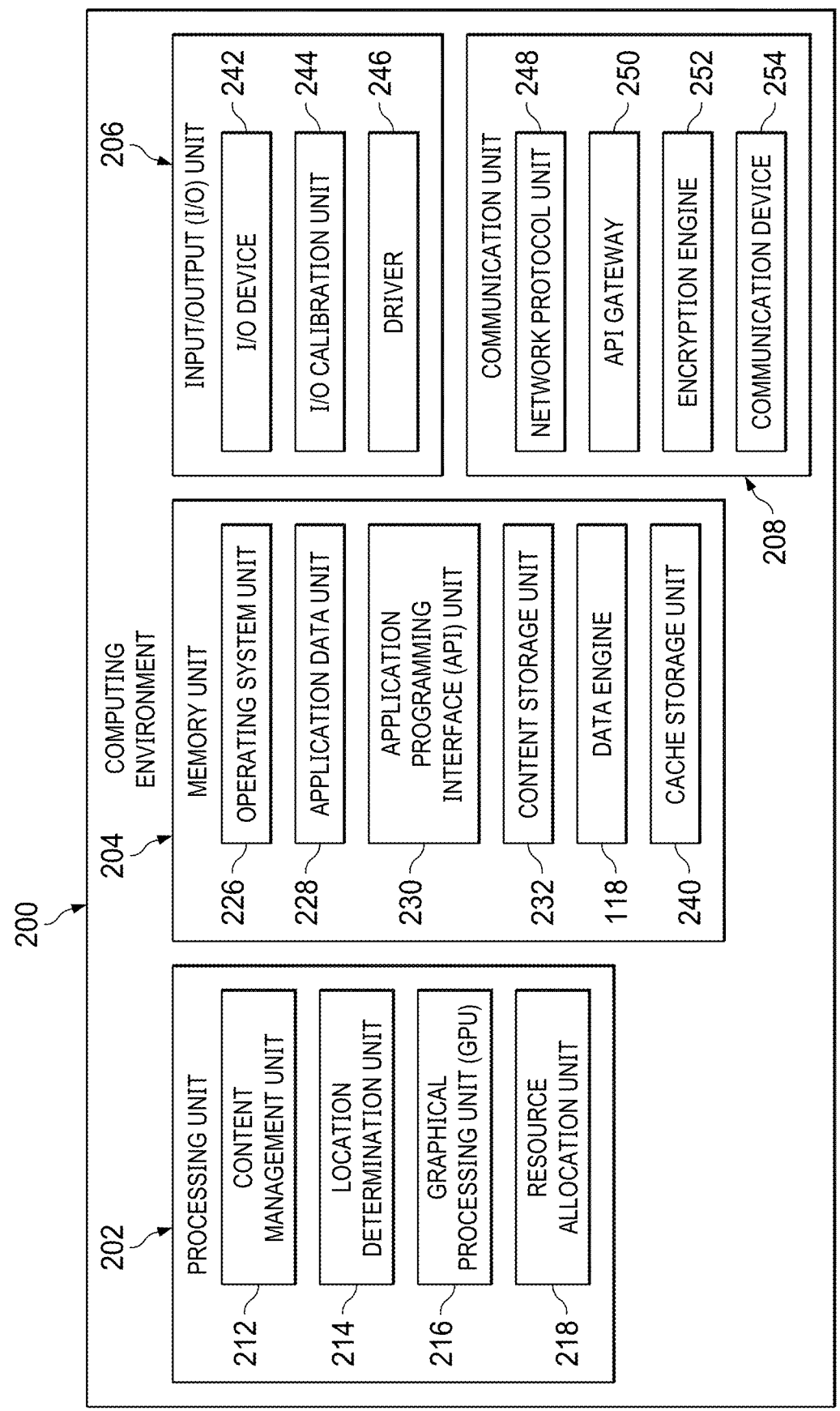
FIGS. 2 and 3 illustrate potential functional and system diagrams, respectively, of a computing environment for implementing a multi-application network in accordance with some embodiments of this disclosure.
Figure 3:
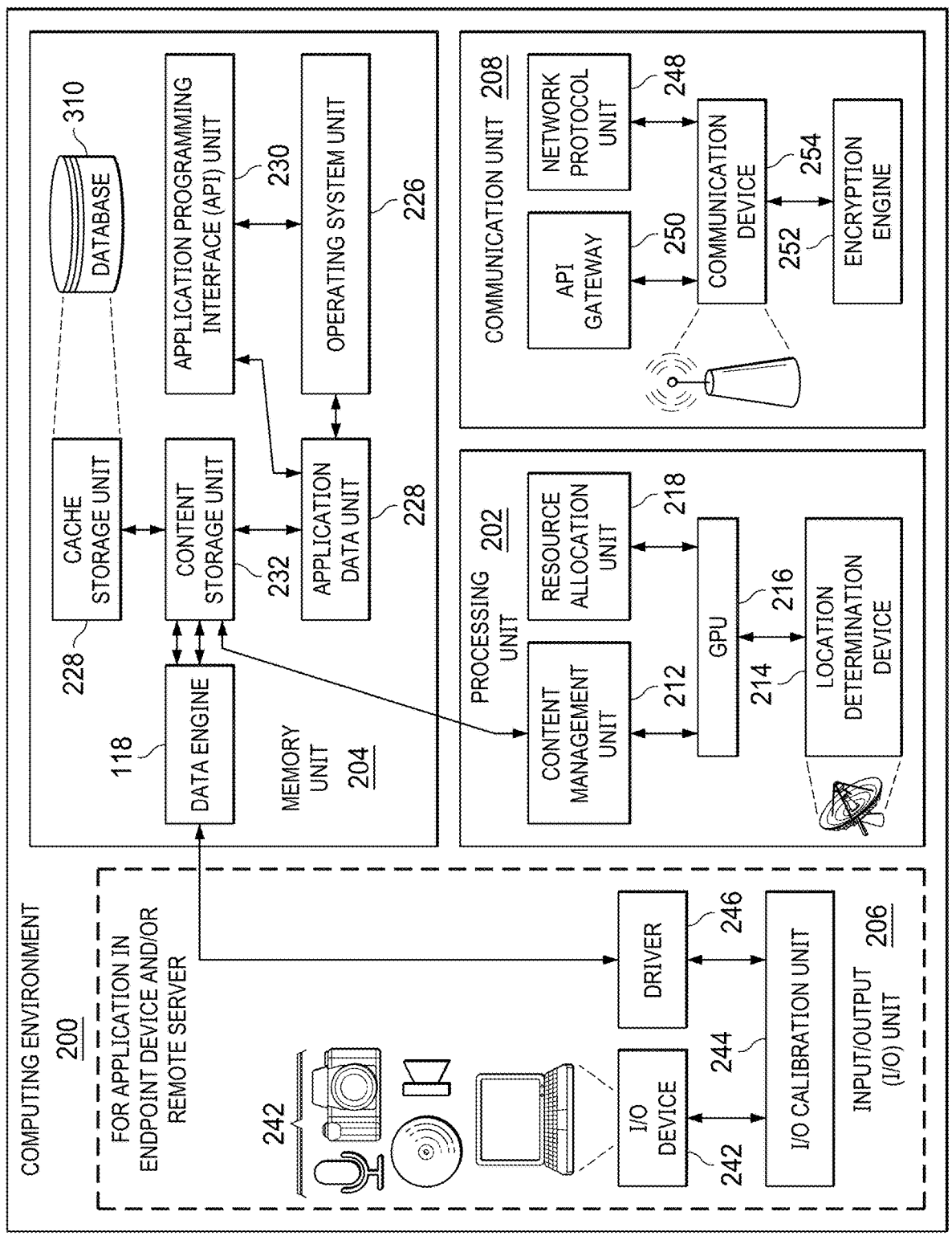

The cloud server 102 may include various elements of a computing environment as described in association with the computing environment 200 of FIGS. 2 and 3. For example, the cloud server 102 may include processing unit 202, a memory unit 204, an input/output (I/O) unit 206, and/or a communication unit 208 which are discussed in association with FIGS. 2 and 3. The cloud server 102 may further include subunits and/or other modules for performing operations associated with a multi-application network such as registering a digital command or received data in a multi-application network, generating dynamic context data or transformed or modified data associated with a digital request data object or received data in a multi-application network, curating data, for example, by generating output data, associated with a multi-application network, and generating one or more digital records or data indicating computing operations (e.g., machine learning or AI operations) and/or state data or other data within a multi-application network. The cloud server may be locally or remotely operated as the case may require.

Turning back to FIG. 1, the cloud server 102 may include a web server 108, a data engine 118, and a web and agent resources 116. The web server 108, the data engine 118 and the web and agent resources 116 may be coupled to each other and to the network 106 via one or more signal lines. The one or more signal lines may comprise wired and/or wireless connections.

The web server 108 may include a secure socket layer (SSL) proxy 112 for establishing HTTP-based connectivity 114 between the cloud server 102 and other devices or systems coupled to the network 106. Other forms of secure connection techniques, such as encryption, may be employed on the web server 108 and across other systems coupled to the network 106. Additionally, the web server 108 may deliver artifacts (e.g., binary code, instructions, data, etc.) to the data engine 118 either directly via the SSL proxy 112 and/or via the network 106. Additionally, the web and agent resources 116 of the cloud server 102 may be provided to the endpoint device 104 via the web app 110 on the web server 108. The web and agent resources 116 may be used to render a web-based graphical interface (GUI or data collection computing input tool) 126 via the web browser 124 running on the endpoint device 104.

The data engine 118 may either be implemented on the cloud server 102 and/or on the endpoint device 104. The data engine 118 may include one or more instructions or computer logic that are executed by the one or more processors such as the processors discussed in association with FIGS. 2 and 3. In particular, the data engine may facilitate executing the processing procedures, methods, techniques, and workflows provided in this disclosure. Some embodiments include an iterative refinement of one or more data models (e.g., a machine learning model, large language model, the generation and refinement or updating of probabilistic networks, and the like) associated with the multi-application network disclosed via feedback loops executed by one or more computing device processors and/or through other control devices or mechanisms that make determinations regarding optimization of a given action, template, or model.

In some embodiments, the use of artificial intelligence and machine learning comprises an artificial intelligence engine or knowledge base that has an associated data model (e.g., a machine learning model) comprising a large language model and/or a data classifier, such as a probabilistic network, that can operate and/or is trained on textual data and/or image data and/or audio data and/or video data. For example, the textual data and/or image data and/or audio data and/or video data may be historic data or training data from one or more training data sets. For example, the large language model, according to some embodiments, comprises an artificial intelligence (AI) or a machine learning model configured to process or otherwise analyze vast amounts of character strings associated with spoken and/or written language. As another example, the data classifier comprises an AI or machine learning model generated by processing or otherwise analyzing historic data or training data from one or more training data sets for patterns by establishing a relationship between two or more data of such historic data or training data using a probabilistic network (e.g., a Bayesian network) or the like. The data classifier may further generate a knowledge base that is trained to recognize such patterns of processed or pre-processed historic or training data and generate one more data groups associated with such patterns to enable the transformation or modification of data based on such patterns. In an embodiment, a pattern includes a relationship between data that allows for the prediction of a likely outcome if similar data were substituted into such relationship.

In some embodiments, the data engine 118 may access an operating system 130 of the endpoint device 104 in order to execute the disclosed techniques on the endpoint device 104. For instance, the data engine 118 may gain access into the operating system 130 including the system configuration module 132, the file system 136, and the system services module 134 in order to execute computing operations (e.g., machine learning or AI operations or other non-machine learning or AI operations) associated with a multi-application network such as registering a digital command or selection in a multi-application network, generating dynamic context data or vehicle or modified or transformed data associated with a digital request data object, computing object, or computing operation result in a multi-application network, curating, modifying, transforming, and/or storing data associated with a multi-application network, and generating or accessing one or more digital records or data indicating computing operations (e.g., machine learning or AI operations) and/or state data or other data within a multi-application network. A plug-in 128 of the web browser 124 may provide needed downloads that facilitate operations executed by the operating system 130, the data engine 118, and/or other applications running on the endpoint device 104.

The network 106 may include a plurality of networks. For instance, the network 106 may include any wired and/or wireless communication network that facilitates communication between the cloud server 102, the cloud storage 120, and the endpoint device 104. The network 106, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, a 5G network, and/or the like.

The network systems 138a . . . 138n may include one or more computing devices or servers, services, or applications the can be accessed by the cloud server 102 and/or the endpoint device 104 and or the cloud storage 120 via the network 106. In one embodiment, the network systems 138a . . . 138n may comprise one or more endpoint device(s) or computing devices 104 or local server(s) 102. In one embodiment, the network systems 138a . . . 138n comprises third-party applications or services that are native or non-native to either the cloud server 102 and/or the endpoint device 104. The third-party applications or services, for example, may facilitate executing one or more computing operations associated with resolving an exception event associated with a digital request data. As further discussed below, the digital request data may comprise a document, selection, or file outlining one or more of: account data associated with a client request; or parametric data associated with resolving one or more exception events associated with the digital request data. According to some implementations, the applications or services associated with the network systems 138a . . . 138n and/or associated with the cloud server 102, and/or the endpoint device 104 must be registered to activate or otherwise enable their usage in the multi-application network. In such cases, the applications and/or services may be encapsulated in a registration object such that the registration object is enabled or activated for use by the data engine 118 based on one or more of: context data or vehicle data or modified or transformed data associated with a first user input or selection; device profile data associated with a first interface or data collection computing input tool through which the first user input was received; and user profile data associated with the user providing the first user input or selection. On the flip side, the applications and/or services may be encapsulated in a registration object such that the registration object is deactivated or blocked from usage by data engine 118 based on one or more of: context data or vehicle data or modified or transformed data associated with a second user input or selection; device profile data associated with a second interface or data collection computing input tool through which the second input was received; and user profile data associated with a user providing the second input or selection. The first and second user inputs or selections may both be textual or auditory and may comprise a natural language input, or they may both be object selections of a computing object of an interface or data collection computing input tool.

The cloud storage 120 may comprise one or more storage devices that store data, information and instructions used by the cloud server 102 and/or the endpoint device 104 such as, for example, one or more databases. The stored information may include information about users, information about data models (e.g., machine or other learning model, an artificial intelligence model, etc.), information associated with an object or incident of a user, a user object characteristic, digital request data, vehicle data, information about analysis operations executed by the data engine 118, or the like. In one embodiment, the one or more storage devices mentioned above in association with the cloud storage 120 can be non-volatile memory or similar permanent storage device and media. For example, the one or more storage devices may include a hard disk drive, a CD-ROM device, a DVD-ROM device, a DVD-RAM device, a DVD-RW device, a flash memory device, solid state media, or another mass storage device for storing information on a more permanent basis. While the cloud storage 120 is shown as being coupled to the cloud server 102 and the endpoint device 104 via the network 106, the data in the cloud storage 120 may be replicated, in some embodiments, on the cloud server 102 and/or the endpoint device 104. That is to say that a local copy of the data in the cloud storage 120 may be stored on the cloud server 102 and/or the endpoint device 104. This local copy may be synched with the cloud storage 120 so that when there are any changes to the information in the cloud storage 120, the local copy on either the cloud server 102 or the endpoint device 104 is also similarly updated or synched in real-time or in near-real-time to be consistent with the information in the cloud storage 120 and vice versa.

The endpoint device 104 may be a computing device, a smart phone, a tablet, a laptop computer, a desktop computer, a personal digital assistant (PDA), a smart device, a wearable device, a biometric device, a computer server, a virtual server, a virtual machine, a mobile device, a vehicle, a data collection device, a smart or Internet of Things (IoT) device, network-enabled device such as a smart or connected vehicle or related device such as those providing internet, voice, or emergency assistance, and/or a communication server. In some embodiments, the endpoint device 104 may include a plurality of computing devices configured to communicate with one another and/or implement the techniques described in this disclosure. It is appreciated that according to some implementations, the endpoint device may be used by a user to access the multi-application network for sending and or receiving data and/or executing a plurality of operations associated with a digital request data object, computing object, or computing operation result. The data engine 118 may use the multi-application network to communicate with the user transmitting and/or receiving data and to execute a plurality of analysis operations as further discussed below.

The local storage 122, shown in association with the endpoint device 104, may include one or more storage devices that store data, information, and instructions used by the endpoint device 104 and/or other devices coupled to the network 106. The stored information may include various logs/records or event files (e.g., exception event data associated with a digital request data object), security event data, image and/or video data, vehicle data, modified or transformed data, output data, or any other data described herein. The one or more storage devices discussed above in association with the local storage 122 can be non-volatile memory or similar permanent storage device and media. For example, the one or more storage devices may include a hard disk drive, a floppy disk drive, a CD-ROM device, a DVD-ROM device, a DVD-RAM device, a DVD-RW device, a flash memory device, solid state media, or some other mass storage device known in the art for storing information on a more permanent basis.

The network system local storages 140*a* . . . 140*n*, shown in association with one or more network systems 138*a* . . . 138*n*, may include one or more storage devices that store data, information, and instructions used by the one or more network systems 138*a* . . . 138*n* and/or other devices coupled to the network 106. The stored information may include various logs/records or event files (e.g., exception event data associated with a digital request data object), security event data, image and/or video data, vehicle data, modified or transformed data, output data, or any other data described herein. The one or more storage devices discussed above in association with the local storage 122 or network system local storages 140*a* . . . 140*n* can be non-volatile memory or similar permanent storage device and media. For example, the one or more storage devices may include a hard disk drive, a floppy disk drive, a CD-ROM device, a DVD-ROM device, a DVD-RAM device, a DVD-RW device, a flash memory device, solid state media, or some other mass storage device known in the art for storing information on a more permanent basis.

The other elements of the endpoint device 104 are discussed in association with the computing environment 200 of FIGS. 2 and 3. For example, elements such as a processing unit 202, a memory unit 204, an input/output (I/O) unit 206, and/or a communication unit 208 may execute one or more of the modules of endpoint device 104 and/or one or more elements of the cloud server 102 shown in FIG. 1. The endpoint device 104 may also include subunits and/or other computing instances as provided in this disclosure for performing operations associated with digital request data object and/or the multi-application network.

FIGS. 2 and 3 illustrate potential functional and system diagrams of a computing environment 200, according to some embodiments of this disclosure, a multi-application network, registering a digital command in a multi-application network, generating dynamic context data associated with a digital request data object in a multi-application network, curating data associated with a multi-application network such as image and/or video data, vehicle data, modified or transformed data, output data, or any other data described herein, and generating one or more digital records indicating computing operations and state data within a multi-application network. Specifically, FIG. 2 provides a functional block diagram of the computing environment 200, whereas FIG. 3 provides a detailed system diagram of the computing environment 200.

As seen in FIGS. 2 and 3, the computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described in this disclosure. Additionally, each unit and/or subunit may be operatively and/or otherwise communicatively coupled with each other and to the network 106. The computing environment 200 may be implemented on general-purpose hardware and/or specifically-purposed hardware as the case may be. Importantly, the computing environment 200 and any units and/or subunits of FIGS. 2 and/or 3 may be included in one or more elements of system 100 as described in association with FIG. 1. For example, one or more elements (e.g., units and/or subunits) of the computing environment 200 may be included in the cloud server 102 and/or the endpoint device 104 and/or the network systems 138a . . . 138n.

The processing unit 202 may control one or more of the memory unit 204, the I/O unit 206, and the communication unit 208 of the computing environment 200, as well as any included subunits, elements, components, devices, and/or functions performed by the memory unit 204, I/O unit 206, and the communication unit 208. The described sub-elements of the computing environment 200 may also be included in similar fashion in any of the other units and/or devices included in the system 100 of FIG. 1. Additionally, any actions described herein as being performed by a processor may be taken by the processing unit 202 of FIGS. 2 and 3 alone and/or by the processing unit 202 in conjunction with one or more additional processors, units, subunits, elements, components, devices, and/or the like. Further, while one processing unit 202 may be shown in FIGS. 2 and 3, multiple processing units may be present and/or otherwise included in the computing environment 200 or elsewhere in the overall system (e.g., system 100 of FIG. 1). Thus, while instructions may be described as being executed by the processing unit 202 (and/or various subunits of the processing unit 202), the instructions may be executed simultaneously, serially, and/or otherwise by one or multiple processing units 202 on one or more devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, exception event content, content associated with a digital request data object, content associated with a registration object (e.g., a registration data object associated with registering a command or an application for use by the multi-application network), media content, security event content, image and/or video data, vehicle date, modified or transformed data, output data, or any other data described herein, or any combination thereof. In some instances, content on which the content management unit 212 may operate includes device information, user interface or data collected and/or stored by the data collection computing input tool, image data, text data, themes, audio data or audio files, video data or video files, documents, and/or the like. Additionally, the content management unit 212 may control the audio-visual environment and/or appearance of application data during execution of various processes (e.g., via web GUI 126 at the endpoint device 104). In some embodiments, the content management unit 212 may interface with a third-party content server (e.g., third-party content server associated with the network systems 138a . . . 138n), and/or specific memory locations for execution of its operations.

The location determination unit 214 may facilitate detection, generation, modification, analysis, transmission, and/or presentation of location information. Location information may include global positioning system (GPS) coordinates, an internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information.

The GPU 216 may facilitate generation, modification, analysis, processing, transmission, and/or presentation of content described above, as well as any data described herein. In some embodiments, the GPU 216 may be utilized to render content for presentation on a computing device (e.g., via web GUI 126 at the endpoint device 104). The GPU 216 may also include multiple GPUs and therefore may be configured to perform and/or execute multiple processes in parallel.

The resource allocation unit 218 may facilitate the determination, monitoring, analysis, and/or allocation of computing resources throughout the computing environment 200 and/or other computing environments. For example, the computing environment may facilitate a high volume of data (e.g., data associated with a digital request data object or a registration object), to be processed and analyzed. As such, computing resources of the computing environment 200 used by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may include sensors and/or other specially-purposed hardware for monitoring performance of each unit and/or subunit of the computing environment 200, as well as hardware for responding to the computing resource needs of each unit and/or subunit. In some embodiments, the resource allocation unit 218 may use computing resources of a second computing environment separate and distinct from the computing environment 200 to facilitate a desired operation. For example, the resource allocation unit 218 may determine a number of simultaneous computing processes and/or requests. The resource allocation unit 218 may also determine that the number of simultaneous computing processes and/or requests meet and/or exceed a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

The memory unit 204 may be used for storing, recalling, receiving, transmitting, and/or accessing various files and/or data, such as image and/or video data, vehicle date, modified or transformed data, output data, or any other data described herein, during operation of computing environment 200. For example, memory unit 204 may be used for storing, recalling, and/or updating exception event information as well as other data associated with, resulting from, and/or generated by any unit, or combination of units and/or subunits of the computing environment 200. In some embodiments, the memory unit 204 may store instructions, code, and/or data that may be executed by the processing unit 202. For instance, the memory unit 204 may store code that execute operations associated with one or more units and/or one or more subunits of the computing environment 200. For example, the memory unit may store code for the processing unit 202, the I/O unit 206, the communication unit 208, and for itself.

Memory unit 204 may include various types of data storage media such as solid state storage media, hard disk storage media, virtual storage media, and/or the like. Memory unit 204 may include dedicated hardware elements such as hard drives and/or servers, as well as software elements such as cloud-based storage drives. In some implementations, memory unit 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of memory unit 204 may include instructions related to various methods and/or functionalities described herein. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 may include one or more databases 310 (shown in FIG. 3) for storing any data described herein. For example, depending on the implementation, the one or more databases may be used as the local storage 122 of the endpoint device discussed with reference to FIG. 1. Additionally or alternatively, one or more secondary databases (e.g., the public record repository or cloud storage 120 discussed with reference to FIG. 1) or one or more tertiary databases (e.g., repositories within the network system local storages 140a . . . 140n discussed with reference to FIG. 1) located remotely from computing environment 200 may be used and/or accessed by memory unit 204. In some embodiments, memory unit 204 and/or its subunits may be local to the cloud server 102 and/or the endpoint device 104 and/or remotely located in relation to the cloud server 102 and/or the endpoint device 104.

Turning back to FIG. 2, the memory unit 204 may include subunits such as an operating system unit 226, an application data unit 228, an application programming interface (API) unit 230, a content storage unit 232, data engine 118, and a cache storage unit 240. Each of the aforementioned subunits of the memory unit 204 may be communicatively and/or otherwise operably coupled with each other and other units and/or subunits of the computing environment 200. It is also noted that the memory unit 204 may include other modules, instructions, or code that facilitate the execution of the techniques described. For instance, the memory unit 204 may include one or more modules such as a data engine discussed in association with FIG. 4.

The operating system unit 226 may facilitate deployment, storage, access, execution, and/or utilization of an operating system utilized by computing environment 200 and/or any other computing environment described herein. In some embodiments, operating system unit 226 may include various hardware and/or software elements that serve as a structural framework for processing unit 202 to execute various operations described herein. Operating system unit 226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application used by computing environment 200 and/or any other computing environment described herein. For example, the endpoint device 104 may be required to download, install, access, and/or otherwise use a software application (e.g., web application 165) to facilitate implementing a multi-application network, registering a digital command in a multi-application network, generating dynamic context data associated with a digital request data object in a multi-application network, curating data associated with a multi-application network, and generating one or more digital records indicating computing operations and state data within a multi-application network. As such, the application data unit 228 may store any information and/or data associated with an application. The application data unit 228 may further store various pieces of information and/or data associated with the operation of an application and/or computing environment 200 as a whole, such as status of computing resources (e.g., processing power, memory availability, resource utilization, and/or the like), runtime information, user interfaces, modules to direct execution of operations described herein, user permissions, security credentials, and/or the like.

The API unit 230 may facilitate deployment, storage, access, execution, and/or utilization of information associated with APIs of computing environment 200 and/or any other computing environment described herein. For example, computing environment 200 may include one or more APIs for various devices, applications, units, subunits, elements, and/or other computing environments to communicate with each other and/or utilize the same data. Accordingly, API unit 230 may include API databases containing information that may be accessed and/or utilized by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the cloud server 102 and the endpoint device 104 to communicate with each other. It is appreciated that the API unit 230 may facilitate accessing, using the data engine 118, one or more applications or services on the cloud server 102 and/or the network systems 138a . . . 138n.

The content storage unit 232 may facilitate deployment, storage, access, and/or utilization of information associated with performance of implementing operations associated with a multi-application network and/or framework processes by computing environment 200 and/or any other computing environment described herein. In some embodiments, content storage unit 232 may communicate with content management unit 212 to receive and/or transmit content files (e.g., media content, digital request data object content, command content, input content, registration object content, etc.).

As previously discussed, the data engine 118 facilitates executing the processing procedures, methods, techniques, and workflows provided in this disclosure. In particular, the data engine 118 may be configured to execute computing operations associated with the disclosed methods, systems/ apparatuses, and computer program products.

The cache storage unit 240 may facilitate short-term deployment, storage, access, analysis, and/or utilization of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing the disclosed processes. For example, elements of the I/O unit 206 may be used to receive input from a user of the endpoint device 104. As described herein, I/O unit 206 may include subunits such as an I/O device 242, an I/O calibration unit 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with computing environment 200. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing unit 202 and/or memory unit 204 to execute operations associated with the disclosed techniques and systems.

The I/O calibration unit 244 may facilitate the calibration of the I/O device 242. For example, I/O calibration unit 244 may detect and/or determine one or more settings of I/O device 242, and then adjust and/or modify settings so that the I/O device 242 may operate more efficiently. In some embodiments, I/O calibration unit 244 may use a driver 246 (or multiple drivers) to calibrate I/O device 242. For example, the driver 246 may include software that is to be installed by I/O calibration unit 244 so that an element of computing environment 200 (or an element of another computing environment) may recognize and/or integrate with I/O device 242 for the processes described herein.

The communication unit 208 may facilitate establishment, maintenance, monitoring, and/or termination of communications between computing environment 200 and other computing environments, third party server systems, and/or the like (e.g., between the cloud server 102 and the endpoint device 104 and or the network systems 138a . . . 138n). Communication unit 208 may also facilitate internal communications between various elements (e.g., units and/or subunits) of computing environment 200. In some embodiments, communication unit 208 may include a network protocol unit 248, an API gateway 250, an encryption engine 252, and/or a communication device 254. Communication unit 208 may include hardware and/or other software elements.

The network protocol unit 248 may facilitate establishment, maintenance, and/or termination of a communication connection for computing environment 200 by way of a network. For example, the network protocol unit 248 may detect and/or define a communication protocol required by a particular network and/or network type. Communication protocols used by the network protocol unit 248 may include Wi-Fi protocols, Li-Fi protocols, cellular data network protocols, Bluetooth® protocols, WiMAX protocols, Ethernet protocols, powerline communication (PLC) protocols, and/ or the like. In some embodiments, facilitation of communication for computing environment 200 may include transforming and/or translating data from being compatible with a first communication protocol to being compatible with a second communication protocol. In some embodiments, the network protocol unit 248 may determine and/or monitor an amount of data traffic to consequently determine which particular network protocol is to be used for establishing a secure communication connection, transmitting data, and/or performing malware scanning operations and/or other processes described herein.

The API gateway 250 may allow other devices and/or computing environments to access the API unit 230 of the memory unit 204 associated with the computing environment 200. For example, an endpoint device 104 may access the API unit 230 of the computing environment 200 via the API gateway 250. In some embodiments, the API gateway 250 may be required to validate user credentials associated with a user of the endpoint device 104 prior to providing access to the API unit 230 to a user. The API gateway 250 may include instructions for the computing environment 200 to communicate with another computing device and/or between elements of the computing environment 200.

Figure 4:
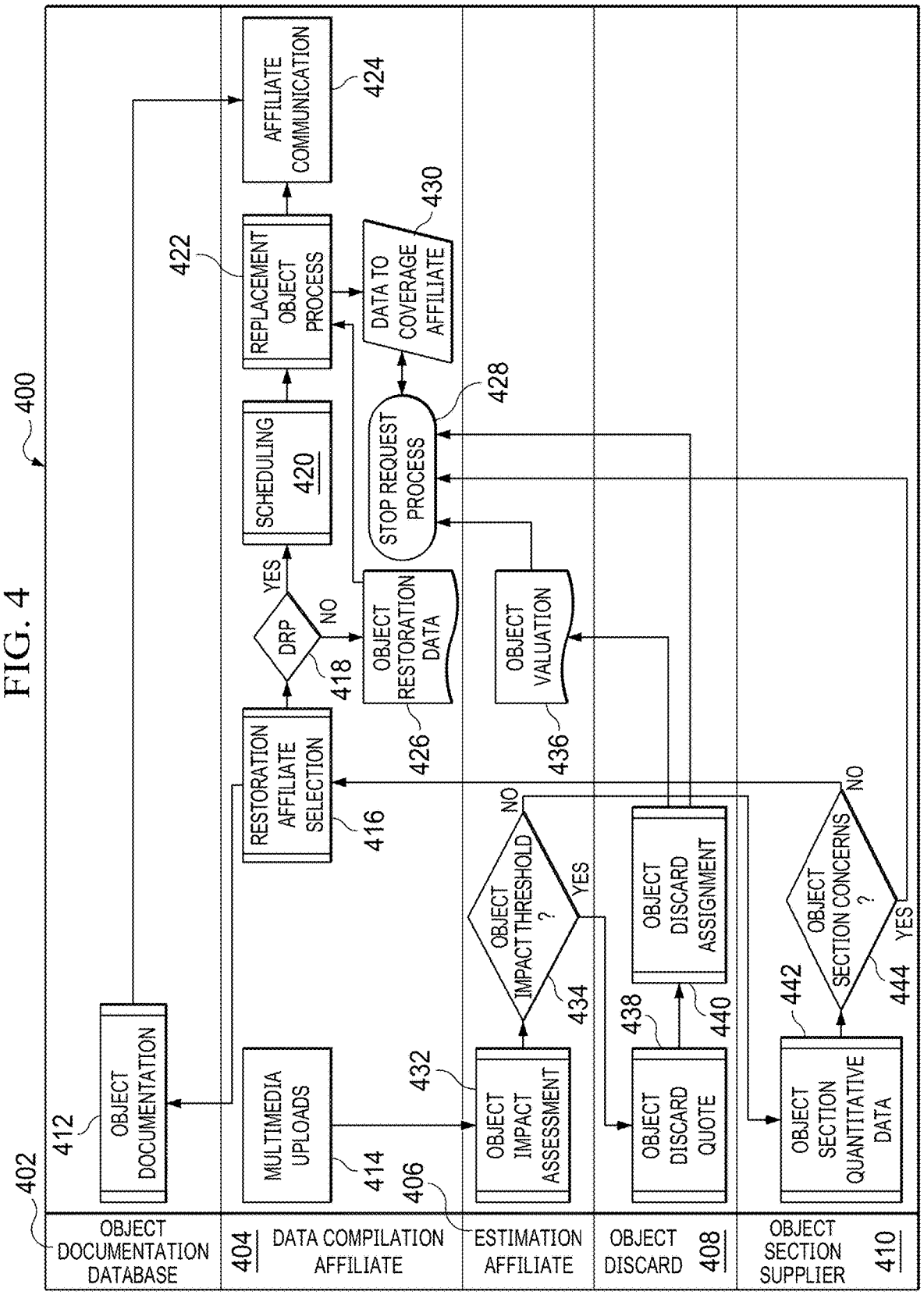
FIG. 4 shows a potential flowchart associated with an embodiment of methods and systems that implement a multi-application network such as the multi-application network of FIG. 1.

FIG. 4 shows a flow chart of a potential embodiment of the multi-application network subsequent to occurrence-related multimedia uploads 414 being transferred to one or more network systems 138a . . . 138n, on the multi-application network. Occurrence-related multimedia uploads 414 may include image and/or video data, vehicle date, modified or transformed data, output data, or any other data described herein. Once the occurrence related multimedia uploads 414 are submitted to the multi-application network and stored within one or more cloud storages 120, local storages 122, and/or one or more network system local storages 140a . . . 140n, one or more data engines 118 would relay the occurrence-related multimedia uploads 414 and other digital request submissions from one or more network systems 138a . . . 138n comprising a data compilation affiliate 404 to another one or more network systems 138a . . . 138n comprising an estimation affiliate 406. The estimation affiliate 406 may conduct an object impact assessment 432. The object impact assessment may utilize a machine learning process or model (e.g., any artificial intelligence and/or machine learning process described herein) or algorithmic code stored within a memory unit 204 to assess object impact and produce an impact quantification. The impact quantification may be based on time required to reverse the object impact, cost of replacement sections to reverse the object impact, or difference in object valuation before and after the occurrence. The impact quantification is then compared against an impact threshold 434. If the impact quantification is greater than the impact threshold 434, the multimedia uploads and digital request submissions are sent to one or more network systems 138a . . . 138n comprising an object discard 408 to provide at least one object discard quote 438. An object discard assignment 440 to designate at least one object discard quote 438 for the object may either be sent as an object valuation 436 or unaltered as an object discard assignment 440 to one or more network systems 138a . . . 138n comprising an object coverage affiliate. At this point, the multi-application may proceed with termination of communication and connection 428 with one or more endpoint devices 104.

If the object impact assessment 432 does not exceed the determined object impact threshold 434, then the multi-application network sends the object impact assessment 432, digital request submissions, and generated occurrence data to one or more network systems 138a . . . 138n comprising an object section supplier 410. The object section supplier 410 may utilize information provided within and external to the multi-application network to determine object section quantitative data 442. The object section supplier 410 would also assess object section concerns 444, such as object section shortages. If an object section concern 444 is identified, the multi-application network would report the object section concern 444 to the object coverage affiliate 430 and then proceed with termination 428 of communication and connection with one or more endpoint devices 104. If no object section concern 444 is detected, the object section quantitative data 442 will be transmitted through the multi-application network to the data compilation affiliate 404 for object restoration affiliate selection 416 by the digital requester. Once an object restoration affiliate is selected, object documentation 412 will be collected and included in object restoration affiliate communications 424. Object documentation 412 may be accessed from an object documentation database 402 within cloud storage 120 or one or more network system local storage 140a . . . 140n. After object restoration affiliate selection 416, a direct affiliate relationship 418 is assessed to determine if there is a direct relationship between the object coverage affiliate and the object restoration affiliate selected. If so, the digital requester may immediately commence object restoration scheduling 420 and temporary object replacement orders 422. If there is not a direct affiliate relationship 418 between the object coverage affiliate and the object restoration affiliate selected, the digital requester may be provided with object restoration data 426 before proceeding to temporary object replacement orders 421. After both the object restoration affiliate and temporary object replacement have been selected, the selections and associated data are stored and transferred to the object coverage affiliate 430 and to the selected object restoration affiliate and temporary object replacement affiliate before terminating the transfer of data within the multi-application network. At any stage in the aforementioned processes, data may be stored within one or more cloud storages 120, local storages 122, memory units 204, and/or one or more network system local storages 140a . . . 140n. The various steps in FIG. 4 or discussed with respect to FIG. 4 may be executed in a different order from that shown in FIG. 4.

An example of the above embodiments may apply to accidents involving motor vehicles. A participant of an accident may call their insurance provider and provide basic information about themselves and their insurance coverage. The insurance company may then input this information in their database (or this data may be input into one or more servers of the multi-application network directly or via a third party or third-party server) and send the customer a link to open a mobile application or user interface (e.g., a data collection computing input tool) to upload images, videos, augmented reality or virtual reality captures, etc. of the accident or a characteristic of the accident (e.g., damage caused by the accident as described herein). In some embodiments, the customer may comprise a user. The images, etc. of the accident or characteristic are then uploaded and the multi-application network sends the images, etc. of the accident or characteristic to a server associated with a second network to assess the damage and provide either a salvage quote or a repair quote, which may include an estimated number of labor hours required for a repair. The customer may then use the mobile application to select a rental vehicle from a number of rental vehicle options and a repair shop from a number of repair shop options if their vehicle is repairable. This whole process may be consolidated within a single multi-application network or multiple multi-application networks. In one embodiment, the user may be able to contact a towing or salvage service depending on an analysis of the images, etc. of the accident or characteristic through the use of the data collection computing input tool and multi-application network. In another embodiment, the user may be able to hail a taxi or otherwise connect with a ride share service or vehicle through the use of the data collection computing input tool and multi-application network. In yet another embodiment, the repair shop options provided to the user may include repair shops that are certified to repair the damage or characteristic identified by the images, etc. of the accident or characteristic submitted through the interface or data collection computing input tool and multi-application network. In an embodiment, an identified or identifiable characteristic includes a characteristic that is able to be one or more of seen, determined, located, assessed, analyzed, evaluated, or the like. Similarly, in an embodiment, a characteristic that is not identified or identifiable includes a characteristic that is not able to be one or more of seen, determined, located, assessed, analyzed, evaluated, or the like. In one embodiment, the certified repair shop options provided may be specific to repair shops certified to repair the make and model of an electric vehicle involved in the accident and shown or otherwise provided in the images, etc. of the accident or characteristic, or other user data, submitted through the interface or data collection computing input tool or accessed by the multi-application network. In some embodiments, these described embodiments may comprise a server or network of the multi-application network communicating with one or more other server(s) or network(s) associated with the multi-application network to enable the user's connection with one or more separate applications for towing, salvage, ride share, etc. In another embodiment, the towing, salvage, ride share, etc. options or related data may be hosted at a separate server from the server of the data collection computing input tool but are displayed by the data collection computing input tool for user review and selection. In an embodiment, a vehicle may be one or more of a motor, electric, nautical, flying, hybrid, multi-purpose, all-terrain, or similar vehicle or combination thereof.

FIG. 5 shows a potential embodiment of a network system interface 500 for inputting user information from one or more network systems 138a . . . 138n into one or more cloud storages 120, local storages 122, and/or one or more network system local storages 140a . . . 140n for later use by the data engine 118. One or more logos for the network system 502 may be displayed on the network system interface 500, as well as one or more headers 504 for guiding network system operators through the submission of digital requester information 506. From the network system interface 500, digital requester information 506 may be submitted through a digital questionnaire 508 that may comprise fill-in-the-blank, checkboxes, dropdown menus, or other information gathering features. Digital requester information 506 may comprise information such as the requester's name, address, contact information, network system policies, etc. Different network system users may be selected through a dropdown menu 510 on the network system interface 500. Additionally, already submitted digital requester data may be accessed via a selectable object database 512. Once the digital requester data is compiled within the network system, the data may be utilized by the multi-application network system by transferring the data to one or more network systems 138a . . . 138n for the one or more network systems 138a . . . 138n to generate a selectable object for a digital requester to access a personalized user interface by clicking on a button 514. The selectable object may comprise a hyperlink, selectable redirection icon, pre-compiled API, etc. In some embodiments, the network system interface 500 is not accessible to endpoint devices 104 and/or users.

Figure 6:
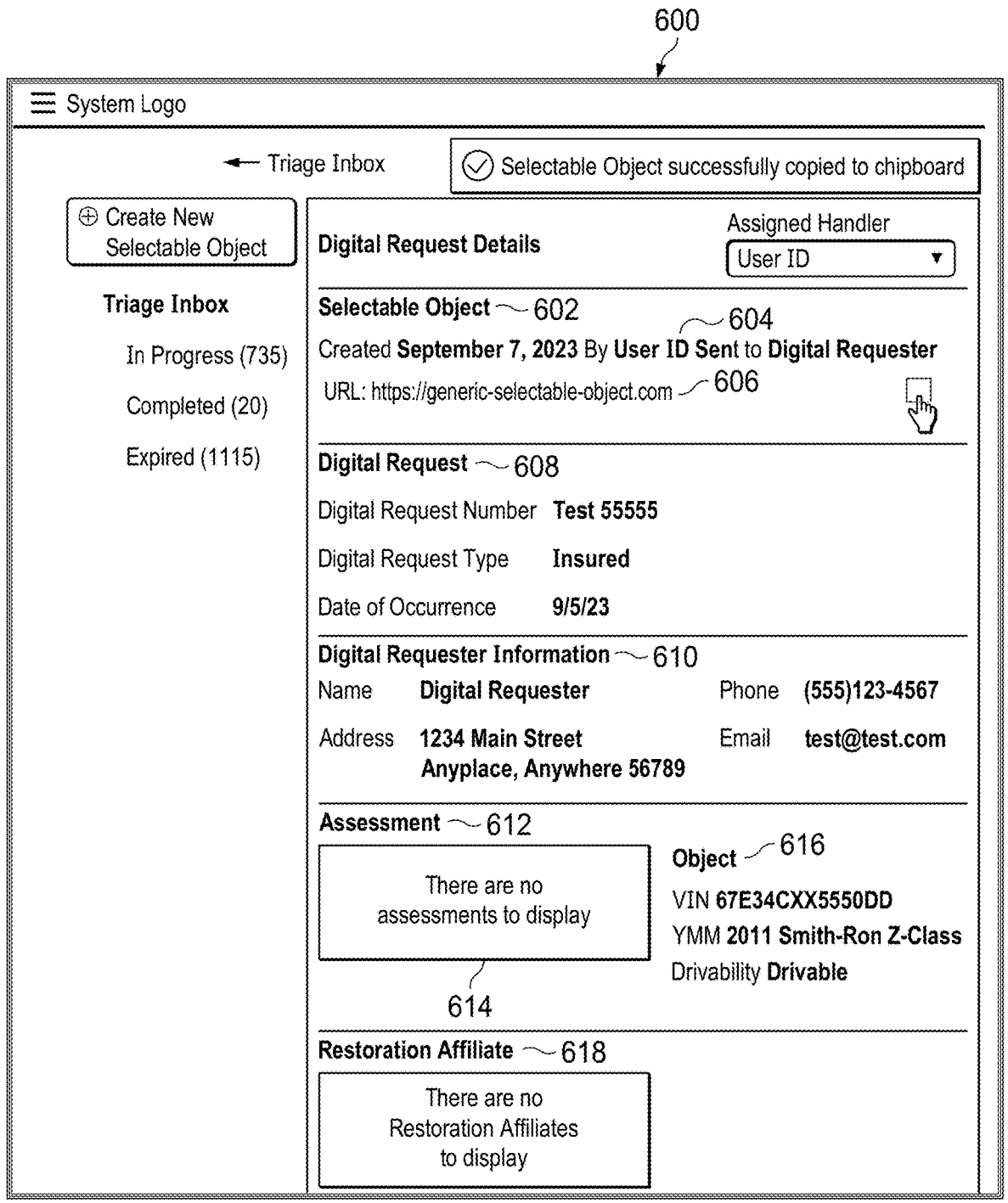
FIG. 6 shows a potential embodiment of an interface or data collection computing input tool for displaying collected and compiled digital request data or vehicle data or modified, transformed, or output data along with a potential selectable object to allow personalized access to a multi-application network.

FIG. 6 shows a potential embodiment of a confirmation page 600 on the network system. The digital requester information 506 submitted into the network system through the digital questionnaire 508 is utilized by the data engine 118 to generate a selectable object 606, which may be displayed under metadata information 604 and at least one selectable object header 602 for the selectable object 606. The selectable object 606 may comprise a hyperlink, selectable redirection icon, pre-compiled API, etc. The selectable object 606 may redirect a digital requester to a mobile application for submitting digital request data. Digital requester information 506 may be displayed on the confirmation page 600 and organized into different sections such as digital request data 608, digital requester information 610, occurrence assessment data 606, object data 616, and/or restoration affiliate data 618. If digital requester information 506 is not available, digital request placeholders 614 may populate these sections on the confirmation page 600. Digital request placeholders 614 may comprise blank spaces, shaded spaces, dashes, or other text or visual characters to occupy the screen space. In some embodiments, the confirmation page 600 is not accessible to one or more endpoint devices 104 and/or users.

Figure 7:
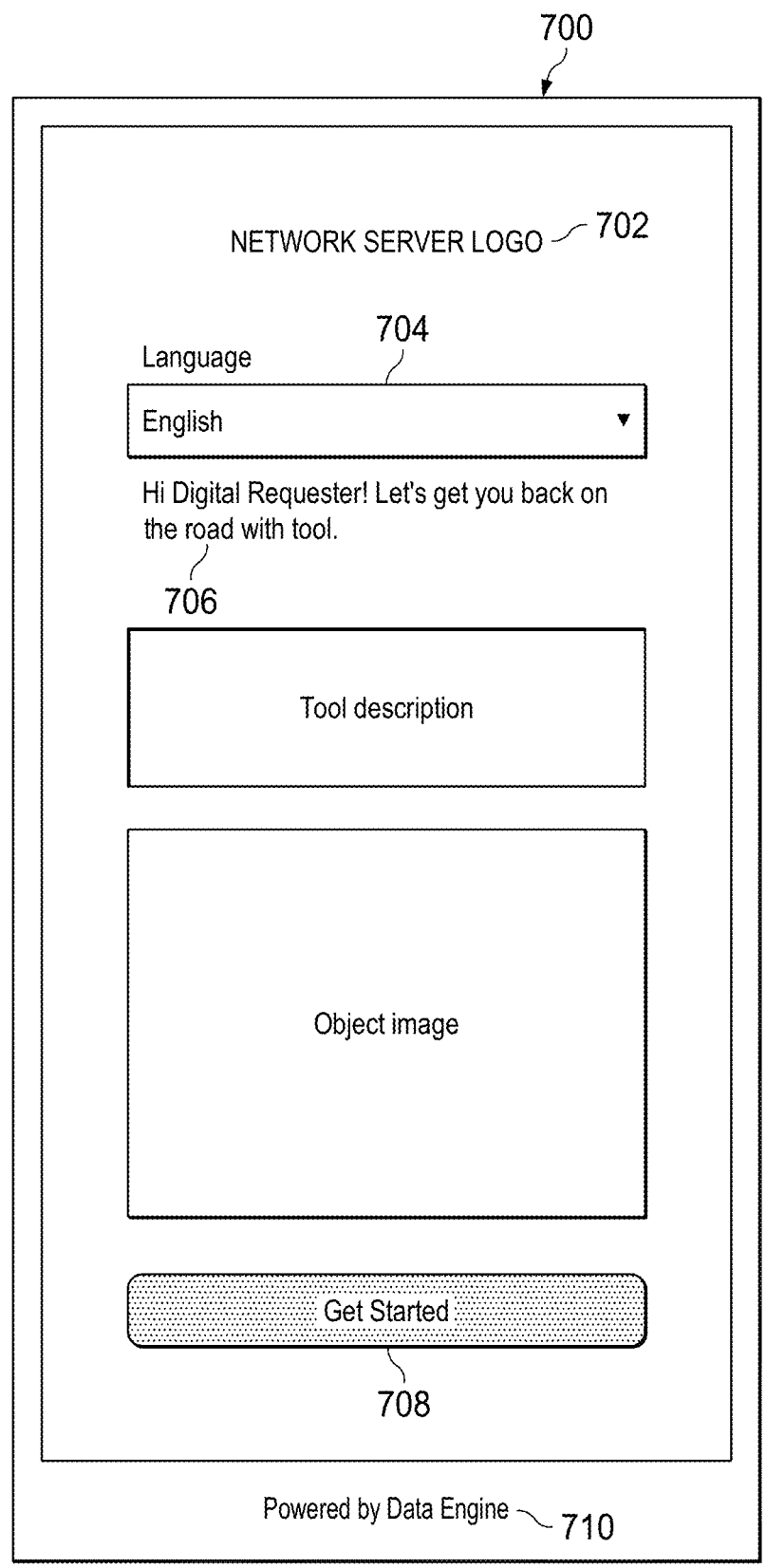
FIGS. 7, 8, 9a, 9b, 10 and 11 show potential embodiments of user interfaces or data collection computing input tools on an endpoint (or computing) device associated with a multi-application network, according to some embodiments of this disclosure.

FIG. 7 shows a potential embodiment of a welcome screen 700 on a user endpoint device 104 for one or more digital requesters to submit digital request data. The welcome screen 700 may comprise one or more network system logos 702, an introductory description 706 of the cloud server, and a button 708 to allow the one or more digital requesters to begin submitting digital request data. The welcome screen may also include a dropdown menu 704 or other submission feature that would allow the one or more digital requesters to select one or more preferred languages of displayed data on the endpoint device. The welcome screen 700 may also include a tagline 710 on the bottom of the screen with the name of one or more network systems 138a . . . 138n. In some embodiments, an authentication process may initiate, wherein the digital requester may be required to establish a login account or satisfy a static challenge. The static challenge may comprise providing a verification code and/or pin, pattern challenge, an animated and/or non-animated challenge, a graphical and/or non-graphical challenge, a two dimensional and/or three dimensional challenge, a moving and/or static gamified challenge, and/or a non-gamified interface challenge in order to log into the welcome screen 700 and corresponding multi-application network.

Figure 8:
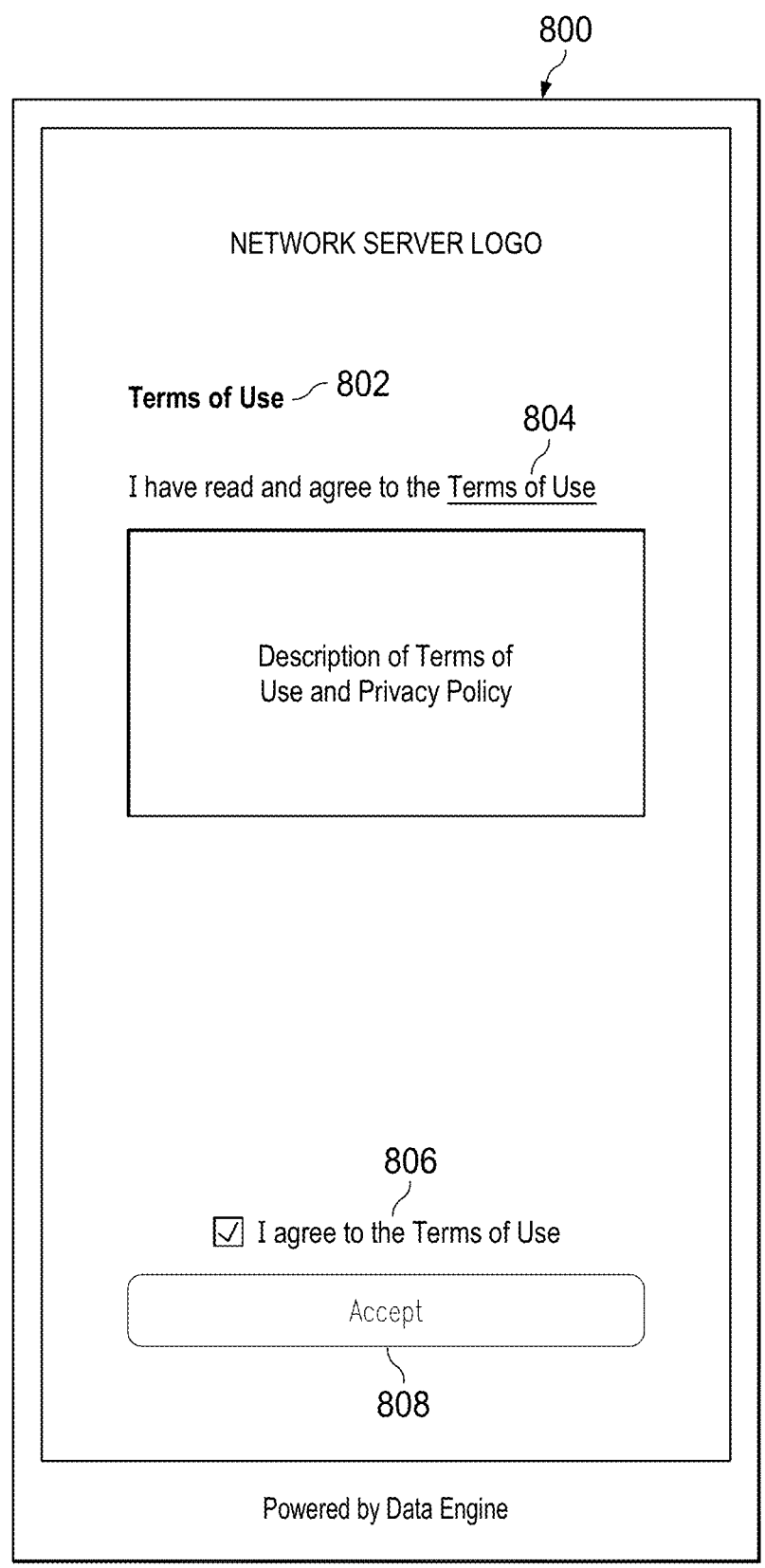

FIG. 8 shows a potential embodiment of a terms of use screen 800 within the multi-application network 100 wherein a digital requester may view information on the terms of use of the multi-application network. The terms of use screen 800 may include a terms of use header 802, a terms of use selectable object 804, a terms of use checkbox 806 for the digital requester to agree to the terms of use, and a terms of use accept button 808 to confirm acceptance of the terms of use for using the multi-application network. The terms of use selectable object may comprise a clickable hyperlink, button, or icon that will redirect the digital requester to a site or document providing the terms of use of the multi-application network.

Figure 9A:
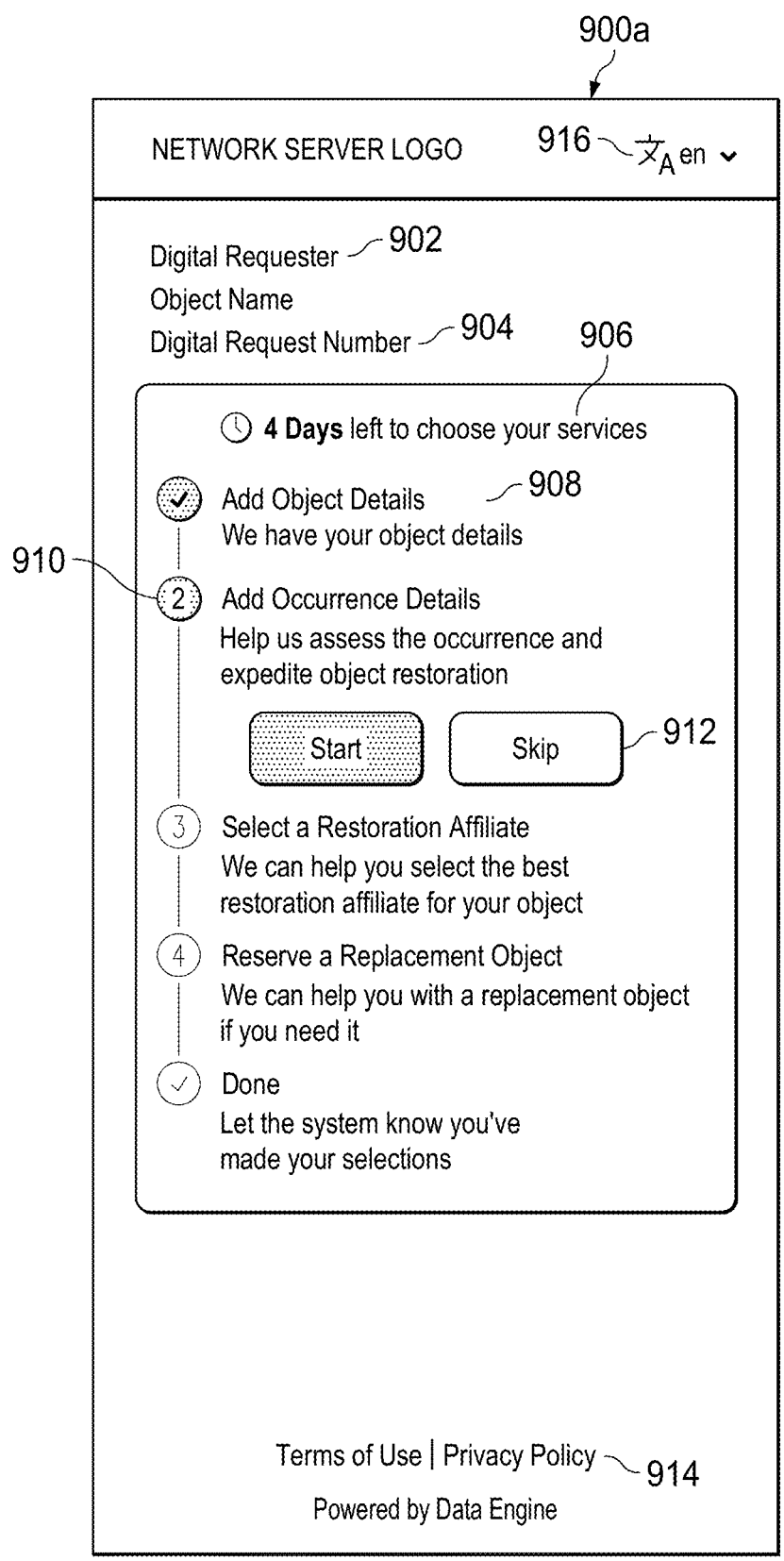

FIG. 9a shows a potential embodiment of the user interface at the endpoint device 104, wherein a progress report screen 900a shows progress and next steps for submitting digital request information. The potential embodiment may include the digital requester's name 902 and digital request number 904. A completion deadline 906 for the user may be shown on the embodiment. Progress for submitting digital request data may be displayed by a progress bar, check marks next to completed steps 908, bolded font or grayed out font for steps that still need to be completed 910, etc. The potential embodiment may allow digital requesters to skip particular steps by pressing a skip button 912. The user interface for the digital requester may also display selectable icons to the already accepted terms of use and privacy policy 914. The digital requester may also change the language displayed on the user interface by selecting a language from a dropdown language menu 916. One or more network systems 138a . . . 138n may correspond with the network to change the steps listed in progress report screen 900a.

Figure 9B:
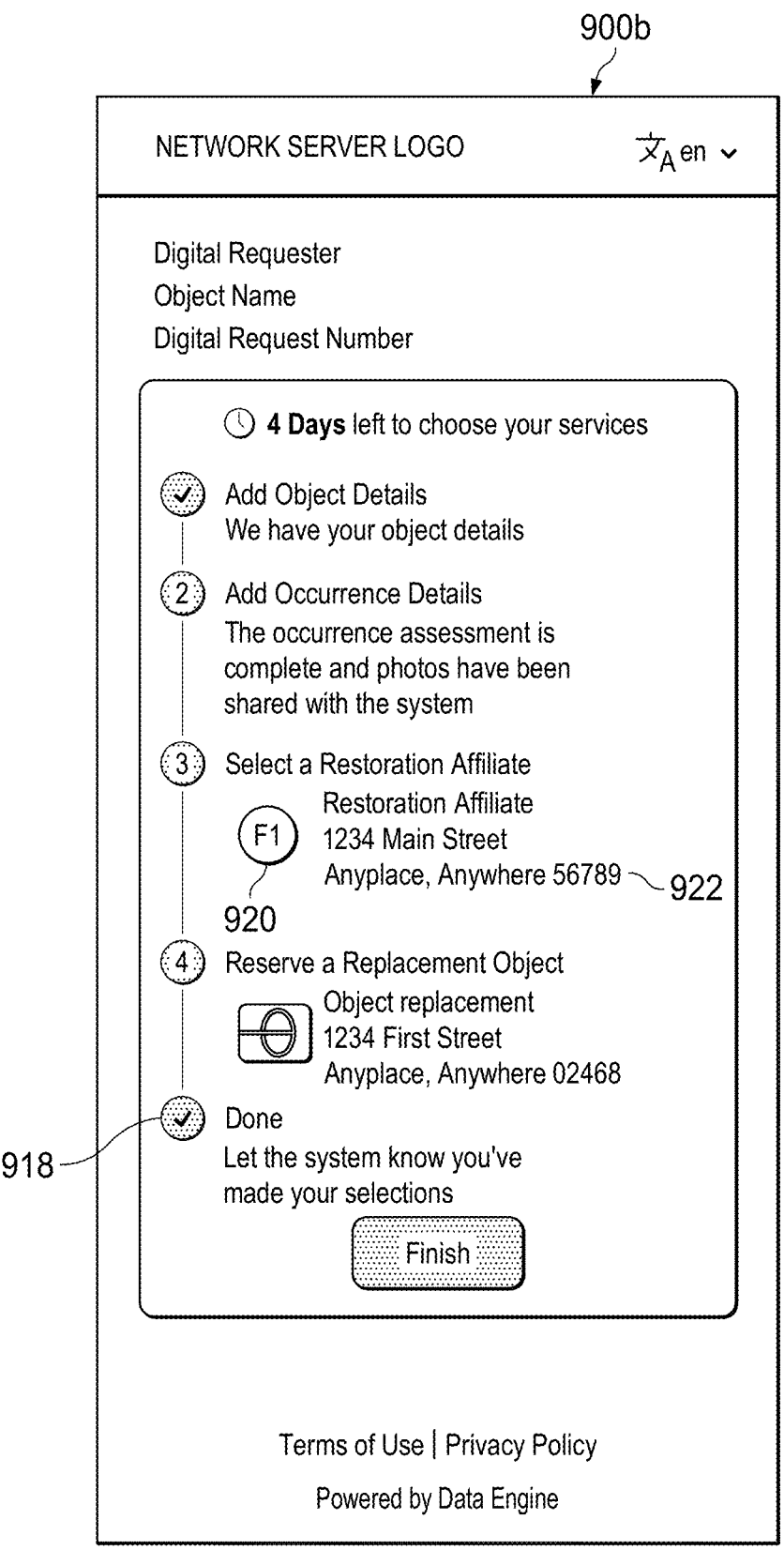

FIG. 9b shows a potential embodiment of the user interface 900b at the endpoint device 104, wherein the digital requestor has completed submitting information for the digital request. In this embodiment, the digital requester receives a notification that the digital request has been submitted 918. The digital requester may click a completion button to send a message from the endpoint device 104 to one or more network systems 138a . . . 138n through the network 106 that a digital request has been submitted. The information from the digital request may also replace the digital request placeholders 614 on the user interfaces of the one or more network systems 138a . . . 138n. Digital request data such as a selected restoration affiliate icon 920 and information 922 may also populate on the endpoint device user interface 900b.

Figure 10:
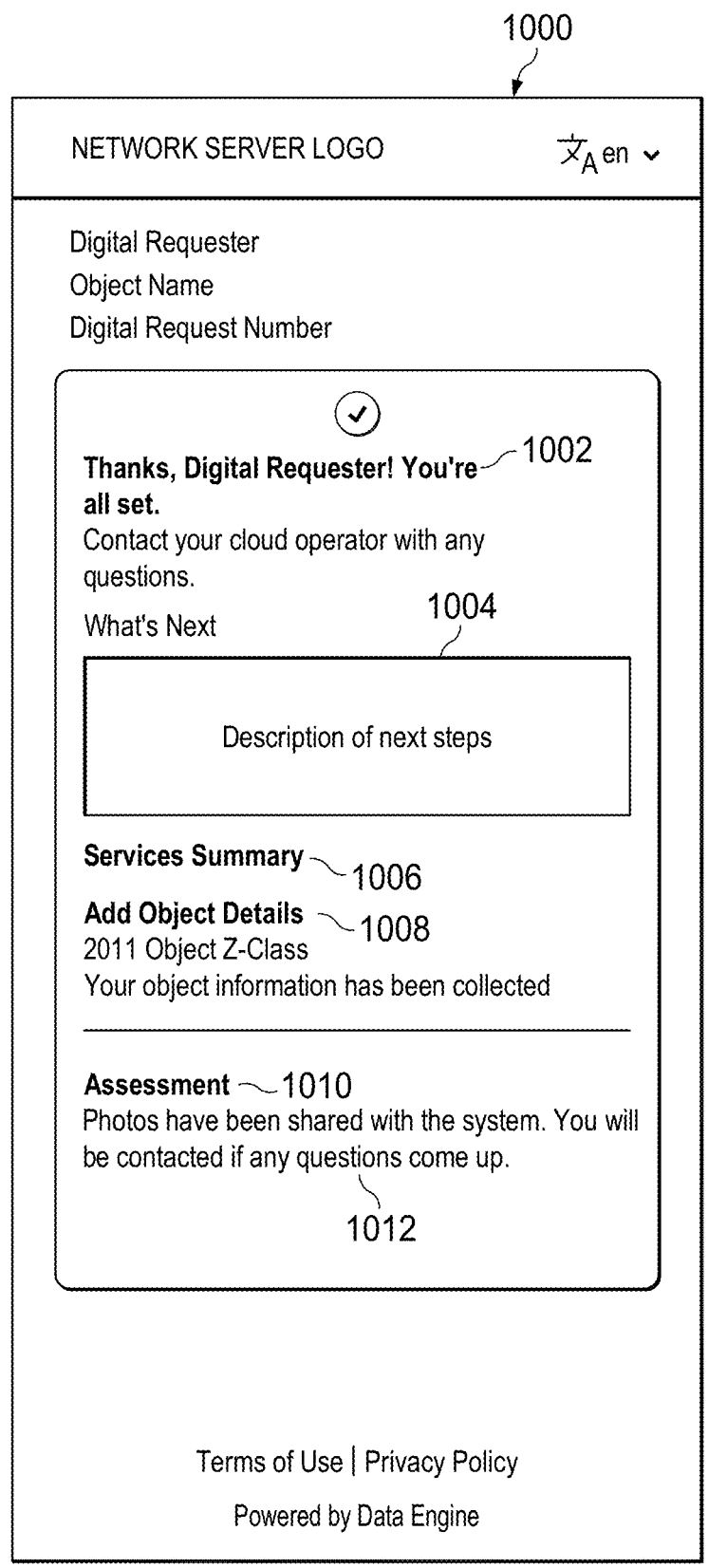

FIG. 10 shows a potential embodiment once the digital requester selects the completion button to send a message from the endpoint device 104 to one or more network systems 138a . . . 138n through the network 106 that a digital request has been submitted. This endpoint device confirmation screen 1000 may contain a confirmation message 1002 stating that the digital requester has completed the digital request process, a description of next steps to be performed by affiliated network systems 1004, and a summary of the digital request information submitted 1006. The digital request summary 1006 may include object details 1008, occurrence assessment 1010, and a description of the occurrence assessment 1012.

Figure 11:
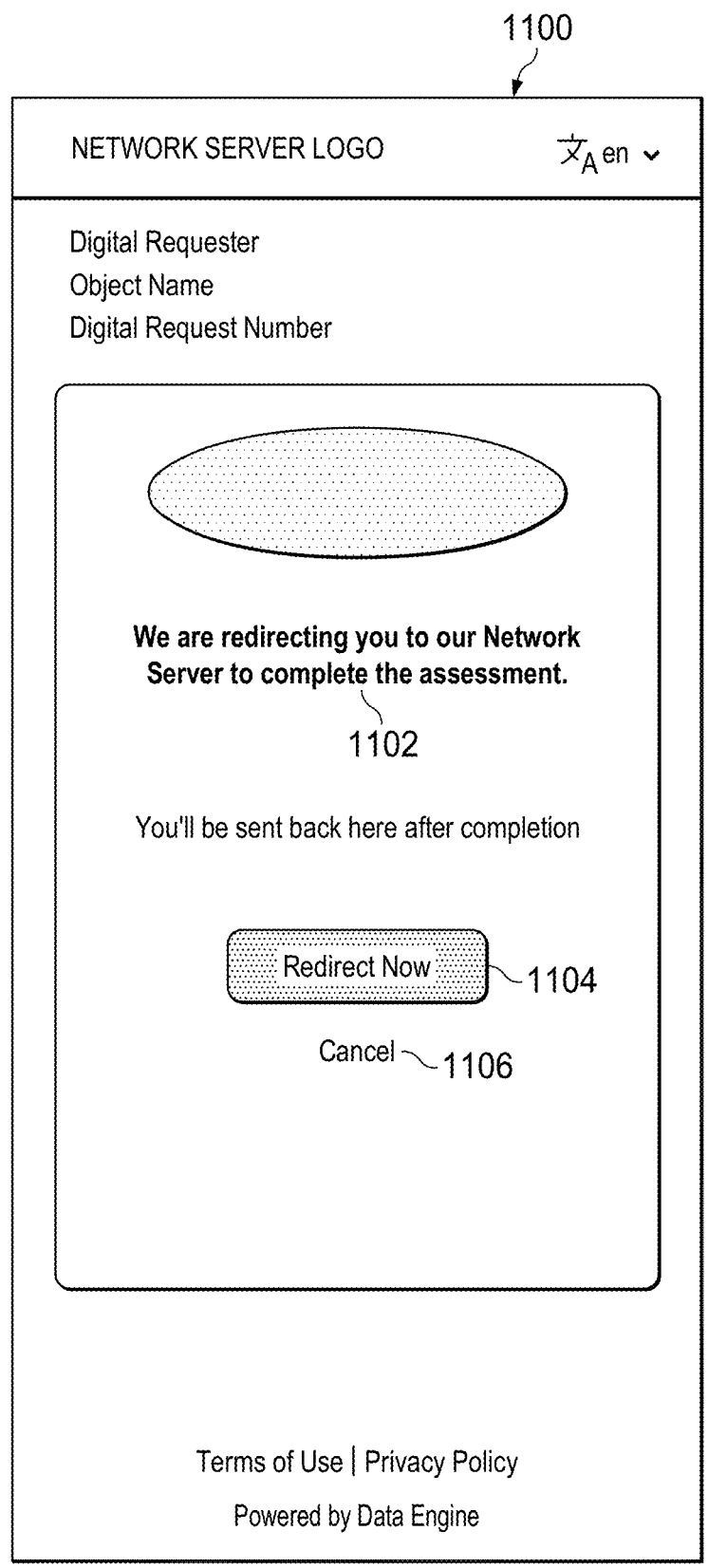

FIG. 11 shows a potential embodiment of an endpoint device transition screen 1100, wherein the endpoint device is being redirected from one set of one or more network systems 138a . . . 138n on the network 106 to different set of one or more network systems 138a . . . 138n on the same network 106 for the digital requester to input digital request information. The endpoint device transition screen may contain a transition notice 1102 notifying the digital requester of the redirecting to a different set of one or more network systems 138a . . . 138n on the same network 106. The digital requester may have the option to confirm the redirection with a redirect button 1104 or decline the redirection with a cancel button 1106.

Figure 12:
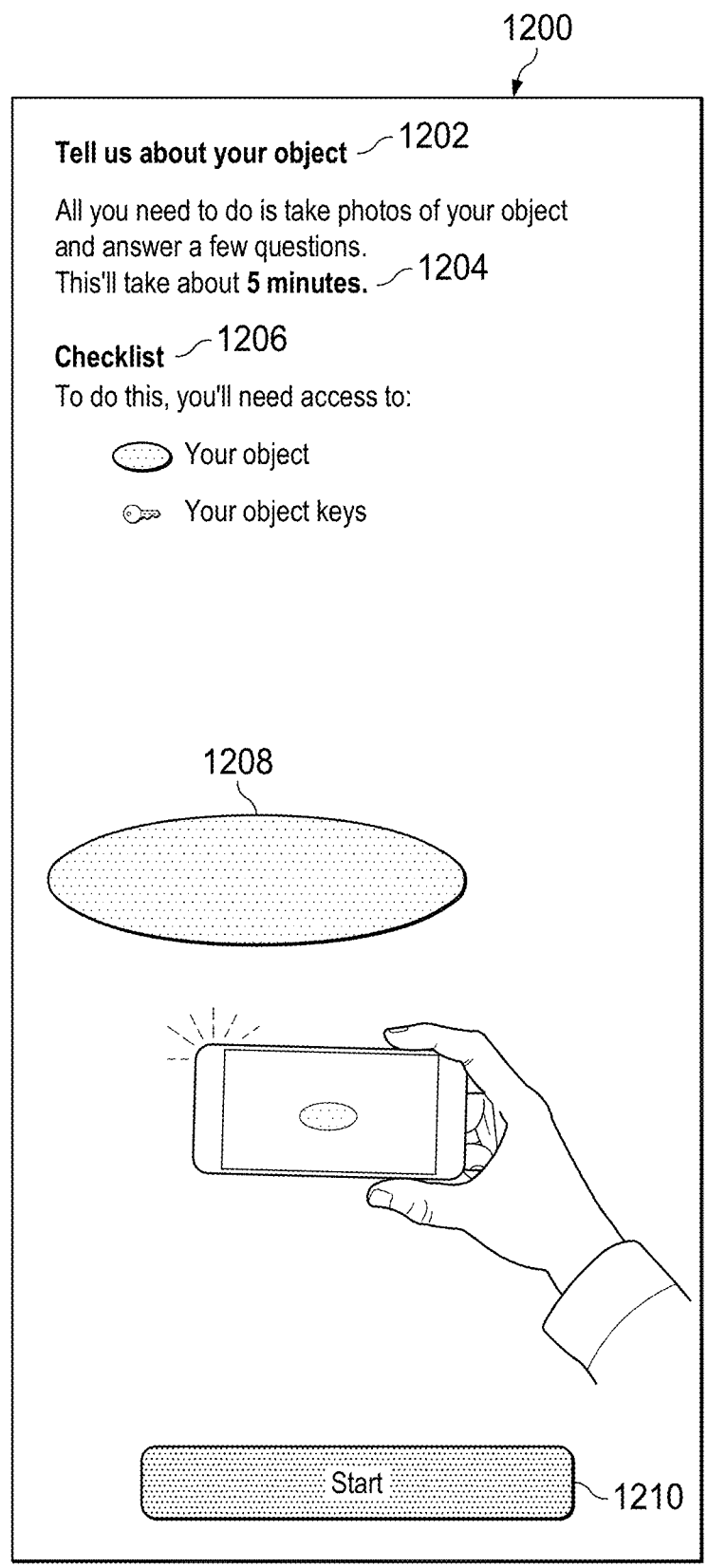
FIGS. 12, 13, 14, 15, 16 and 17 show potential embodiments of user interfaces or data collection computing input tools on an endpoint (or computing) device associated with a machine learning-based network system within a multi-application network according to some embodiments of this disclosure.

FIG. 12 shows a potential embodiment of the endpoint device 104 directed to a second welcome screen 1200 of a different set of one or more network systems 138a . . . 138n. The second welcome screen 1200 may request information about the digital request 1202 and may provide a time estimate 1204 to the digital requester regarding the amount of time it will take for the digital requester to provide information for the digital request. The second welcome screen 1200 may contain an checklist 1206 of permissions required by the digital requester to provide the required digital request information. The second welcome screen 1200 may include an example visual of the next steps 1208 and a start button 1210 for the digital requester to click to progress to the information gathering stage of the digital request.

Figure 13:
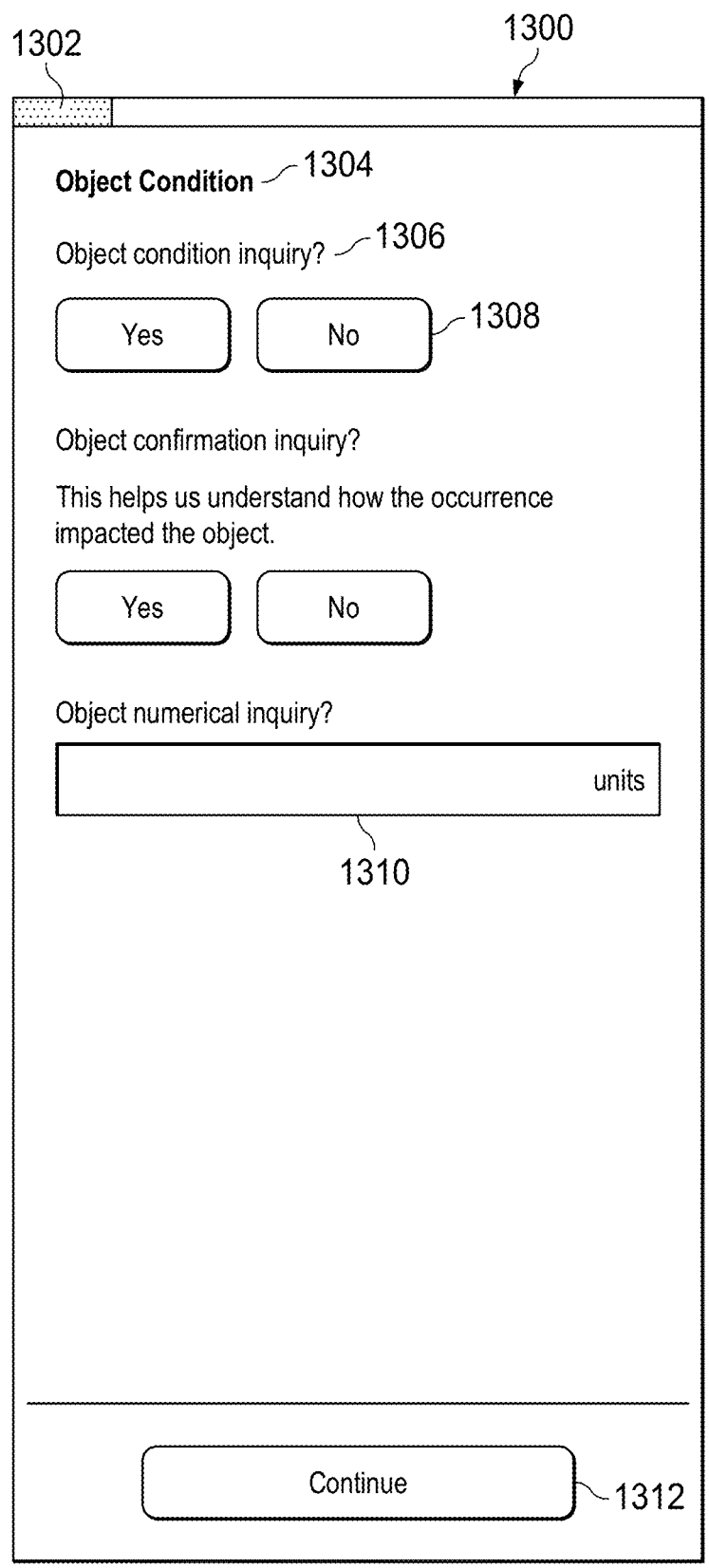

FIG. 13 shows a potential embodiment of the endpoint device 104 directed to a digital request questions screen 1300 connected to one or more network systems 138a . . . 138n. The digital request questions screen 1300 may comprise a screen heading 1304, occurrence inquiries 1306 that may be answered by response buttons 1308, fill-in boxes 1310, and/or any other input feature. The digital request questions screen 1300 and any other screen connected to the one or more network systems 138a . . . 138n through the network 106 may display a progress bar 1302 to show the digital requester visual feedback regarding the digital requester's progress filing the digital request. The digital requester may select a continuation button 1312 to progress to the next step of digital request submissions.

Figure 14:
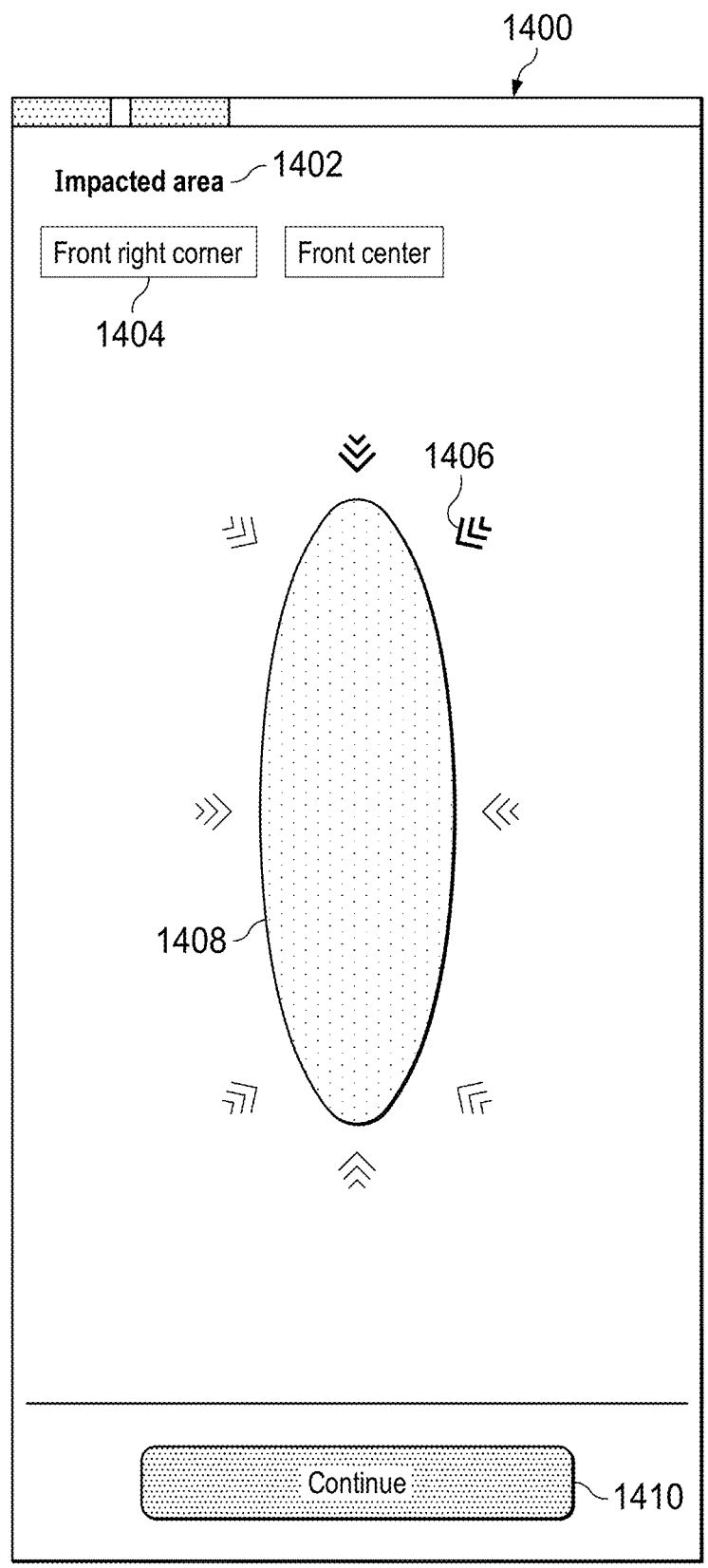

FIG. 14 shows a potential embodiment of the endpoint device 104 directed to an occurrence visualization screen 1400. The occurrence visualization screen 1400 may provide a visualization of an object 1408 for the digital requester to visually indicate by selecting icons, including but not limited to arrows 1406, where the digital request-related occurrence impacted the object 1408. The occurrence visualization screen 1400 may include a visualization heading 1402, visual descriptors 1404 summarizing the digital requester's selected icons, and a continuation button 1410 for the digital requester to progress to the next step of digital request submissions.

Figure 15:
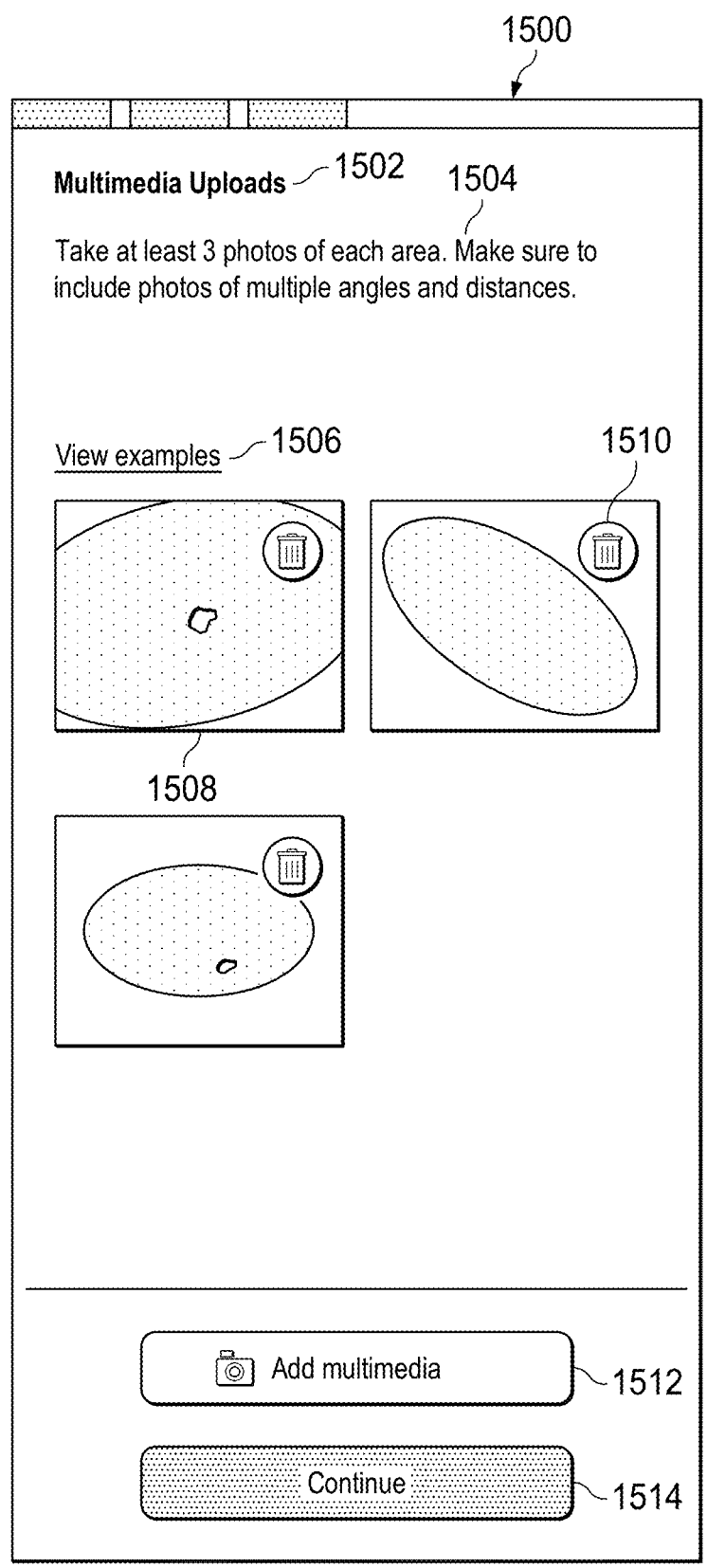

FIG. 15 shows a potential embodiment of a user interface at an endpoint device, wherein the user interface comprises a multimedia upload screen 1500. The multimedia upload screen 1500 permits the digital requester to submit different forms of multimedia related to the digital request-related occurrence. The submitted multimedia may comprise images, videos, audio files, documents, etc. The multimedia upload screen 1500 may contain a multimedia upload header 1502, multimedia submission instructions 1504, and at least one multimedia example link 1506. The multimedia upload screen 1500 may also display the multimedia uploads as icons 1508, have an multimedia upload button 1512, and multimedia deletion icons 1510 to allow the digital requester to upload and remove multimedia from the network, respectively. Multimedia uploaded to the network 1500 may be stored on the cloud storage 120, local storage 122 in the endpoint device 104, or on one or more network system local storages 140a . . . 140n. The multimedia upload screen 1500 may have a continuation button 1514 for the digital requester to confirm submission of the multimedia uploads and progress to the next step of digital request submissions.

Figure 16:
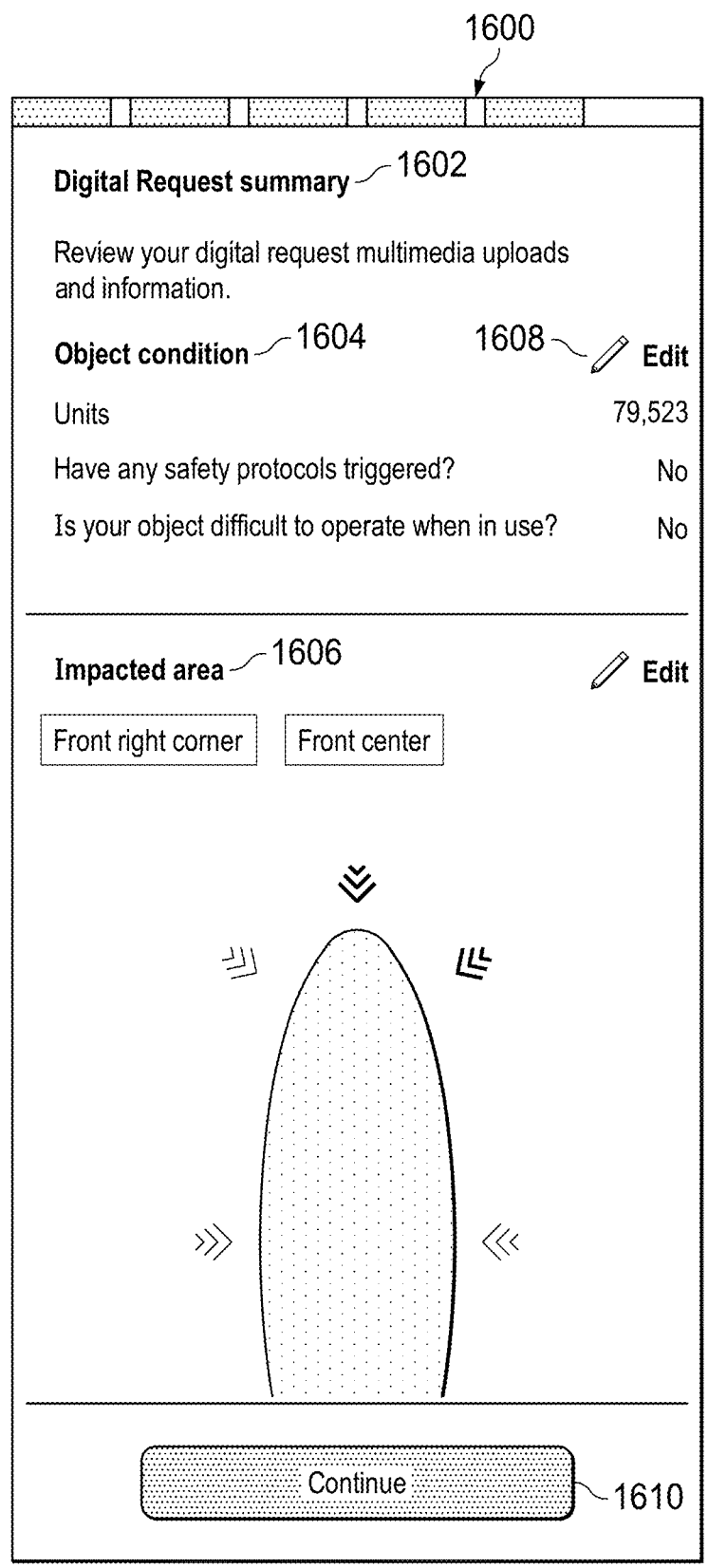

FIG. 16 shows a potential embodiment of a user interface at an endpoint device 104, wherein the user interface comprises a digital request occurrence summary screen 1600 on an endpoint device 104. The digital request occurrence summary screen 1600 may contain a summary header 1602, an object condition summary 1604 with submitted occurrence data from the digital requester and an impacted area summary 1606 with submitted occurrence data from the digital requester. If the digital requester would like to edit any previously submitted digital request data, they may do so by clicking an selectable edit icon 1608. The edit icon may redirect the digital requester to the appropriate prior screen to amend the digital request entries. When the digital requester has confirmed that the occurrence data is correct and complete, they may submit the occurrence data for analysis by one or more network systems 138a . . . 138n by clicking the submit button 1610.

Figure 17:
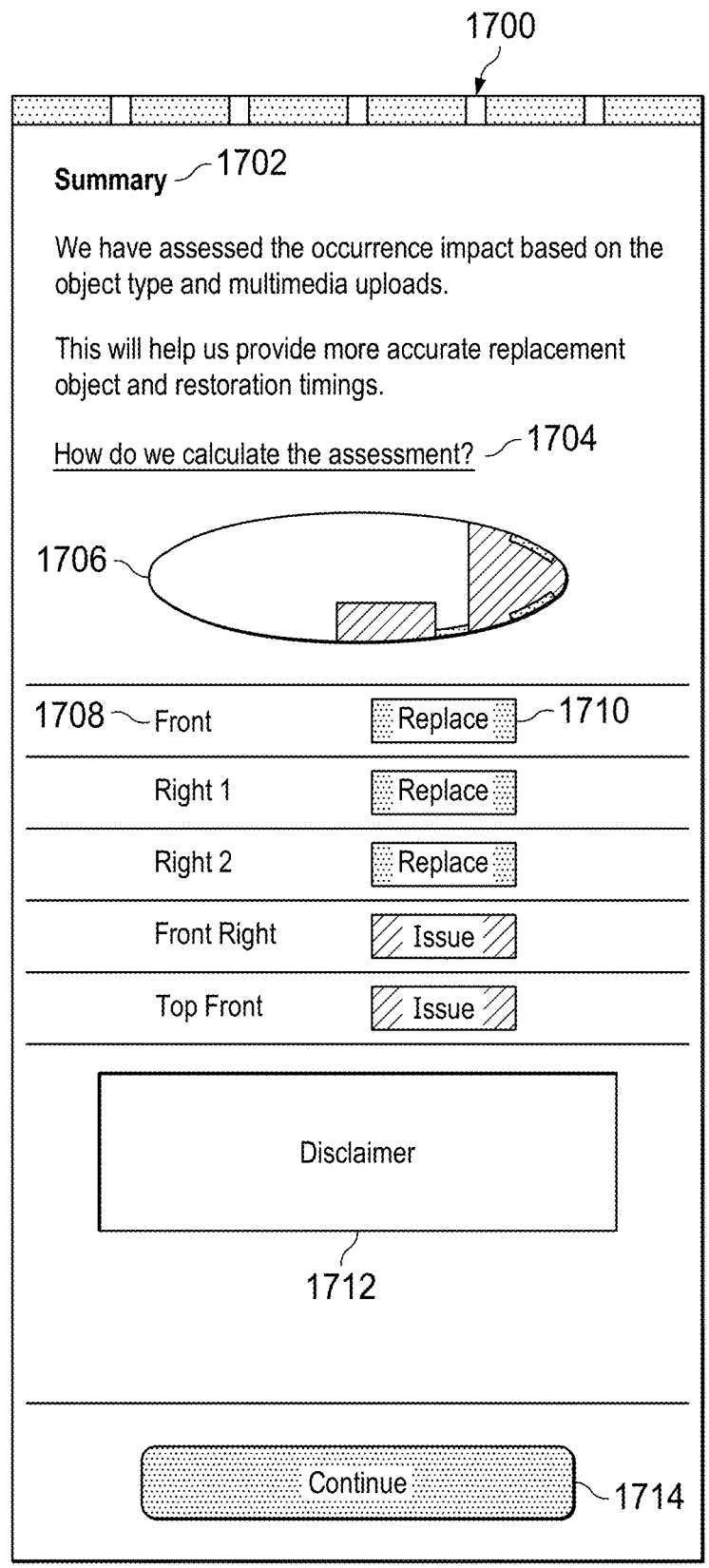

FIG. 17 shows a potential embodiment of a user interface at an endpoint device 104 wherein the user interface comprises an occurrence analysis screen 1700. The occurrence analysis screen 1700 may contain and occurrence summary header 1702, an occurrence assessment explanation as a selectable object 1704, an occurrence visualization 1706, a list of object section descriptions 1708 and object section statuses 1710. The occurrence selectable object 1704 may comprise a clickable hyperlink, button, or icon. The occurrence visualization may comprise an outline of the object, a section-by-section shaded or colored outline of the object, or a partially colored image of the object. The digital requester may leave the one or more network system by pressing a continuation button 1714. Data submitted by the digital requester and network system operator are sent to the cloud server 102. The data engine 118 transforms the submitted data into an object occurrence summary. The object occurrence summary may comprise occurrence output values for the digital requester and one or more network operators to analyze. Occurrence output values may also be stored on one or more local storage 122 on one or more endpoint device 104, one or more cloud storage 120 connected to the network 106 through a cloud server 102, or on one or more network storage 140a . . . 140n associated with one or more network systems 138a . . . 138n. The occurrence visualization 1706 and object part statuses 1710 may vary based on occurrence output values. The occurrence analysis screen may also display a disclaimer 1712.

Figure 18:
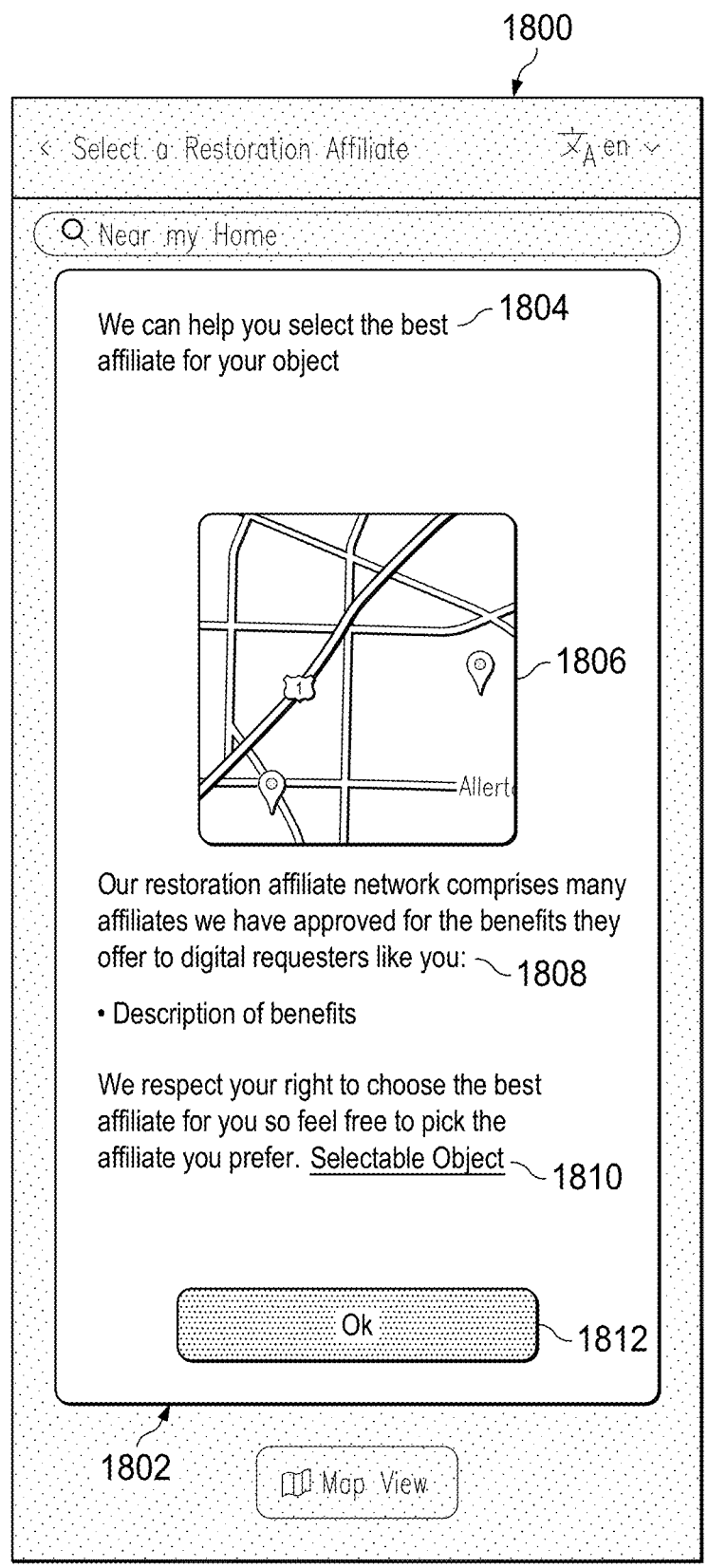
FIGS. 18, 19, 20, 21, 22, 23 and 24 show potential embodiments of user interfaces or data collection computing input tools on an endpoint (or computing) device associated with improved data outputs and manual submissions of vehicle data or modified, transformed, or output data for compilation and collection of data within a multi-application network according to some embodiments of this disclosure.

FIG. 18 shows a potential embodiment of a user interface at an endpoint device 104 wherein the user interface comprises a restoration affiliate introduction screen 1800. The restoration affiliate introduction screen 1800 may comprise a pop-up window 1802. The pop-up window may contain selection information 1804 for a restoration affiliate, an example visualization 1806, a description of restoration affiliate benefits 1808, and a restoration affiliate selectable object 1810. The digital requester may continue to one or more network systems 138a . . . 138n to select a restoration affiliate by clicking a confirmation button 1812.

Figure 19:
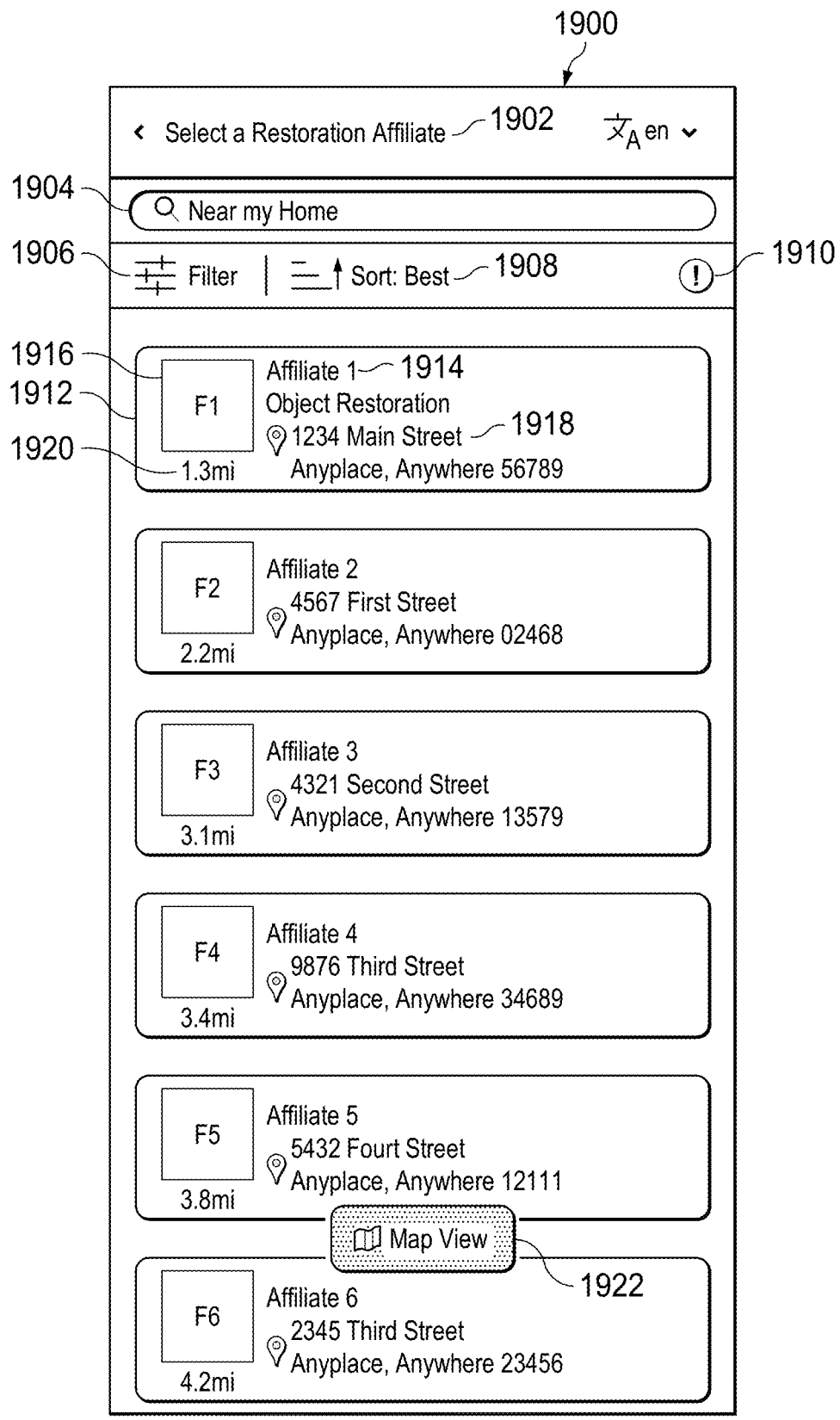

FIG. 19 shows a potential embodiment of a user interface at an endpoint device 104 wherein the user interface comprises a restoration affiliate selection screen 1900. The restoration affiliate selection screen may comprise a restoration affiliate selection header 1902, a restoration affiliate search function 1904, a restoration affiliate filter function 1906, a restoration affiliate sorting function 1908, a restoration affiliate explanatory selectable object 1910, one or more restoration affiliate icons 1912, wherein each restoration affiliate icon may comprise a restoration affiliate name 1914, icon 1916, address 1918 and numerical value 1920. The restoration affiliate selection screen 1900 may also contain a map view selectable object 1922, wherein the map view selectable object will transfer the digital requester to a map-based restoration affiliate selection screen 2000. In one embodiment, the restoration affiliate selection screen 1900, and/or its subparts, including the restoration affiliate icons 1912, comprise one or both of modified vehicle data or vehicle output data. In one embodiment, the address 1918 comprises one or more first locations based on a second location associated with the user or user's computing device and/or a third location associated with a user input or selection.

Figure 20:
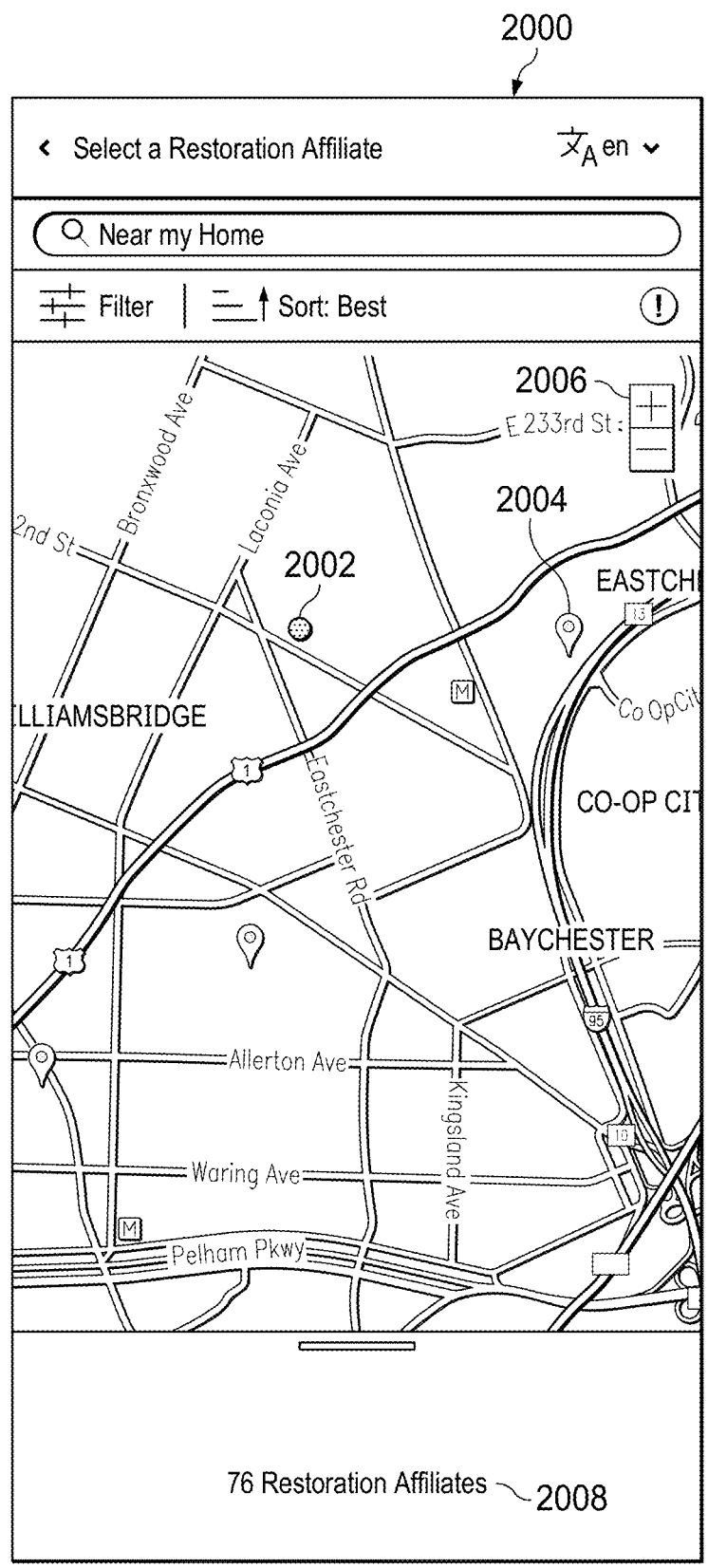

FIG. 20 shows a potential embodiment of a user interface at an endpoint device 104 wherein the user interface comprises a map-based restoration affiliate selection screen 2000. The map-based restoration affiliate selection screen 2000 may comprise a digital requester location indicator 2002, one or more restoration affiliate location indicators 2004, and one or more map visualization tools 2006. The digital requester location indicator 2002 may derive the digital requester's location information from the operating system 130 of the endpoint device 104, from data stored by the cloud server 102 in cloud storage 120, or any data provided from one or more network systems 138a . . . 138n. The one or more restoration affiliate location indicators 2004 would correspond with the locations of predetermined restoration affiliates. The one or more network systems 138a . . . 138n, cloud storage 120, or local storage 122 on one or more endpoint devices 104 may provide restoration affiliate information, such as location data. The mapping data on the map-based restoration affiliate selection 2000 may originate from the one or more network systems 138a . . . 138n, cloud storage 120, or local storage on one or more endpoint devices 104. To return to the restoration affiliate selection screen 1900, the digital requester may select the affiliate selection option 2008 at the bottom of the map-based restoration affiliate selection screen 2000.

Figure 21:
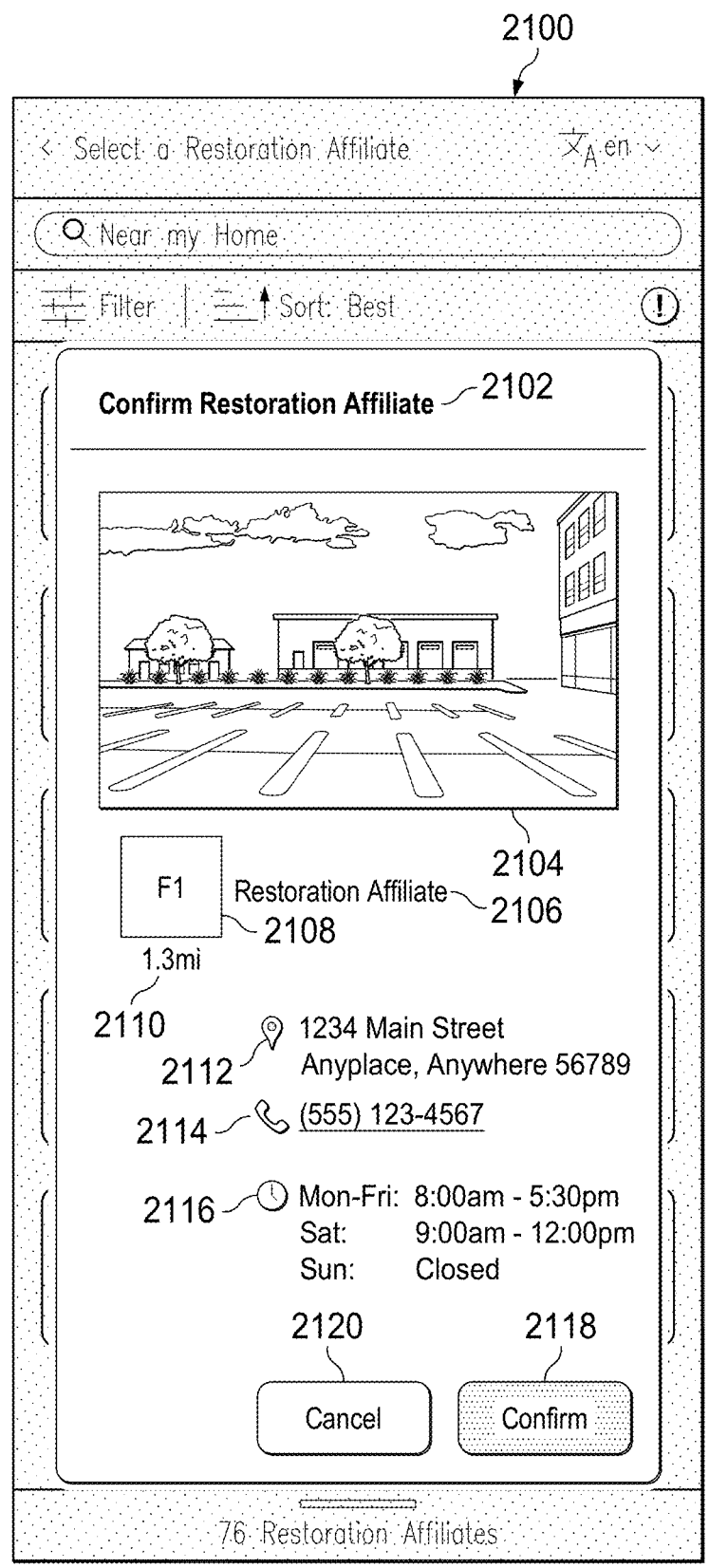

FIG. 21 shows a potential embodiment of a user interface at an endpoint device 104 wherein the user interface comprises a restoration affiliate confirmation screen 2100. The restoration affiliate confirmation screen 2100 may comprise a confirmation header 2102, a restoration affiliate icon 2104, a restoration affiliate information. Restoration affiliate information may comprise a restoration affiliate name 2106, icon 2108, numerical FIG. 2110, address 2112, phone number 2114, operation hours 2116, website, etc. The digital requester may either confirm the restoration affiliate or go back to review other restoration affiliates by clicking a confirmation button 2118 or a cancellation button 2120 respectively. In one embodiment, the restoration affiliate confirmation screen 2100, and/or its subparts, comprises one or both of modified vehicle data or vehicle output data. In one embodiment, the address 2112 comprises one or more first locations based on a second location associated with the user or user's computing device and/or a third location associated with a user input or selection.

Figure 22:
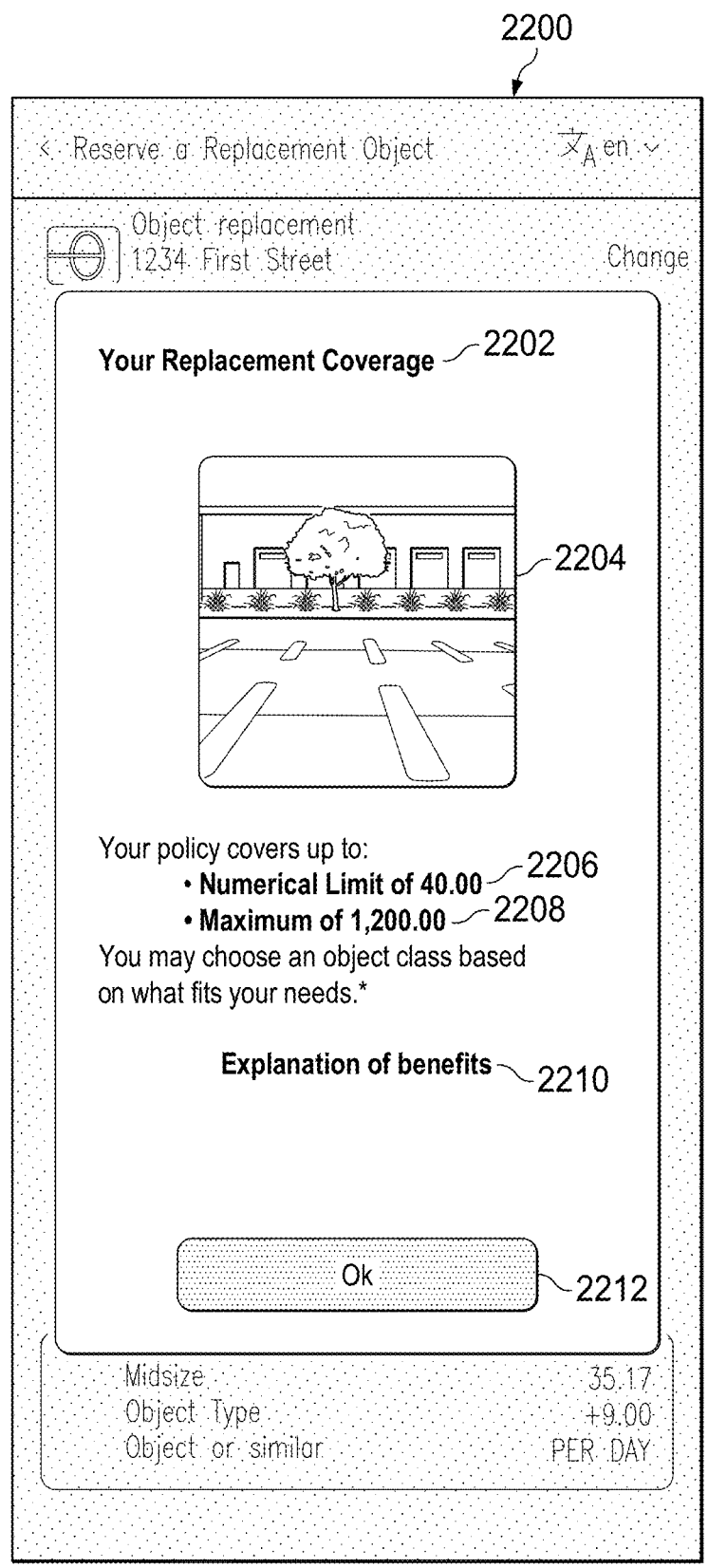

FIG. 22 shows a potential embodiment of a user interface at an endpoint device 104 wherein the user interface comprises a replacement object introduction screen 2200. The digital requester may proceed with replacement object selection by clicking the continuation button 2212. A replacement object summary 2202, replacement object visualization 2204, replacement object numerical limit 2206, replacement object maximum numerical value 2208, and replacement object explanation of benefits 2210 may be displayed on the replacement object introduction screen and may be determined by data provided by one or more network systems 138a . . . 138n or from data stored in cloud storage 120, one or more network system local storages 140a . . . 140n or local storage 122 on one or more endpoint device 104. In one embodiment, the replacement object introduction screen 2200, and/or its subparts, comprises one or both of modified vehicle data or vehicle output data.

Figure 23:
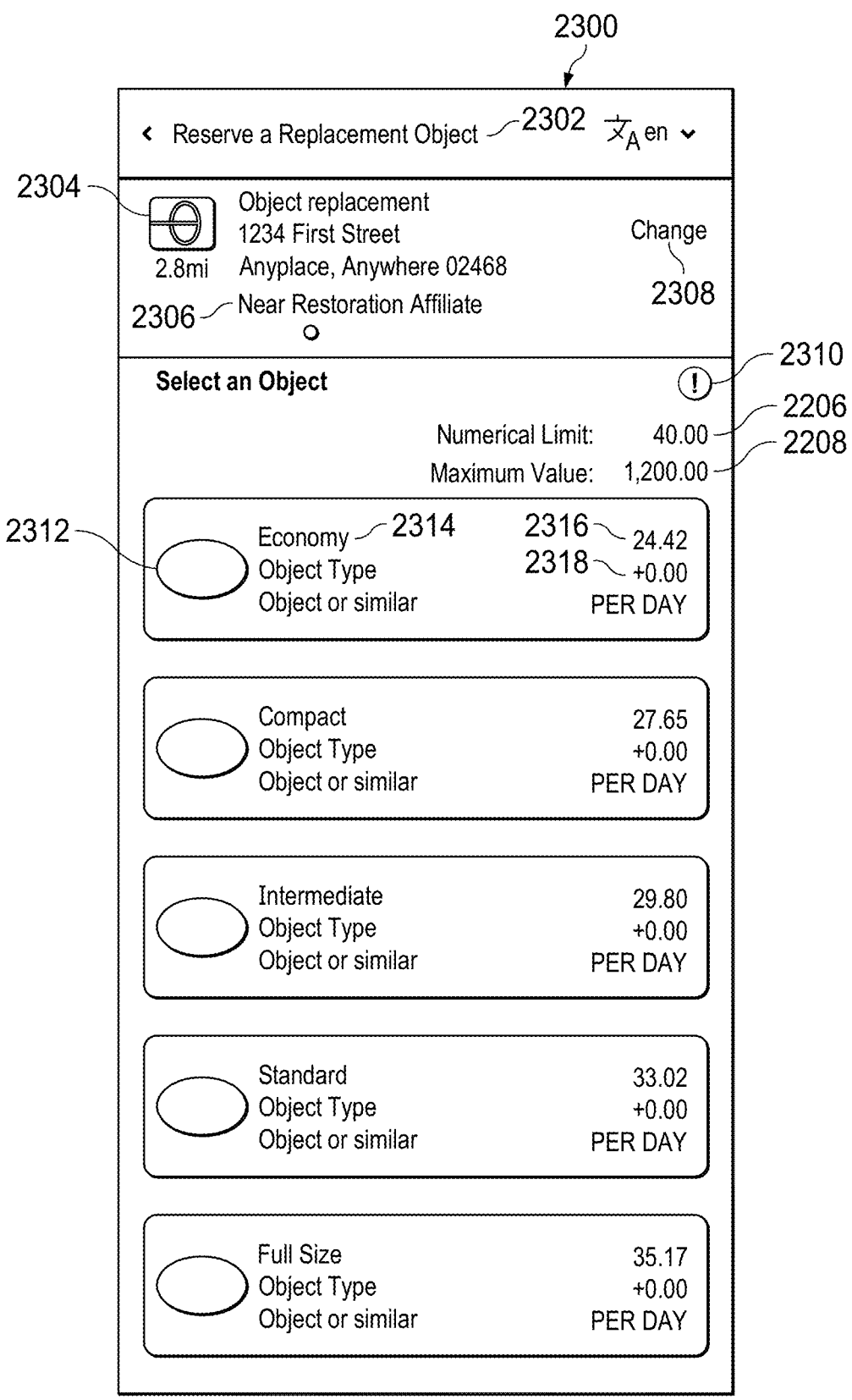

FIG. 23 shows a potential embodiment of a user interface on an endpoint device 104 wherein the user interface comprises a replacement object selection screen 2300. The replacement object selection screen 2300 may comprise a replacement object selection header 2302, a selected replacement object summary 2304, a replacement object benefit summary 2306, a selectable object to edit the selected replaceable object 2308, a selectable object for numerical limit explanations 2310, the replacement object numerical limit 2206, the replacement object maximum 2208, a replacement object category 2314 and icon 2312, a replacement object numerical value 2316, and a numerical comparison value 2318. The numerical comparison value 2318 may derive from calculations between the numerical limit 2206, replacement object maximum 2208, and the replacement object numerical value 2316. In one embodiment, the replacement object selection screen 2300, and/or its subparts, comprises one or both of modified vehicle data or vehicle output data.

Figure 24:
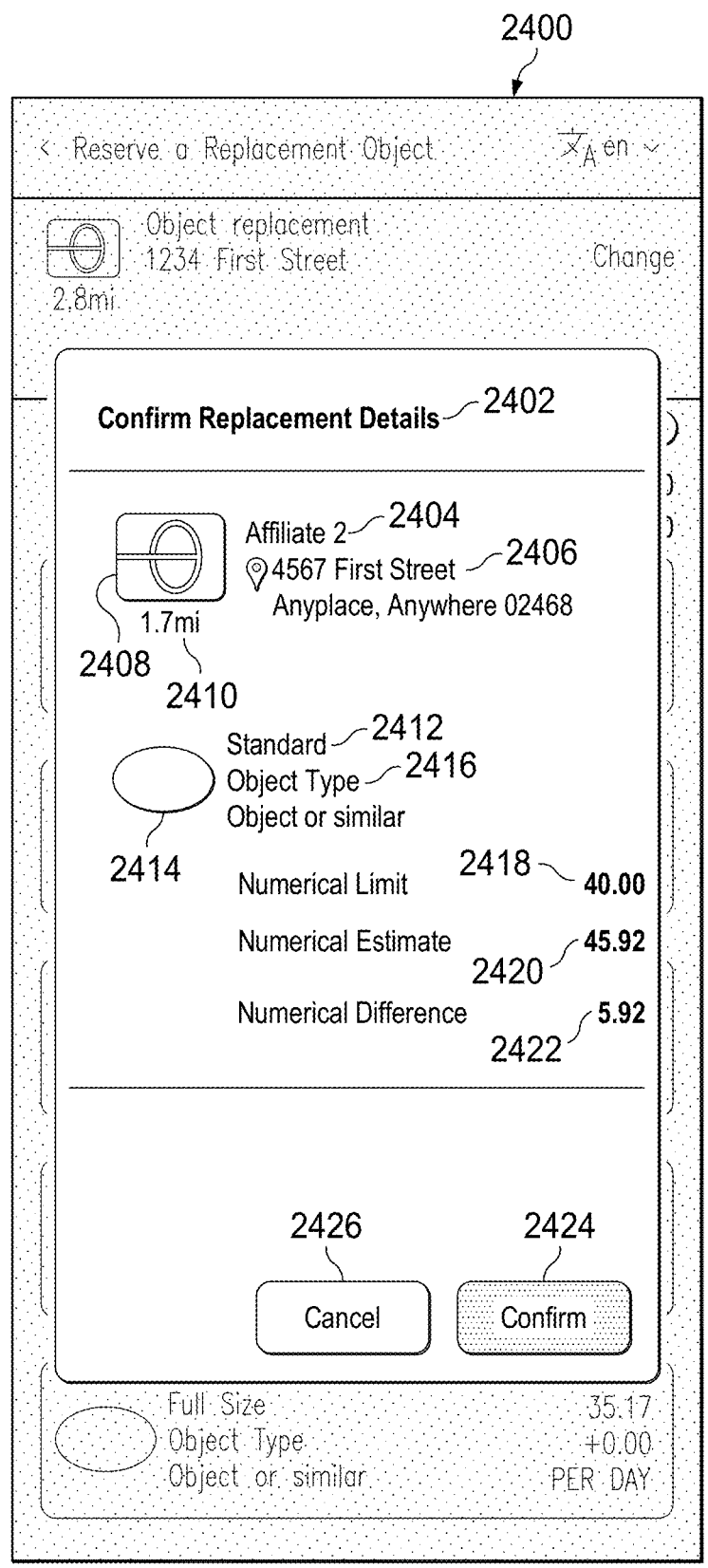

FIG. 24 shows a potential embodiment of a user interface at an endpoint device 104 wherein the user interface comprises a replacement object confirmation screen 2400. The replacement object confirmation screen 2400 may comprise a replacement object confirmation header 2402, a replacement object affiliate name 2404, a replacement object affiliate address 2406, a replacement object affiliate icon 2408, a replacement object affiliate numerical value 2410, a selected replacement object category 2412 and icon 2414, a replacement object category explanation 2416, a selected replacement object numerical limit 2418, a selected replacement object numerical value 2420, and a selected numerical comparison value 2422. The digital requester may go back to edit the selections on the summary page by selecting a cancel button 2426. The digital requester may confirm the selections on the summary page by selecting a confirmation button 2424. In one embodiment, the replacement object confirmation screen 2400, and/or its subparts, comprises one or both of modified vehicle data or vehicle output data.

Figures 1, 25A:
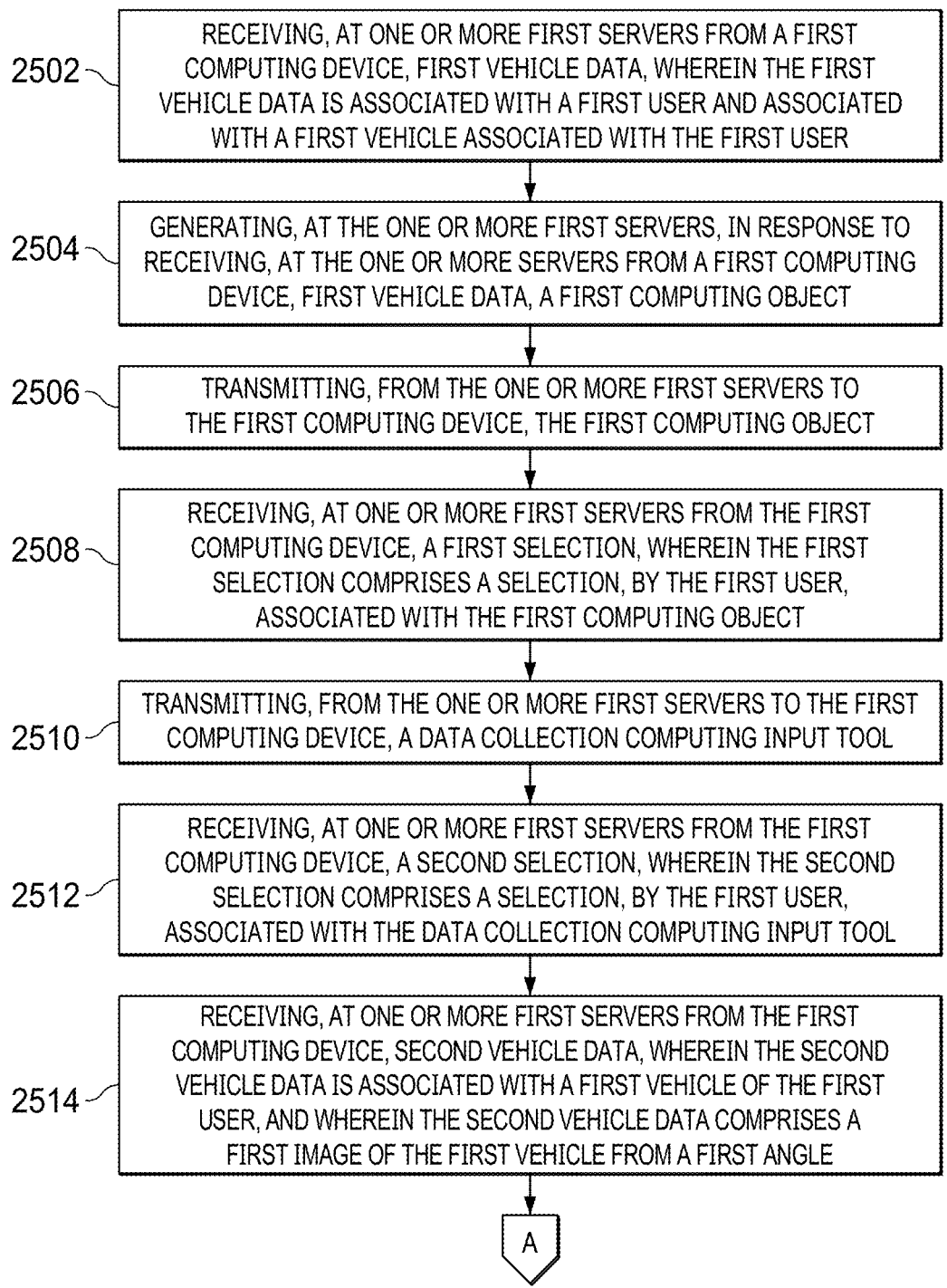
Figures 2, 25A:
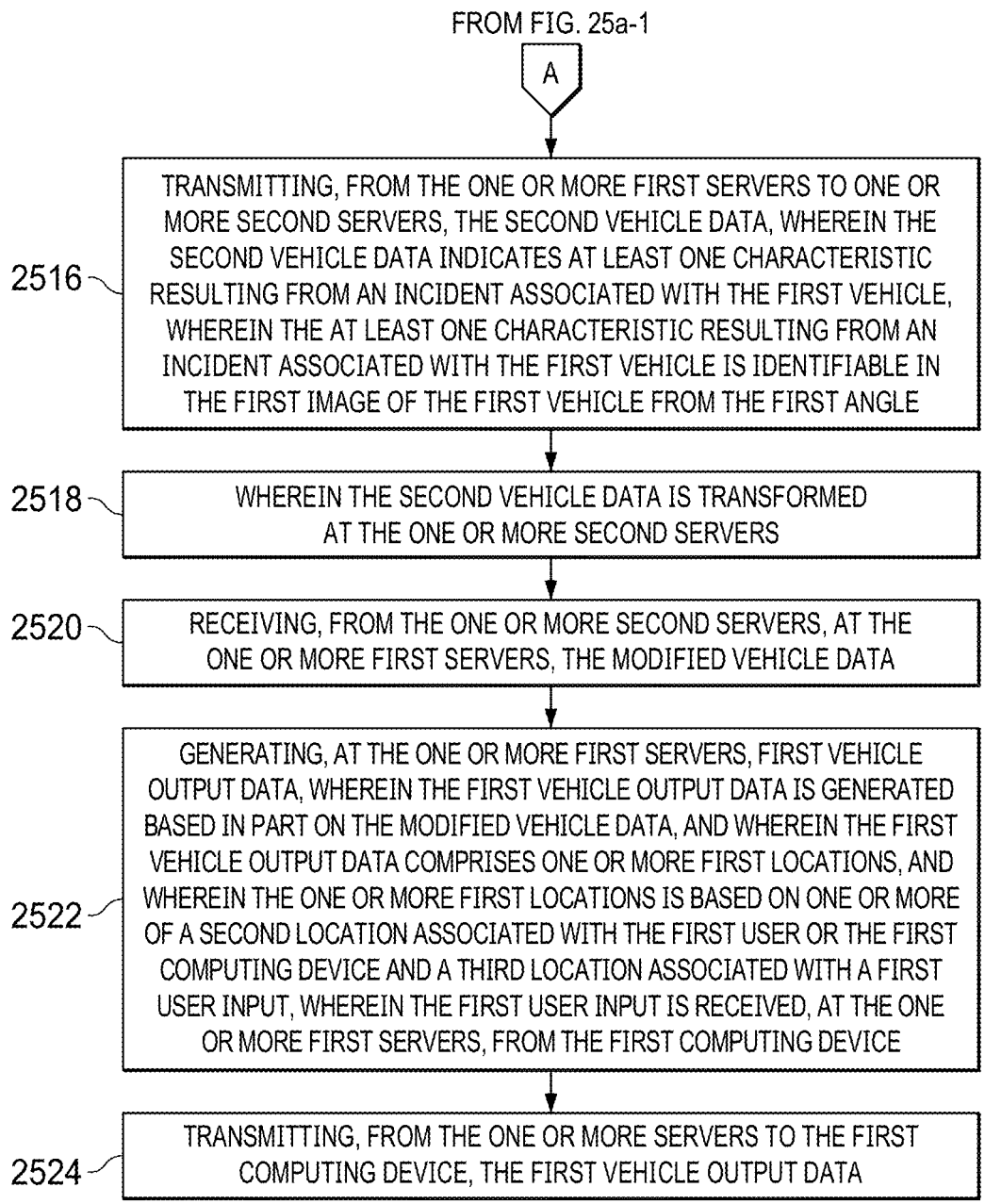

FIG. 25a-1 and FIG. 25a-2 show an example flowchart for transforming data, such as vehicle data, using a probabilistic network and a knowledge base generated using historic data, such as historic vehicle data, to generate improved output data, with associated elements described in association with the steps of this flowchart and the discussion for at least FIGS. 1-4 among additional descriptions herein, according to some embodiments of this disclosure. In some embodiments, the probabilistic network may comprise a multi-application network, a system 100, a network 106, a cloud server 102, and/or one or more network systems 138a . . . 138n. The improved output data may comprise a list of vehicle repair facilities, rental vehicle reservation options, salvage options, and/or damage severity/reparability data, such as an estimate of labor hours required to repair vehicle damage or a vehicle or accident characteristic as described herein. The various processes executed in the flowchart shown in FIGS. 25a-1 and 25a-2 may be executed by one or more multi-application networks such as the multi-application network discussed in association with one or more components of the system 100 shown in FIG. 1. Further, the various blocks in FIGS. 25a-1 and 25a-2 may be executed in a different order from that shown in FIGS. 25a-1 and 25a-2. In FIG. 25a-1 at block 2502, the method comprises receiving, at one or more first servers from a first computing device, first vehicle data, wherein the first vehicle data is associated with a first user and associated with a first vehicle associated with the first user. In some embodiments, the one or more first servers and/or the first computing device may comprise a multi-application network, a system 100, a network 106, a cloud server 102, an endpoint device 104, a vehicle connected to the system 100, or one or more network systems 138a . . . 138n. In some embodiments, the first vehicle data comprises one or more of hardware data associated with digital requester information 506, digital request information 508, biographic information, insurance information, basic vehicle data, and/or information related to an occurrence and object. In some embodiments, the receiving of the first vehicle data may be done through a network system interface 500. In some embodiments, the first vehicle data may be transmitted from the vehicle, the endpoint device 104, one or more network systems 138a . . . 138n, etc. In some embodiments, the first vehicle data comprises one or more of biographic data, insurance data, vehicle make data, or vehicle model data associated with the first user. In some embodiments, a first user comprises a vehicle insurance customer. At block 2504, the method comprises generating, at the one or more first servers, in response to receiving, at the one or more first servers from a first computing device, first vehicle data, a first computing object. In some embodiments, the first computing object may comprise an electronic communication like a text message or a selectable object 606, such as a link generated for the customer to direct them to a site or mobile application for further data collection. At block 2506, the method comprises transmitting, from the one or more first servers to the first computing device, the first computing object. In some embodiments, the transmitting of the first computing object comprises sending the selectable object 606 to an endpoint device 104, such as the customer's phone, laptop, dongle, or other computing device. At block 2508 the method comprises, receiving, at one or more first servers from the first computing device, a first selection, wherein the first selection comprises a selection, by the first user, associated with the first computing object. In some embodiments, a first selection comprises the customer selecting the selectable object 606 to continue to further data collections.

At block 2510, the method comprises transmitting, from the one or more first servers to the first computing device, a data collection computing input tool. In some embodiments, the data collection computing input tool comprises a mobile application or website containing an interface or form, such as the interfaces presented in FIGS. 5 and 6 and the user interfaces presented in FIGS. 12, 13, 14, 15 and 16. In some embodiments, the data collection computing input tool comprises a user interface for use by the first user, wherein the user interface comprises one or more selectable or fillable computing data objects, wherein the one or more selectable computing data objects are capable of selection, by the first user at the first computing device, of one or more first selectable options and wherein the one or more fillable computing data objects are capable of receiving, from the first user at the first computing device, one or more first user input data. In some embodiments, the one or more selectable or fillable computing data objects may comprise occurrence inquiries 1306 that may be answered by response buttons 1308, fill-in boxes 1310, and/or any other input feature, such as those shown in FIG. 13. In some embodiments, the one or more first selectable options and one or more fillable options may comprise options, such as data as described herein, selectable by a user, for example by clicking or pressing the object, or computing objects capable of receiving a user selection, for example receiving data by clicking the object, or data input, for example by entering data such as text into the object. In some embodiments, the one or more first user input data may comprise digital request information and/or vehicle and incident information helpful for assessing the impact of the incident on the vehicle. In some embodiments, the one or more first selectable options of the one or more selectable computing data objects and one or more fillable options of the one or more fillable computing data objects are transmitted, by the first computing device, to the one or more first servers, and the one or more first selectable options of the one or more selectable computing data objects and the one or more fillable options of the one or more fillable computing data objects are stored at a first database of the one or more first servers. In some embodiments, a first database of the one or more first servers may comprise a cloud storage 120, local storage 122, memory unit 204, and/or one or more network system local storage 140a . . . 140n. In some embodiments, the one or more first selectable options of the one or more selectable computing data objects and the one or more fillable options of the one or more fillable computing data objects that are stored at the first database of the one or more first servers are retrievable after a first instance when the data collection computing input tool is terminated at the first computing device. In some embodiments, the first instance is the period of time immediately after the data collection computing input tool is terminated at the first computing device. The above allows the user to retrieve collected data even if the data collection computing input tool is shut down.

Going back to FIG. 25a-1, at block 2512, the method comprises receiving, at one or more first servers from the first computing device, a second selection, wherein the second selection comprises a selection, by the first user, associated with the data collection computing input tool. In some embodiments, the second selection comprises the customer's decision to proceed further with the data collection process. The customer's decision may include accepting terms of service or any other action confirming the continuation of the data collection process. At block 2514, the method comprises receiving, at one or more first servers from the first computing device, second vehicle data, wherein the second vehicle data is associated with a first vehicle of the first user, and wherein the second vehicle data comprises a first image of the first vehicle from a first angle. In some embodiments, the second vehicle data comprises alphanumeric or multimedia submissions, such as an visual or audio upload, to assess the damage of a vehicle due to an accident or wreck. In some embodiments, the first image comprises alphanumeric, multimedia, or document submissions, such as a visual upload, audio upload, or a reporting message, to assess a characteristic of a vehicle due to an incident. In some embodiments, a first data point or associated data replaces the first image or is used in combination with a first image. In some embodiments, the first angle comprises an isometric, front, back, side, zoomed in, or zoomed out viewing perspective of the vehicle. In some embodiments, the second vehicle data comprises a second image of the first vehicle from a second angle. In some embodiments, the second image comprises alphanumeric, multimedia, or document submissions, such as a visual upload, audio upload, or a reporting message, to assess the characteristic of a vehicle due to an incident. In some embodiments, the first and/or second angle may comprise a 360 degree or panoramic perspective. In some embodiments, an incident may comprise a vehicle accident, a vehicle wreck, or an event which causes a vehicle scratch, dent, hole, broken component or part, missing component or part, component or part not working as intended, or other abnormality. In some embodiments, a characteristic may comprise a vehicle scratch, dent, hole, broken component or part, missing component or part, component or part not working as intended, or other abnormality, aspect of, or damage to, a vehicle.

Going to FIG. 25a-2 at block 2516, the method comprises transmitting, from the one or more first servers to one or more second servers, the second vehicle data, wherein the second vehicle data indicates at least one characteristic resulting from an incident associated with the first vehicle, wherein the at least one characteristic resulting from an incident associated with the first vehicle is capable of being identified in the first image of the first vehicle from the first angle. In some embodiments, the one or more second servers may comprise a multi-application network, a system 100, a network 106, a cloud server 102, an endpoint device 104, a vehicle connected to the system 100, or one or more network systems 138a . . . 138n operated by a third party. In some embodiments, the at least one characteristic resulting from an incident associated with the first vehicle is not identifiable in the second image of the first vehicle from the second angle. In some embodiments, the incident comprises a vehicle accident, a vehicle wreck, a vehicle theft, a vehicle breakdown, vandalism, etc. At block 2518, the method comprises transforming, at the one or more second servers, the second vehicle data. In some embodiments, the transforming of the second vehicle data will comprise the steps listed in FIG. 25b. Returning to FIG. 25a-2, at block 2520, the method comprises transmitting, from the one or more second servers to the one or more first servers, the modified vehicle data. In some embodiments, the modified vehicle data, as further defined in the detailed description of FIG. 25c, comprises vehicle damage severity/reparability data. In some embodiments, vehicle damage severity/reparability data may comprise information such as whether it is more cost effective to repair a vehicle or salvage the vehicle, the labor hours and required parts for a repair, the potential length a rental vehicle will be required while repairs are in progress, and the cost analysis for each repair, salvage, and rental option. Turning back to FIG. 25a-2, at block 2522, the method comprises generating, from the one or more first servers, first vehicle output data, wherein the first vehicle output data is based in part on the modified vehicle data, and wherein the first vehicle output data comprises one or more first locations, and wherein the one or more first locations is based on one or more second locations associated with the first user or the first computing device and a third location associated with a first user input, wherein the first user input is received, at the one or more first servers, from the first computing device. In some embodiments, the first location, second location, third location, and any additional location may include global positioning system (GPS) coordinates, one or more internet protocol (IP) addresses, one or more media access control (MAC) addresses, geolocation information, one or more port numbers, one or more server numbers, one or more proxy names and/or numbers, device information (e.g., a serial number), one or more addresses, one or more zip codes, and/or the like.

In some embodiments, the first vehicle output data comprises generating a list or data of vehicle repair facilities and rental vehicle facilities based on the modified vehicle data and additional data, such as the customer's current location, occurrence location, or location of residence. In some embodiments, the customer's current location, occurrence location, or location of residence may be manually input by the customer, or may generate based on the operating system 130 of the customer's endpoint device 104. In some embodiments, vehicle output data further comprises one or more of repair data, repair facility data, rental vehicle reservation data, rental vehicle facility data, appraisal data, appraisal facility data, salvage data, or salvage facility data. At block 2524, the method comprises transmitting, from the one or more first servers to the first computing device, the first vehicle output data. In some embodiments, the transmitting of the first vehicle output comprises sending the generated data or list of repair facilities and rental vehicle facility options to the customer. In some embodiments, repair data may comprise original equipment manufacturer documents, original equipment manufacturer certification requirements, original equipment manufacturer procedures, or any other information relating to the ability of facilities to restore the vehicle. In some embodiments, repair facility data may comprise location data, certification data, inventory data, cost data, operation hours, and/or availability data for one or more potential repair facilities. In some embodiments, rental vehicle reservation data may comprise location data of one or more rental vehicles, categorical vehicle data such as type of one or more vehicles, cost of one or more rental vehicles, mileage of one or more rental vehicles, and/or other characteristic vehicle data. In some embodiments, rental vehicle facility data may comprise location data for one or more rental facilities, inventory data for the one or more rental facilities, associated costs at the one or more rental facilities, and/or operation hours of the one or more rental facilities. In some embodiments, appraisal data may comprise vehicle incident assessments such as time required to reverse the impact to the vehicle from the incident, cost of replacement vehicle parts and components to reverse the vehicle impact, whether the vehicle should be salvaged or repaired, and/or the difference in vehicle valuation before and after the incident. In some embodiments, appraisal facility data may comprise location data, cost data, operation hours, and/or availability data for one or more potential appraisal facilities. In some embodiments, salvage data may comprise vehicle incident assessments such as cost to scrap vehicle, value of functioning and nonfunctioning vehicle parts and components, and/or whether the vehicle should be salvaged.

In some embodiments, salvage facility data may comprise location data, cost data, operation hours, and/or availability data for one or more potential salvage facilities. In some embodiments, the vehicle output data may be provided to the user after the vehicle output data and modified vehicle data have been generated.

Figure 25B:
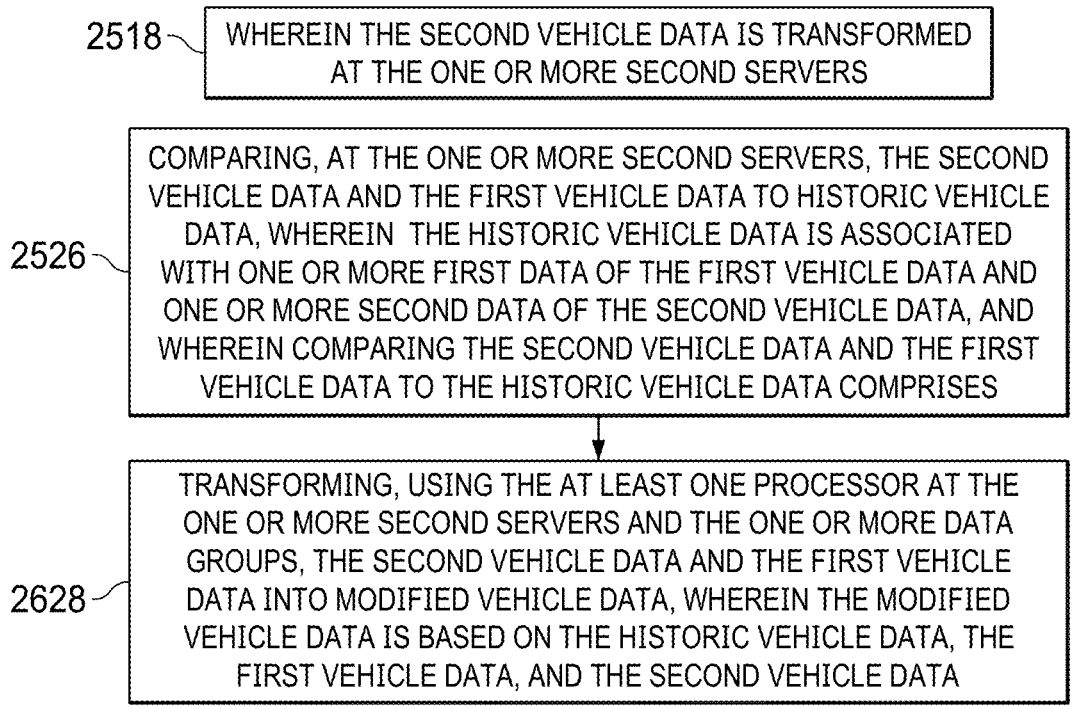
FIG. 25b shows a potential flowchart associated with an embodiment of methods and systems for transforming data using historic data and artificial intelligence data groups.

FIG. 25b is an example flowchart of transforming, at one or more second servers, the second vehicle data as shown at block 2518. At block 2526, the method comprises comparing, at the one or more second servers, the second vehicle data and the first vehicle data to historic vehicle data, wherein the historic vehicle data is associated with one or more first data of the first vehicle data and one or more second data of the second vehicle data. In some embodiments the historic vehicle data may comprise damage details for similar occurrences to similar vehicle makes and models. In some embodiments, the historic vehicle data comprises the damage severity analysis, associated costs, and outcomes from the similar occurrences to similar vehicle makes and models. In some embodiments, the historic vehicle data comprises one or more of historic vehicle output data, wherein the historic vehicle output data comprises one or more of historic biographic data, historic insurance data, historic vehicle make data, historic vehicle model data, historic vehicle damage data, historic vehicle damage severity data, historic user selection data, or historic modified data. In some embodiments, comparing the second vehicle data and the first vehicle data to historic vehicle data comprises the steps listed in FIG. 25c. Going back to FIG. 25b, at block 2528, the method comprises transforming, using the at least one processor at the one or more second servers and the one or more data groups, the second vehicle data and the first vehicle data into modified vehicle data, wherein the modified vehicle data is based on the historic vehicle data, the first vehicle data, and the second vehicle data. Further, the various blocks in FIG. 25b may be executed in a different order from that shown in FIG. 25b.

Figure 25C:
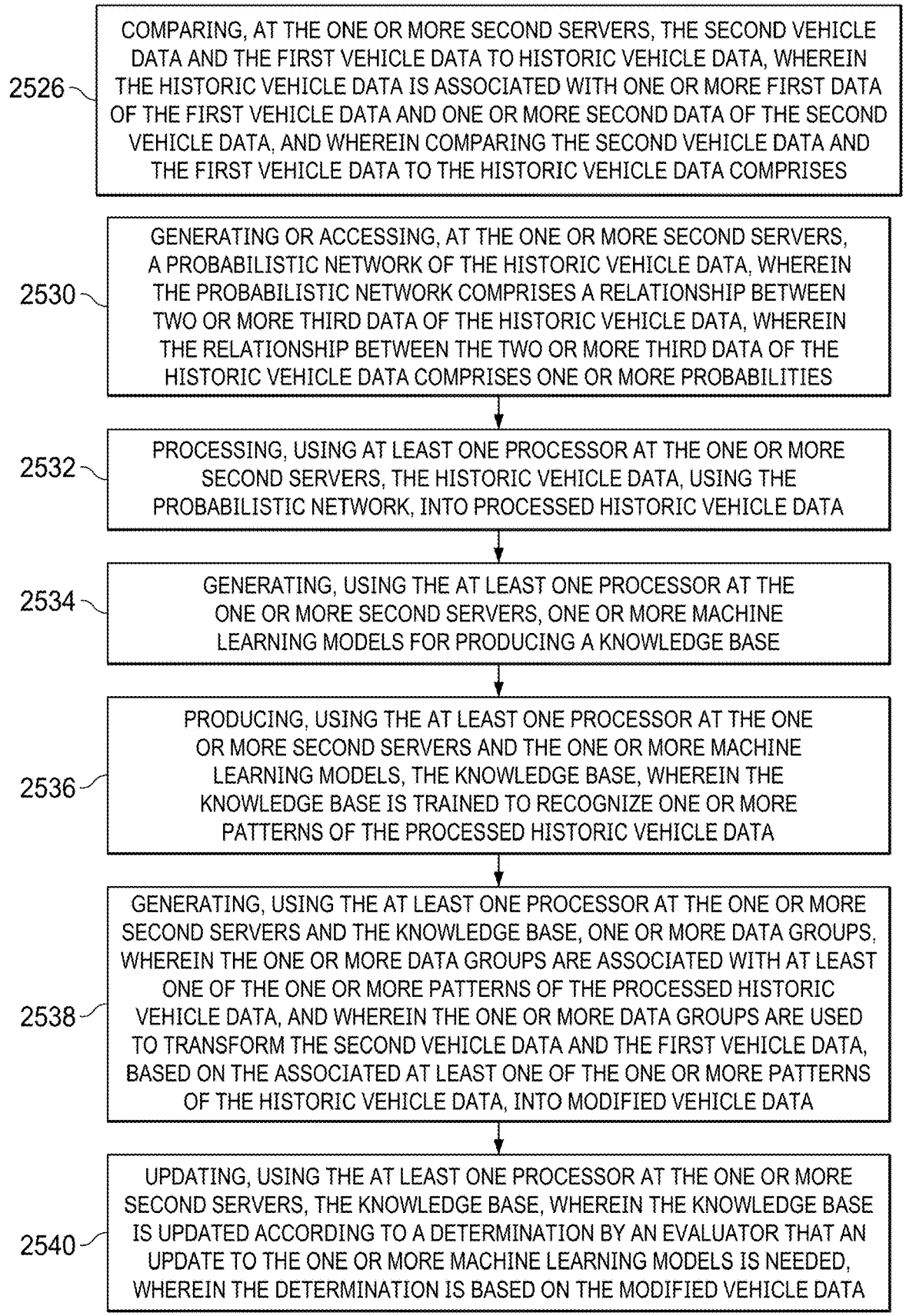
FIG. 25c shows a potential flowchart associated with an embodiment of methods and systems for updating a machine learning knowledge base.

FIG. 25c is an example flowchart of comparing, at the one or more second servers, the second vehicle data and the first vehicle data to historic vehicle data, wherein the historic vehicle data is associated with one or more first data of the first vehicle data and one or more second data of the second vehicle data, as shown at block 2526. At block 2530, the method comprises generating or accessing, at the one or more second servers, a first probabilistic network of the historic vehicle data, wherein the first probabilistic network comprises a relationship between two or more third data of the historic vehicle data, wherein the relationship between the two or more third data of the historic vehicle data comprises one or more probabilities. In some embodiments, the third data of the historic vehicle data comprises a probability that the particular historic occurrence and outcome will be the same as the occurrence and outcome of the second vehicle data. In some embodiments, the probabilities may be assigned by a machine learning or artificial intelligence process. In other embodiments the probabilities may be compiled manually or through structured algorithms. At block 2532, the method comprises processing, using at least one processor at the one or more second servers, the historic vehicle data, using the first probabilistic network, into processed historic vehicle data. In some embodiments, this processing of historic vehicle data into processed historic vehicle data may alter the data into arrays or other forms of easily understandable information for machine learning and artificial intelligence modeling. In some embodiments, the at least one processor comprises one or more multi-application networks such as the multi-application network discussed in association with one or more components of the system shown in FIG. 1. Returning to FIG. 25c, at block 2534, the method comprises generating, using the at least one processor at the one or more second servers, one or more machine learning models for producing a knowledge base. In some embodiments, the knowledge base comprises a trained artificial intelligence that can recognize data patterns to be used on the new data inputs, such as the first vehicle data and the second vehicle data, to predict outcomes. In some embodiments, the machine learning models may comprise data patterns and/or algorithms to artificially adapt to digital or analog inputs. At block 2536, the method comprises producing, using the at least one processor at the one or more second servers and the one or more machine learning models, the knowledge base, wherein the knowledge base is trained to recognize one or more patterns of the processed historic vehicle data. At block 2538, the method comprises generating, using the at least one processor at the one or more second servers and the knowledge base, one or more data groups, wherein the one or more data groups are associated with at least one of the one or more patterns of the processed historic vehicle data, and wherein the one or more data groups are used to transform the second vehicle data and the first vehicle data, based on the associated at least one of the one or more patterns of the historic vehicle data, into modified vehicle data. In some embodiments, the one or more data groups comprises data that is determined to be predictive based on patterns by the machine learning, artificial intelligence, algorithm, etc. An example of a data group would be the make and model of a vehicle combined with the accessibility of a part for the front bumper for that make and model and/or the labor hours required to replace that part. In some embodiments, the modified vehicle data comprises vehicle damage severity/reparability data, such as whether it is more cost effective to repair a vehicle or salvage the vehicle, the labor hours and required parts for a repair, and/or the potential length a rental vehicle will be required while repairs are in progress, and/or the cost analysis for each option. Modified vehicle data may also comprise original equipment manufacturer data with certification and experience requirements for vehicle repair facilities to adequately repair the assessed damage. At block 2540, the method may comprise updating, using the at least one processor at the one or more second servers, the knowledge base, wherein the knowledge base is updated according to a determination by an evaluator that an update to the one or more machine learning models is needed, wherein the determination is based on the modified vehicle data. In some embodiments, the machine learning model and artificial intelligence predictive knowledge base may be updated based on a predicted outcome generated from the knowledge base. In some embodiments, an evaluator may comprise an algorithm, a third party machine learning or artificial intelligence model, a predicted outcome, one or more network systems 138a . . . 138n, or a user of the knowledge base. Further, the various blocks in FIG. 25c may be executed in a different order from that shown in FIG. 25c.

Figure 25D:
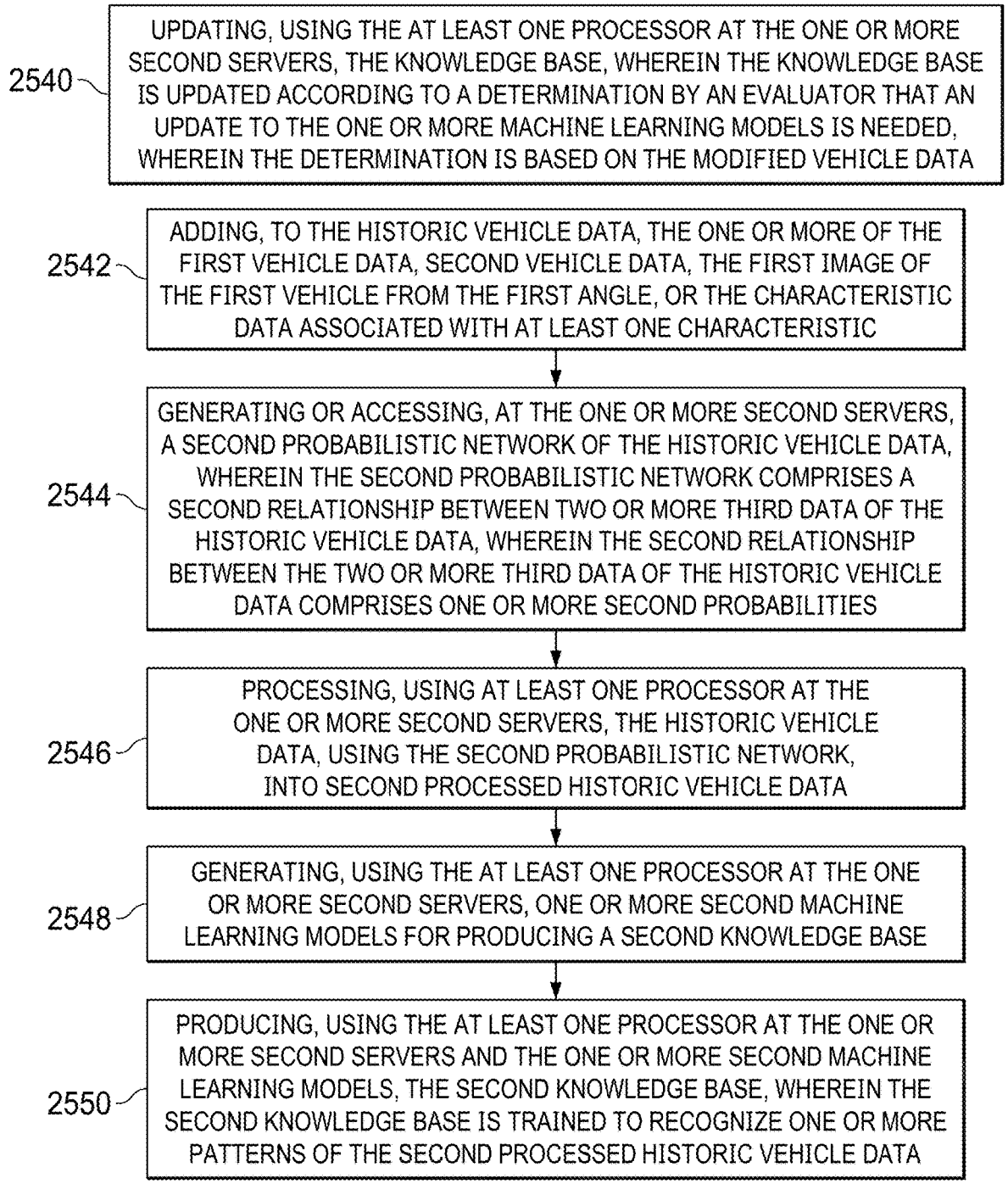
FIG. 25d shows a potential flowchart associated with an embodiment of methods and systems for updating a machine learning knowledge base.

FIG. 25d is an example flowchart of updating, using the at least one processor at the one or more second servers, the knowledge base, wherein the knowledge base is updated according to a determination by an evaluator that an update to the one or more machine learning models is needed, wherein the determination is based on the modified vehicle data, as shown at block 2526. At block 2542, the method comprises adding, to the historic vehicle data, the one or more of the first vehicle data, second vehicle data, the first image of the first vehicle from the first angle, or the characteristic data associated with at least one characteristic. At block 2544, the method comprises generating or accessing, at the one or more second servers, a second probabilistic network of the historic vehicle data, wherein the second probabilistic network comprises a second relationship between two or more third data of the historic vehicle data, wherein the second relationship between the two or more third data of the historic vehicle data comprises one or more second probabilities. In some embodiments, the second probabilistic network may comprise a multi-application network, a system 100, a network 106, a cloud server 102, and/or one or more network systems 138*a* . . . 138*n*. At block 2546, the method comprises processing, using at least one processor at the one or more second servers, the historic vehicle data, using the second probabilistic network, into second processed historic vehicle data. In some embodiments, this processing of second historic vehicle data into second processed historic vehicle data may alter the data into arrays or other forms of easily understandable information for machine learning and artificial intelligence modeling. At block 2548, the method comprises generating, using the at least one processor at the one or more second servers, one or more second machine learning models for producing a second knowledge base. In some embodiments, the second knowledge base comprises a trained artificial intelligence that can recognize data patterns to be used on the new data inputs, such as the first vehicle data and the second vehicle data, to predict outcomes. In some embodiments, the second machine learning models may comprise data patterns and/or algorithms to analyze digital or analog inputs. At block 2550, the method comprises producing, using the at least one processor at the one or more second servers and the one or more second machine learning models, the second knowledge base, wherein the second knowledge base is trained to recognize one or more patterns of the second processed historic vehicle data. Further, the various blocks in FIG. 25*d* may be executed in a different order from that shown in FIG. 25*d*.

Figures 1, 25E:
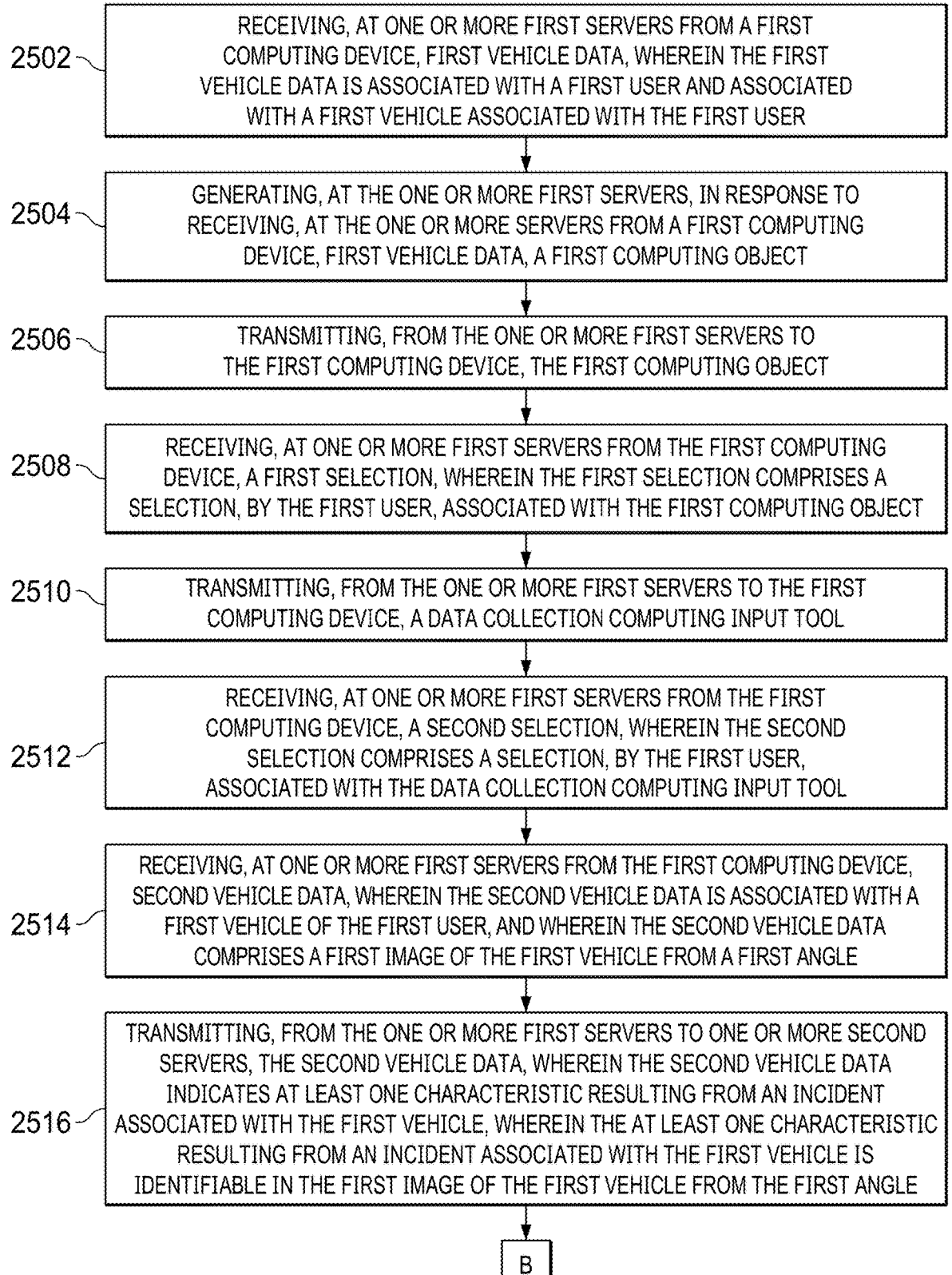
Figures 2, 25E:
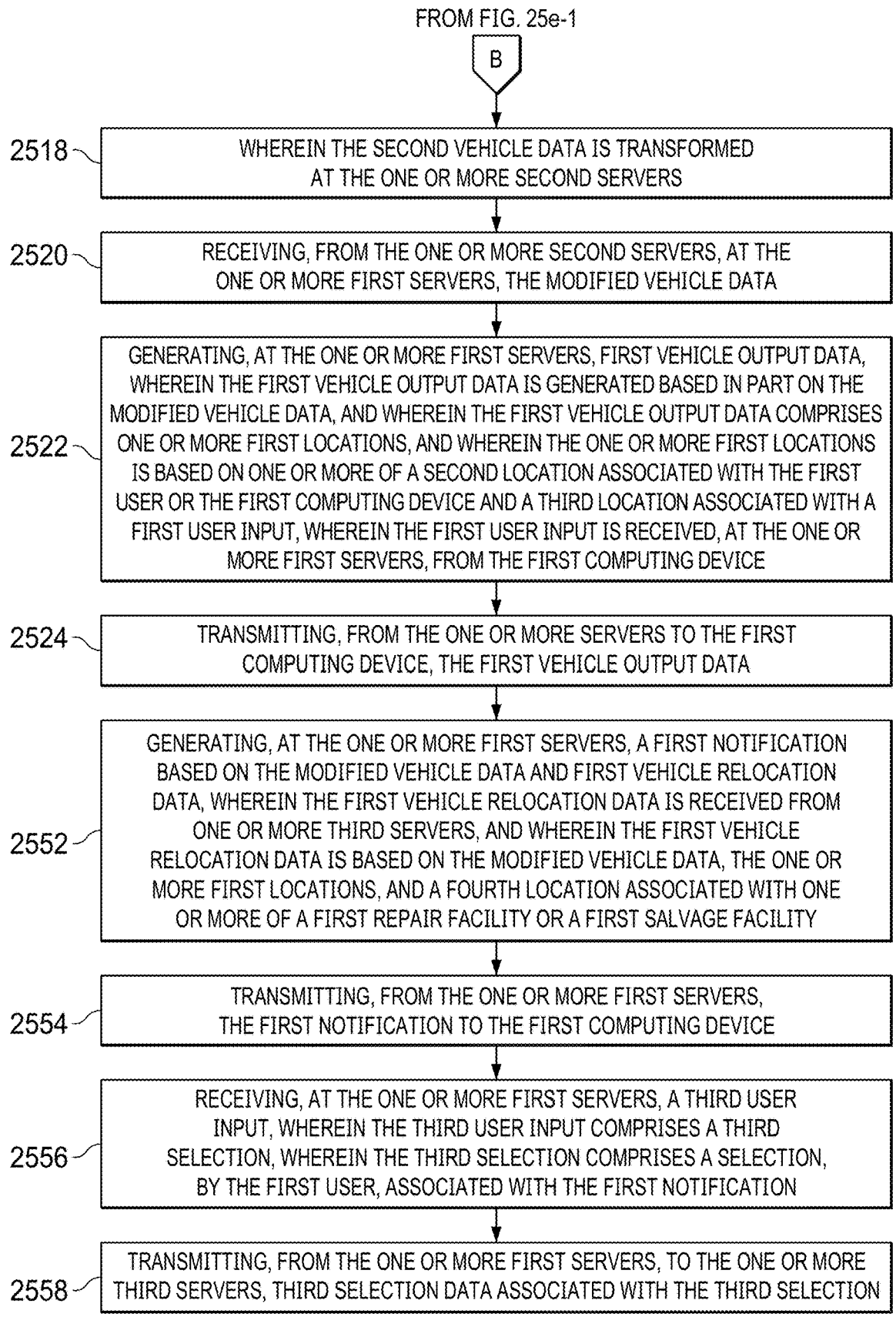

FIGS. 25*e*-1 and 25*e*-2 show an alternate flowchart of for transforming data, such as vehicle data, using a probabilistic network and a knowledge base generated using historic data, such as historic vehicle data, to generate improved output data in association with FIG. 1. according to some embodiments of this disclosure. The improved output data may comprise a list of vehicle repair facilities, rental vehicle reservation options, salvage options, and/or damage severity/reparability data. The various processes executed in flowchart shown in FIGS. 25*e*-1 and 25*e*-2 may be executed by one or more multi-application networks such as the multi-application network discussed in association with one or more components of the system 100 shown in FIG. 1. Further, the various blocks in FIGS. 25*e*-1 and 25*e*-2 may be executed in a different order from that shown in FIGS. 25*e*-1 and 25*e*-2. At blocks 2502 through 2516, the flowchart in FIG. 25*e*-1 is identical to blocks 2502 through 2516 in FIGS. 25*a*-1 and 25*a*-2. At blocks 2518 through 2524, the flowchart of FIG. 25*e*-2 is identical to blocks 2518 through 2524 of the flowchart of FIG. 25*a*-2. Going to FIG. 25*e*-2, at block 2552, the method comprises generating, at the one or more first servers, a first notification based on the modified vehicle data and first vehicle relocation data, wherein the first vehicle relocation data is received from one or more third servers, and wherein the first vehicle relocation data is based on the modified vehicle data, the one or more first locations, and a fourth location associated with one or more of a first repair facility or a first salvage facility. In some embodiments, the first notification may comprise an electronic communication like a text message or a selectable object 606, such as a hyperlink. In some embodiments, the first vehicle relocation data may comprise one or more geographic coordinates or directions to geographic locations. In some embodiments, the one or more third servers may comprise a multi-application network, a system 100, a network 106, a cloud server 102, an endpoint device 104, a vehicle connected to the system 100, or one or more network systems 138*a* . . . 138*n*. In some embodiments, a first repair facility may comprise a mechanic, vehicle dealership, and/or service shop. In some embodiments a first salvage facility includes a salvage yard and/or an automotive part store. At block 2554, the method comprises transmitting, from the one or more first servers, the first notification to the first computing device. At block 2556, the method comprises receiving, at the one or more first servers, a third user input, wherein the third user input comprises a third selection, wherein the third selection comprises a selection, by the first user, associated with the first notification. At block 2558, the method comprises transmitting, from the one or more first servers, to the one or more third servers, third selection data associated with the third selection. In some embodiments, the selection may include clicking on a link to get redirected to a website, choosing a specific option through an affirmative action, or performing an action to accept or confirm a choice. In some embodiments, the third selection data may comprise confirmation or proof of the third selection.

Figures 1, 25F:
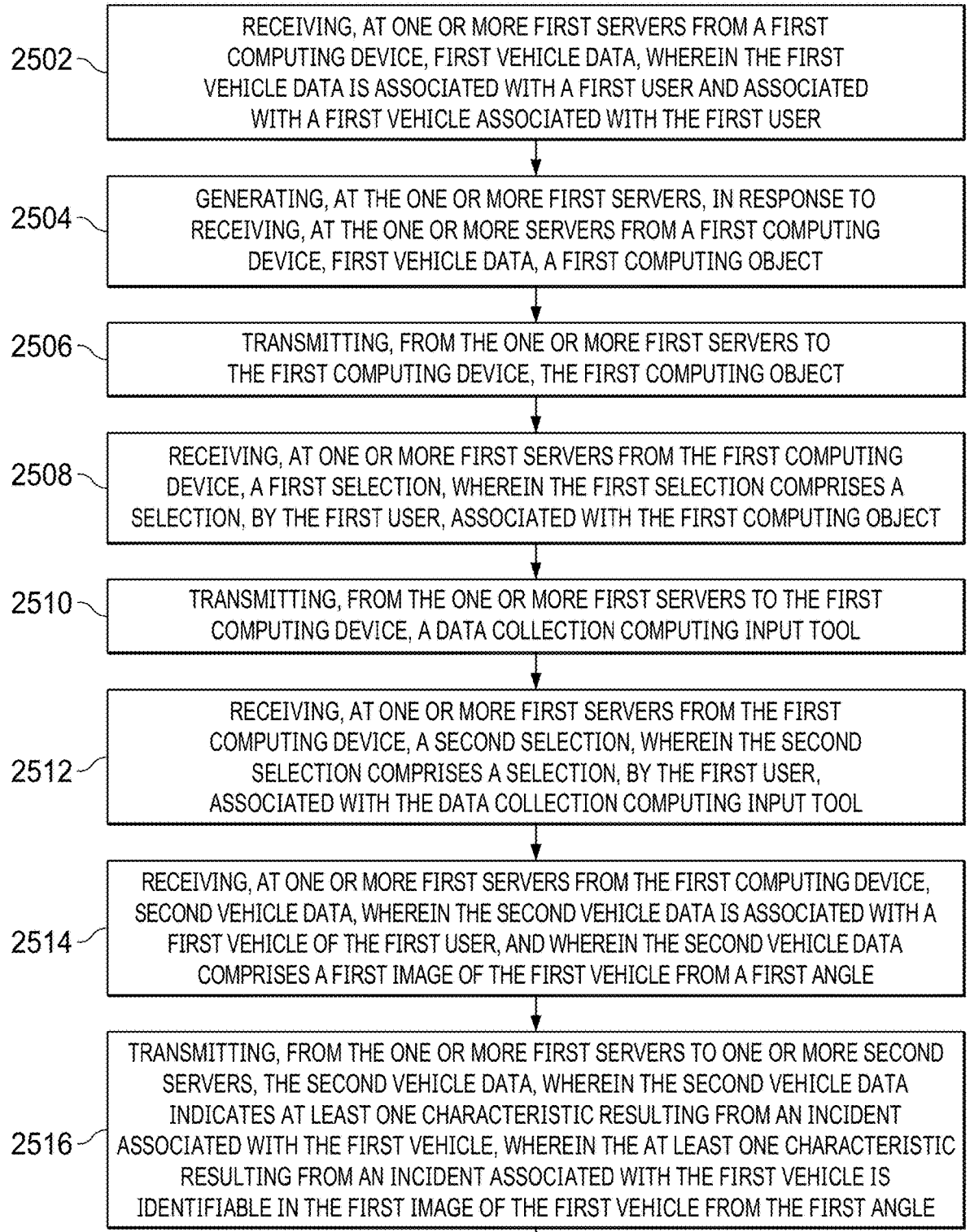
Figures 2, 25F:
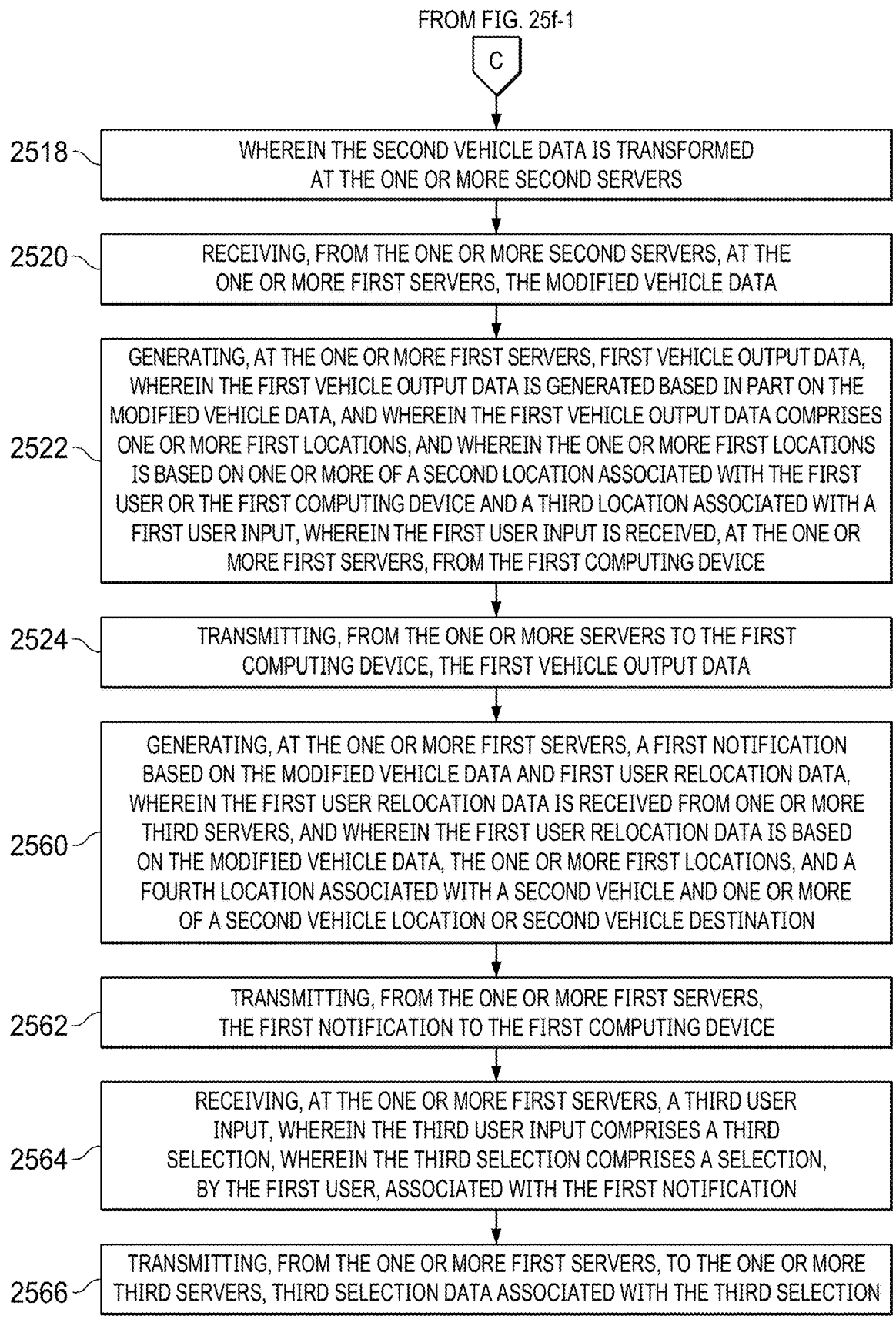

FIGS. 25*f*-1 and 25*f*-2 show a flowchart with an alternate embodiment for transforming data, such as vehicle data, using the probabilistic network and a knowledge base generated using historic data, such as historic vehicle data, to generate improved output data in association with FIG. 1. according to some embodiments of this disclosure. The improved output data may comprise a list of vehicle repair facilities, rental vehicle reservation options, salvage options, and/or damage severity/reparability data. The various processes executed in the flowchart shown in FIGS. 25*f*-1 and 25*f*-2 may be executed by one or more multi-application networks such as the multi-application network discussed in association with one or more components of the system 100 shown in FIG. 1. Further, the various blocks shown in FIGS. 25*f*-1 and 25*f*-2 may be executed in a different order from that shown in FIGS. 25*f*-1 and 25*f*-2. At blocks 2502 through 2516, the flowchart in FIG. 25*f*-1 is identical to blocks 2502 through 2516 in FIGS. 25*a*-1 and 25*a*-2. At blocks 2518 through 2524, the flowchart of FIG. 25*f*-2 is identical to blocks 2518 through 2524 of the flowchart of FIG. 25*a*-2. Going back to FIG. 25*f*-2, at block 2560, the method comprises generating, at the one or more first servers, a first notification based on the modified vehicle data and first user relocation data, wherein the first user relocation data is received from one or more third servers, and wherein the first user relocation data is based on the modified vehicle data, the one or more first locations, and a fourth location associated with a second vehicle and one or more of a second vehicle location or second vehicle destination. At block 2562, the method comprises transmitting, from the one or more first servers, the first notification to the first computing device. At block 2564, the method comprises receiving, at the one or more first servers, a third user input, wherein the third user input comprises a third selection, wherein the third selection comprises a selection, by the first user, associated with the first notification. At block 2566, the method comprises transmitting, from the one or more first servers, to the one or more third servers, third selection data associated with the third selection.

In some embodiments, the methods described may also be executed within a system. In some embodiments of the corresponding system, the one or more first servers and the one or more second servers are the same server. In some embodiments of the system, the one or more first servers, the one or more second servers, and the first computing device communicate via a cloud-based network. In some embodiments, the cloud-based network comprises a system 100 wherein the network 106 or the system 100 as a whole exists on the cloud via the internet. In some embodiments of the system, the one or more first servers, the one or more second servers, and the first computing device communicate via a local network. In some embodiments, the local network comprises a network 106 that is managed from a command line or server accessible without the internet. In some embodiments of the system, the at least one characteristic resulting from an incident associated with the first vehicle is vehicle damage, and wherein the incident associated with the first vehicle is one or more of a vehicle accident associated with the first vehicle, a vehicle crash associated with the first vehicle, or a vehicle incident where damage is caused to the first vehicle.

Figure 25G:
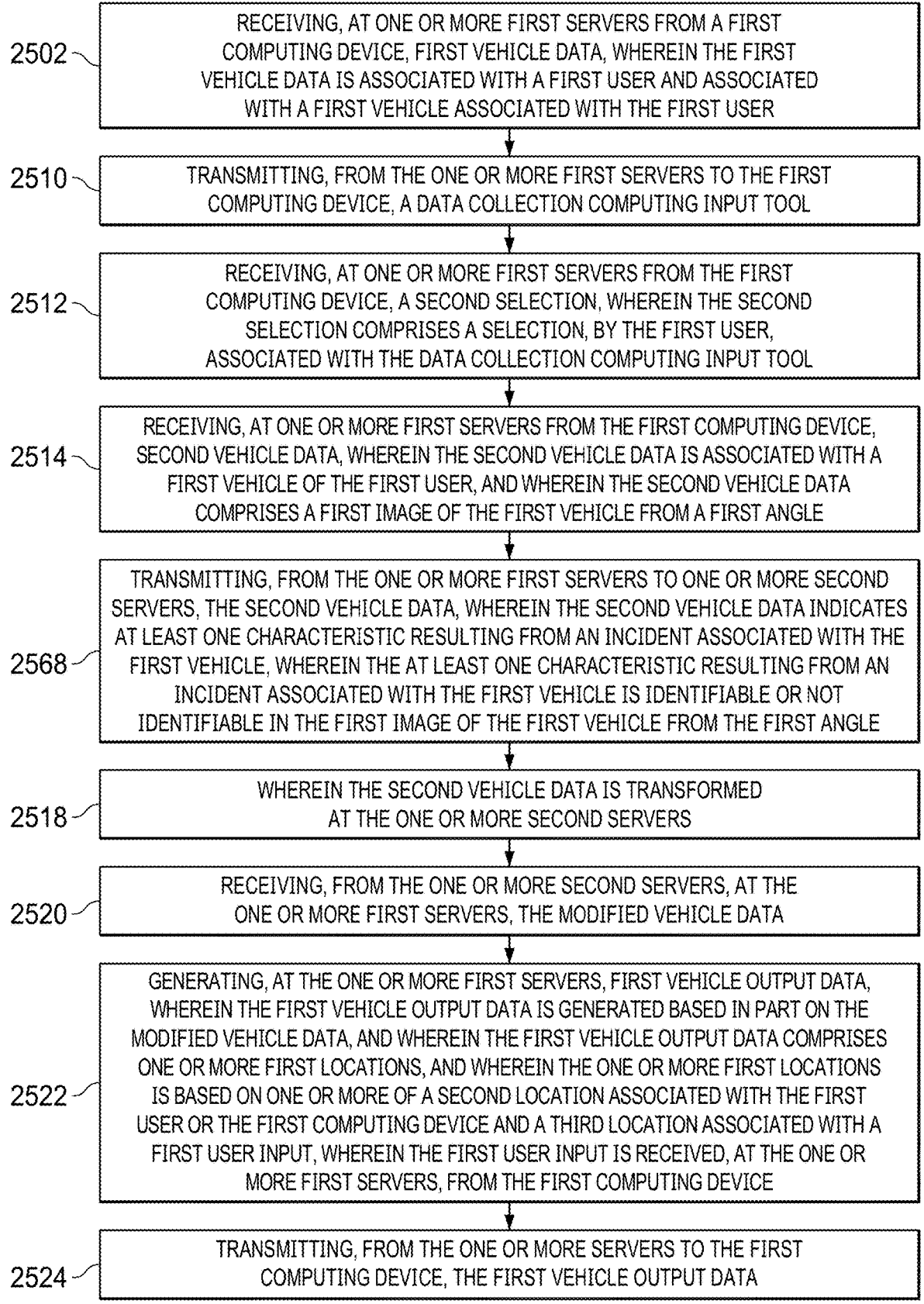
FIGS. 25g shows a potential flowchart associated with an alternative embodiment of methods and systems for transforming data using a probabilistic network and a knowledge base to generate improved output data.

FIG. 25g is a flowchart of for transforming data, such as vehicle data, using the probabilistic network and a knowledge base generated using historic data, such as historic vehicle data, to generate improved output data in association with FIG. 1. according to some embodiments of this disclosure. The improved output data may comprise a list of vehicle repair facilities, rental vehicle reservation options, salvage options, and/or damage severity/reparability data. The various processes executed in flowchart FIG. 25g may be executed by one or more multi-application networks such as the multi-application network discussed in association with one or more components of the system 100 shown in FIG. 1. Further, the various blocks in FIG. 25g may be executed in a different order from that shown in FIG. 25g. At blocks 2568, the method comprises transmitting, from the one or more first servers to one or more second servers, the second vehicle data, wherein the second vehicle data indicates at least one defect resulting from an incident associated with the first vehicle, wherein the at least one characteristic resulting from an incident associated with the first vehicle is identifiable or not identifiable in the first image of the first vehicle from the first angle.

An invention, and the software and/or network services comprising the invention, can provide some or all of the functionality described herein related to machine learning. For example, a network service can be deployed through a service provider network (e.g., using an operating system and/or application programs). The network service can allow for third party use of the techniques described herein for applying machine learning of an auxiliary machine learning model with a relatively large capacity. The network service can be deployed across one or more host processors, computers, servers, or other computer hardware, and can be provided over one or more network connections. Additionally, according to at least one example, knowledge related to the size and attributes of labeled machine learning training observations can be stored or retained at the one or more local storage 122, cloud storage 120, or one or more network system local storages 140a . . . 140n. While the subject matter described herein is presented in the general context of program modules that execute in conjunction with the execution of an operating system and application programs on a computer system, those skilled in the art will recognize that other examples can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with various computer system configurations, including single-processor or multi-processor systems, single core or multi-core processors, microprocessor-based or programmable consumer electronics, hand-held computing devices, minicomputers, personal computers, mainframe computers, combinations thereof, and the like.

Encoding the multi-application network and its components presented herein also may transform the physical structure of the computer readable media presented herein. The specific transformation of physical structure may depend on various factors, in different implementations of this description. Examples of such factors may include, but are not limited to, the technology used to implement the one or more network systems 138a . . . 138n, whether the one or more network system local storages 140a . . . 140n are characterized as primary or secondary storages, and the like. For example, if the one or more network system local storages 140a . . . 140n are implemented as semiconductor-based memories, the methods disclosed herein may be encoded on the one or more network system local storages 140a . . . 140n by transforming the physical state of the semiconductor memory. For example, the methods may transform the state of transistors, capacitors, or other discrete circuit elements constituting the semiconductor memory. The methods also may transform the physical state of such components in order to store data thereupon.

As another example, the one or more network system local storages 140a . . . 140n described herein may be implemented using magnetic or optical technology. In such implementations, the methods presented herein may transform the physical state of magnetic or optical media, when the methods are encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this description. In light of the above, it should be appreciated that many types of physical transformations take place in the potential system 100 in order to store and execute the software components presented herein.

In some embodiments, the multi-application network may function as a probabilistic network to transform vehicle data. In some embodiments, the one or more cloud storages 120, local storages 122, and/or one or more network system local storages 140a . . . 140n may contain historic vehicle data. In some embodiments, the one or more network systems 138a . . . 138n, one or more cloud servers 102, and one or more endpoint devices 104 may comprise a knowledge base generated using the historic vehicle data to generate improved vehicle output data.

All potential embodiments of user interface described above may be accessed through devices other than an endpoint device 104, such as through a cloud-based device or through one or more network servers 138a . . . 138n. Although one digital requester was often mentioned in the prior detailed descriptions, other embodiments comprise one or more digital requesters submitting information into the user interfaces. Any mention of a selectable object may comprise a clickable hyperlink, button, or icon to redirect a user to another digital location. Any mention of a singular network system may comprise one or more network systems 138a . . . 138n or one or more cloud servers 102.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art. Any other variation of fabrication, use, or application should be considered apparent as an alternative embodiment of the present invention.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

As used herein, the term "if" may be construed to mean "when" or "upon" or "in response to determining" or "in response to detecting," depending on the context.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context. These terms are used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

Those with skill in the art will appreciate that while some terms in this disclosure may refer to absolutes, e.g., all source receiver traces, each of a plurality of objects, etc., the methods and techniques disclosed herein may also be performed on fewer than all of a given thing, e.g., performed on one or more components and/or performed on one or more source receiver traces. Accordingly, in instances in the disclosure where an absolute is used, the disclosure may also be interpreted to be referring to a subset.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. The embodiments were chosen and described in order to explain the principles of the disclosed subject-matter and its practical applications, to thereby enable others skilled in the art to use the technology disclosed and various embodiments with various modifications as are suited to the particular use contemplated. It is intended that the scope of the present disclosure be limited not by this detailed description, but rather by the claims of this application. As will be understood by those familiar with the art, the present disclosure may be embodied in other specific forms without departing from the spirit or essential characteristics thereof. It is appreciated that the term optimize/optimal and its variants (e.g., efficient or optimally) may simply indicate improving, rather than the ultimate form of 'perfection' or the like. Accordingly, the present disclosure is intended to be illustrative, but not limiting, of the scope of the present disclosure, which is set forth in the following claims.

What is claimed is:

1. A method of transforming vehicle data using a probabilistic network and a knowledge base generated using historic vehicle data to generate improved vehicle output data, the method comprising:
   receiving, at one or more first servers from a first computing device, first vehicle data, wherein the first vehicle data is associated with a first user and associated with a first vehicle associated with the first user;
   generating, at the one or more first servers, in response to receiving, at the one or more first servers from the first computing device, the first vehicle data, a first computing object;
   transmitting, from the one or more first servers to the first computing device, the first computing object;
   receiving, at the one or more first servers from the first computing device, a first selection, wherein the first selection comprises a selection, by the first user, associated with the first computing object;
   receiving, at the one or more first servers from the first computing device, second vehicle data, wherein the second vehicle data is associated with the first vehicle of the first user, and wherein the second vehicle data comprises a first image of the first vehicle from a first angle, wherein the second vehicle data indicates at least one characteristic resulting from an incident associated with the first vehicle, wherein the at least one characteristic resulting from the incident associated with the first vehicle is identifiable in the first image of the first vehicle from the first angle, wherein the second vehicle data is transformed at the one or more first servers, wherein transforming the second vehicle data comprises:
      comparing, at the one or more first servers, the second vehicle data or the first vehicle data to the historic vehicle data, wherein the historic vehicle data is associated with one or more first data of the first vehicle data or one or more second data of the second vehicle data, and wherein comparing the second vehicle data or the first vehicle data to the historic vehicle data comprises:

generating or accessing, at the one or more first servers, a probabilistic network of the historic vehicle data, wherein the probabilistic network comprises a relationship between two or more third data of the historic vehicle data, wherein the relationship between the two or more third data of the historic vehicle data comprises one or more probabilities;

processing, using at least one processor at the one or more first servers, the historic vehicle data, using the probabilistic network, into processed historic vehicle data;

generating, using the at least one processor at the one or more first servers, one or more machine learning models for producing a knowledge base;

producing, using the at least one processor at the one or more first servers and the one or more machine learning models, the knowledge base, wherein the knowledge base is trained to recognize one or more patterns of the processed historic vehicle data; and generating, using the at least one processor at the one or more first servers and the knowledge base, one or more data groups, wherein the one or more data groups are associated with at least one of the one or more patterns of the processed historic vehicle data, and wherein the one or more data groups are used to transform the second vehicle data and the first vehicle data, based on the associated at least one of the one or more patterns of the historic vehicle data, into modified vehicle data; and transforming, using the at least one processor at the one or more first servers and the one or more data groups, the second vehicle data and the first vehicle data into the modified vehicle data, wherein the modified vehicle data is based on the historic vehicle data or the first vehicle data or the second vehicle data;

generating, at the one or more first servers, first vehicle output data, wherein the first vehicle output data is generated based in part on the modified vehicle data, and wherein the first vehicle output data comprises one or more first locations, and wherein the one or more first locations is based on one or more of a second location associated with the first user or the first computing device and a third location associated with a first user input, wherein the first user input is received, at the one or more first servers, from the first computing device; and transmitting, from the one or more first servers to the first computing device, the first vehicle output data.

2. The method of claim 1, wherein the first vehicle data is associated with both the first user associated with the first vehicle and a second user associated with a second vehicle.

3. The method of claim 2, wherein the second vehicle data is associated with both the first vehicle and the second vehicle.

4. The method of claim 1, further comprising:
receiving, at the one or more first servers, a third user input, wherein the third user input comprises a second selection, wherein the second selection comprises a selection, by the first user, associated with the first vehicle output data; and
transmitting, from the one or more first servers, to one or more second servers, second selection data associated with the second selection.

5. The method of claim 1, wherein the incident comprises a vehicle accident, a vehicle wreck, a vehicle theft, a vehicle breakdown, or vandalism of a vehicle.

6. The method of claim 1, further comprising receiving, at the one or more first servers from the first computing device, a third selection, wherein the third selection comprises a selection, by the first user, associated with a data collection computing input tool, wherein the third selection comprises acceptance of the first user to use the data collection computing input tool.

7. The method of claim 1, further comprising transmitting, from the one or more first servers to the first computing device, an authentication process, wherein the first user must establish a login account.

8. The method of claim 1, further comprising transmitting, from the one or more first servers to the first computing device, an authentication process, wherein the first user must satisfy a static challenge.

9. The method of claim 1, wherein the second vehicle data further comprises one or more of the first image of the first vehicle from the first angle and one or more alphanumeric or multimedia submission, wherein the one or more alphanumeric or multimedia submission comprises a visual upload such as an image file or video file, an audio upload, or a reporting message such as a text data.

10. The method of claim 1, wherein the first vehicle output data is associated with vehicle repairs, vehicle repair facilities, vehicle rental reservations, vehicle rental facilities, vehicle appraisals, vehicle appraisal facilities, vehicle salvage, vehicle salvage facilities, taxis, rideshares, transportation, time estimates, vehicle towing, or any combination thereof.

11. The method of claim 6, wherein the data collection computing input tool comprises a user confirmation interface for receiving a confirmation by the first user, wherein the user confirmation interface comprises one or more selectable or fillable computing data objects, wherein the one or more selectable computing data objects are capable of selection, by the first user at the first computing device, and wherein the one or more fillable computing data objects are capable of receiving, from the first user at the first computing device, one or more confirmation data.

12. The method of claim 1, wherein the first computing object comprises an electronic communication such as a text message or a selectable object.

13. The method of claim 1, wherein the modified vehicle data comprises damage severity data and vehicle reparability data.

14. The method of claim 13, wherein the damage severity data and the vehicle reparability data comprise information such as whether it is more cost effective to repair the first vehicle or salvage the first vehicle, labor hours and required parts to repair the first vehicle, a time estimate for requiring a rental vehicle while the first vehicle is being repaired, a cost analysis for each repair, salvage, and rental option, or any combination thereof.

15. A system used to transform vehicle data using a probabilistic network and a knowledge base generated using historic vehicle data to generate improved vehicle output data, the system comprising:
one or more computing system processors; and
memory storing instructions that, when executed by the one or more computing system processors, cause the system to:
receive, at one or more first servers from a first computing device, first vehicle data, wherein the first vehicle data is associated with a first user and associated with a first vehicle associated with the first user;

generate, at the one or more first servers, in response to receiving, at the one or more first servers from the first computing device, the first vehicle data, a first computing object;

transmit, from the one or more first servers to the first computing device, the first computing object;

receive, at the one or more first servers from the first computing device, a first selection, wherein the first selection comprises a selection, by the first user, associated with the first computing object;

receive, at the one or more first servers from the first computing device, second vehicle data, wherein the second vehicle data is associated with the first vehicle of the first user, and wherein the second vehicle data comprises a first image of the first vehicle from a first angle, wherein the second vehicle data indicates at least one characteristic resulting from an incident associated with the first vehicle, wherein the at least one characteristic resulting from the incident associated with the first vehicle is identifiable in the first image of the first vehicle from the first angle, wherein the second vehicle data is transformed at the one or more first servers, wherein transforming the second vehicle data comprises that at least one processor of the one or more first servers:

compares, at the one or more first servers, the second vehicle data or the first vehicle data to the historic vehicle data, wherein the historic vehicle data is associated with one or more first data of the first vehicle data or one or more second data of the second vehicle data, and wherein the compares the second vehicle data or the first vehicle data to the historic vehicle data comprises:

generates or accesses, at the one or more first servers, a probabilistic network of the historic vehicle data, wherein the probabilistic network comprises a relationship between two or more third data of the historic vehicle data, wherein the relationship between the two or more third data of the historic vehicle data comprises one or more probabilities;

processes, at the one or more first servers, the historic vehicle data, using the probabilistic network, into processed historic vehicle data;

generates, at the one or more first servers, one or more machine learning models for producing a knowledge base;

produces, at the one or more first servers and using the one or more machine learning models, the knowledge base, wherein the knowledge base is trained to recognize one or more patterns of the processed historic vehicle data; and generates, at the one or more first servers and using the knowledge base, one or more data groups, wherein the one or more data groups are associated with at least one of the one or more patterns of the processed historic vehicle data, and wherein the one or more data groups are used to transform the second vehicle data and the first vehicle data, based on the associated at least one of the one or more patterns of the historic vehicle data, into modified vehicle data; and transforms, at the one or more first servers and using the one or more data groups, the second vehicle data or the first vehicle data into the modified vehicle data, wherein the modified vehicle data is based on the historic vehicle data and the first vehicle data or the second vehicle data;

generate, at the one or more first servers, first vehicle output data, wherein the first vehicle output data is generated based in part on the modified vehicle data, and wherein the first vehicle output data comprises one or more first locations, and wherein the one or more first locations is based on one or more of a second location associated with the first user or the first computing device and a third location associated with a first user input, wherein the first user input is received, at the one or more first servers, from the first computing device; and transmit, from the one or more first servers to the first computing device, the first vehicle output data.

16. The system of claim 15, further comprising the one or more computing system processors and memory storing instructions that, when executed by the one or more computing system processors, cause the system to:

receive, at the one or more first servers, a third user input, wherein the third user input comprises a second selection, wherein the second selection comprises a selection, by the first user, associated with the first vehicle output data.

17. The system of claim 15, further comprising one or computing system processors and memory storing instructions that, when executed by the one or more computing system processors, cause the system to:

transmit, from the one or more first servers to the first computing device, an authentication process, wherein the authentication process requires the first user to establish a login account.

18. The system of claim 15, further comprising one or computing system processors and memory storing instructions that, when executed by the one or more computing system processors, cause the system to:

transmit, an authentication process, wherein the first user must satisfy a static challenge.

19. The system of claim 15, wherein the second vehicle data further comprises one or more of the first image of the first vehicle from the first angle and one or more alphanumeric or multimedia submission, wherein the one or more alphanumeric or multimedia submission comprises a visual upload such as an image file or video file, an audio upload, or a reporting message such as a text data.

20. A method of transforming vehicle data using a probabilistic network and a knowledge base generated using historic vehicle data to generate improved vehicle output data, the method comprising:

receiving, at one or more first servers from a first computing device, first vehicle data, wherein the first vehicle data is associated with a first user and associated with a first vehicle associated with the first user;

receiving, at the one or more first servers from the first computing device, second vehicle data, wherein the second vehicle data is associated with the first vehicle of the first user, and wherein the second vehicle data comprises a first image of the first vehicle from a first angle, wherein the second vehicle data indicates at least one characteristic resulting from an incident associated with the first vehicle, wherein the at least one characteristic resulting from the incident associated with the first vehicle is one of identifiable or not identifiable in the first image of the first vehicle from the first angle, wherein the second vehicle data is transformed at the one or more first servers, wherein transforming the second vehicle data comprises:
comparing, at the one or more first servers, the second vehicle data or the first vehicle data to the historic vehicle data, wherein the historic vehicle data is associated with one or more first data of the first vehicle data or one or more second data of the second vehicle data, and wherein comparing the second vehicle data or the first vehicle data to the historic vehicle data comprises:
  generating or accessing, at the one or more first servers, a probabilistic network of the historic vehicle data, wherein the probabilistic network comprises a relationship between two or more third data of the historic vehicle data, wherein the relationship between the two or more third data of the historic vehicle data comprises one or more probabilities;
  processing, using at least one processor at the one or more first servers, the historic vehicle data, using the probabilistic network, into processed historic vehicle data;
  generating, using the at least one processor at the one or more first servers, one or more machine learning models for producing a knowledge base;
  producing, using the at least one processor at the one or more first servers and the one or more machine learning models, the knowledge base, wherein the knowledge base is trained to recognize one or more patterns of the processed historic vehicle data; and
  generating, using the at least one processor at the one or more first servers and the knowledge base, one or more data groups, wherein the one or more data groups are associated with at least one of the one or more patterns of the processed historic vehicle data, and wherein the one or more data groups are used to transform the second vehicle data or the first vehicle data, based on the associated at least one of the one or more patterns of the historic vehicle data; and
  transforming, using the at least one processor at the one or more first servers and the one or more data groups, the second vehicle data or the first vehicle data into modified vehicle data, wherein the modified vehicle data is based on the historic vehicle data and the first vehicle data or the second vehicle data;
generating, at the one or more first servers, first vehicle output data, wherein the first vehicle output data is generated based in part on the modified vehicle data, and wherein the first vehicle output data comprises one or more first locations, and wherein the one or more first locations is based on one or more of a second location associated with the first user or the first computing device and a third location associated with a first user input, wherein the first user input is received, at the one or more first servers, from the first computing device; and
transmitting, from the one or more first servers to the first computing device, the first vehicle output data.

\* \* \* \* \*